United States Patent [19]

Fuyama

[11] Patent Number: 5,682,481
[45] Date of Patent: Oct. 28, 1997

[54] ELECTRONIC CASH REGISTER HAVING CHIT FILES

[75] Inventor: Seiji Fuyama, Yokohama, Japan

[73] Assignee: Matsushita Electric Industrial Co., Ltd., Osaka, Japan

[21] Appl. No.: 277,476

[22] Filed: Jul. 19, 1994

[30] Foreign Application Priority Data

Dec. 20, 1993 [JP] Japan ................................ 5-319355

[51] Int. Cl.$^6$ ............................ G07G 1/12; G06G 1/12
[52] U.S. Cl. ....................... 395/224; 395/216; 395/225; 395/148; 235/378
[58] Field of Search ........................... 364/405, 403; 395/600, 216, 224, 225, 148, 378

[56] References Cited

U.S. PATENT DOCUMENTS

| 5,189,607 | 2/1993 | Shirasaki et al. | 364/405 |
| 5,253,163 | 10/1993 | Yoshida | 364/405 |
| 5,319,546 | 6/1994 | Nishino | 364/405 |

*Primary Examiner*—Gail O. Hayes
*Assistant Examiner*—Krishna Kalidindi
*Attorney, Agent, or Firm*—Spencer & Frank

[57] ABSTRACT

An electronic register having a chit file in a memory which includes the function of setting various dimensions of the chit file, the function of setting control information for use in settling operations, the function of issuing a chit or a sales management report on the basis of the control information, the function of setting the maximum customer number per chit file, the maximum registration item number, the open chit maximum number and the settlement chit maximum number able to be handled by the electronic register, the function of setting information for control of the settling operation for each chit file, and the function of referring to the control information and issuing the sales management report on the basis of the settlement chit information, which can set a structure of the chit file so as to be suitable for an arbitrary store or shop, and easily change information for control of the settling operation of each chit file in a wide range so as to issue such a sales management report as is suitable for the management environment of the individual stores.

20 Claims, 65 Drawing Sheets

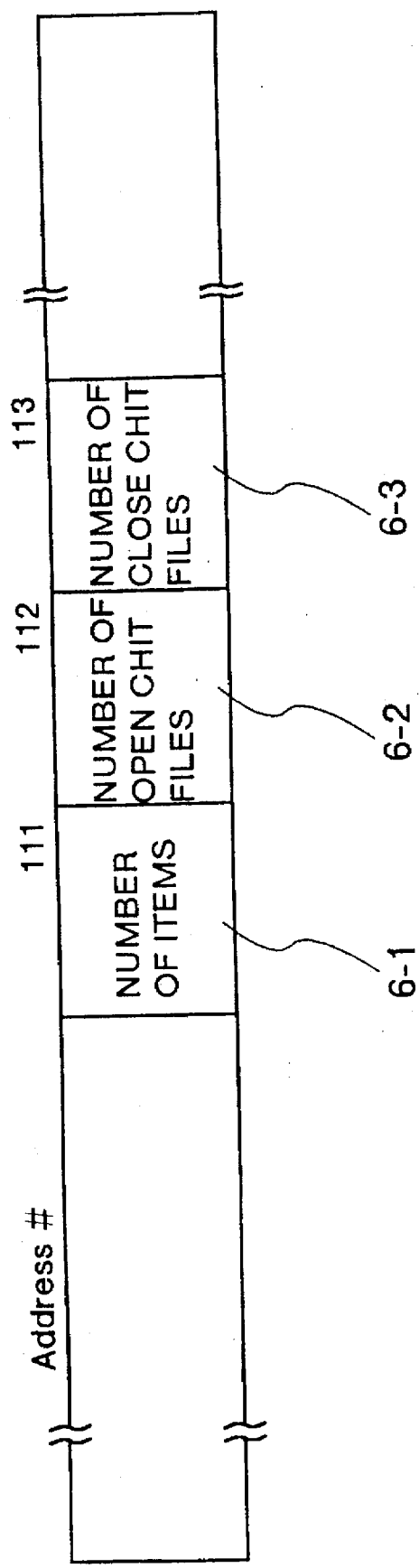

SETTING TASK

⋮

21  MEMORY STRUCTURIZATION
22  CHIT FILE CONTROL INFORMATION

⋮

50  PRINT OF SET DATA

MANAGER TASK

1  INSPECTION REPORT
2  ADJUSTMENT REPORT

FIG.10

INSPECTION REPORT

1 REGISTER REPORT
2 TIME REPORT
3 CASHIER REPORT
⋮
11 OPEN CHIT REPORT
12 CLOSE CHIT REPORT

FIG.11

ADJUSTMENT REPORT

1 REGISTER REPORT
2 TIME REPORT
3 CASHIER REPORT
⋮
11 OPEN CHIT REPORT
12 CLOSE CHIT REPORT

FIG.15

```
* * * CLOSED GCK REPORT * * *
```

| GCK # | TIME OPENED | SBTL |
|---|---|---|
| RECPT # | TIME CLOSED | TAX |
| SERVER | TABLE # | TIP |
| PAYMENT1 | PAYMENT2 | TOTL |

| GCK #10 | FEB.21 14:55 | 120.55 |
|---|---|---|
| #0045 | FEB.21 16:25 | 12.06 |
| HELEN | TABL 12 | 10.00 |
| CASH 142.61 | | 142.61 |

| GCK #15 | FEB.21 14:30 | 51.50 |
|---|---|---|
| #0046 | FEB.21 16:38 | 5.20 |
| JIM | TABL 5 | 5.00 |
| CASH 1.70 | VISA 60.00 | 61.70 |

| CNT | 6 | SBTL | 235.46 |
|---|---|---|---|
| | | TAX | 23.55 |
| | | TIP | 25.00 |
| | | TOTL | 284.01 |

JACK

0123 FEB.21 21:15               REG0001

FIG.24

```
*** CLOSED GCK REPORT ***

GCK#        TIME OPENED    SBTL
RECPT#      TIME CLOSED    TAX
SERVER      TABLE#         TIP
PAYMENT1    PAYMENT2       TOTL

GCK#12      FEB.21 14:55   120.55
#0045       FEB.21 15:00   12.06
HELEN       TABL 12        10.00
CASH 142.61                142.61

GCK#10      FEB.21 14:30   51.50
#0046       FEB.21 15:20   5.20
JIM         TBL 5          5.00
CASH 1.70   VISA 60:00     61.70

┊
            ┊
            ┊

CNT    6            SBTL   235.46
                    TAX    23.55
                    TIP    25.00
                    TOTL   284.01
JACK
0123 FEB.21 21:15          REG0001
```

SETTLEMENT INFORMATION IS PRINTED AS A REPORT IN ORDER OF SETTLEMENT (TIME CLOSED)

* * * CLOSED GCK REPORT * * *

GCK#        TIME OPENED     SBTL
  RECPT#      TIME CLOSED     TAX
  SERVER      TABLE#          TIP
  PAYMENT1    PAYMENT2        TOTL

GCK#10      FEB.21 14:55    120.55
  #0045       FEB.21 15:20    12.06
  HELEN       TABL 12         10.00
  CASH 142.61                 142.61

GCK#12      FEB.21 14:30    51.50
  #0046       FEB.21 15:00    5.20
  JIM         TBL 5           5.00
  CASH 1.70   VISA 60:00      61.70

|
              |
              |
              |

CNT     6       SBTL    235.46
                  TAX     23.55
                  TIP     25.00
                  TOTL    284.01
  JACK
  0123 FEB.21 21:15           REG0001
```

SETTLEMENT INFORMATION IS PRINTED AS A REPORT IN CHIT NUMBER ORDER

FIG.35

```
*** CLOSED GCK REPORT ***

GCK #      TIME OPENED    SBTL
RECPT #    TIME CLOSED    TAX
SERVER     TABLE #        TIP
PAYMENT1   PAYMENT2       TOTL

GCK # 10   FEB.21 14:55   120.55
  # 0045   FEB.21 15:20    12.06
  HELEN    TABL 12         10.00
  CASH 142.61             142.61

GCK # 128  FEB.21 14:30     9.00
  # 0046   FEB.21 15:30      .00
  JIM      TABL 5            .00
           GCK # 125       TRANS

CNT    6          SBTL    235.46
                  TAX      23.55
                  TIP      25.00
                  TOTL    284.01

JACK
0123 FEB.21 21:15         REG0001
```

"TRANS" MEANS THAT GCK #128 WAS INTEGRATED TO GCK #125

```
         RESTAURANT  ABC
────────────────────────────────
GCK # 125
    1 FOOD A              12.50
    2 FOOD B               7.00
      SBTL                19.50
────────────────────────────────
TRANSFER FROM # 128
    1 FOOD C               6.00
    3 FOOD E               3.00
      SBTL                 9.00
────────────────────────────────
      TAX                  2.85
      TOTL                31.35
      STORE               31.35
────────────────────────────────
FEB.21 1993

THANK YOU !
```

FIG.39

```
*** CLOSED GCK REPORT ***
```

| GCK#     | TIME OPENED   | SBTL |
|----------|---------------|------|
| RECPT#   | TIME CLOSED   | TAX  |
| SERVER   | TABLE #       | TIP  |
| PAYMENT1 | PAYMENT2      | TOTL |

| GCK #125 | FEB.21 14:55 | 19.50 |
| #0046    | FEB.21       | 2.85  |
| HELEN    | TABL 12      | .00   |
| CASH     |              | 31.35 |

| GCK #128 | FEB.21 14:30 | 9.00 |
| #0046    | FEB.21 15:30 | .00  |
| JIM      | TABL 5       | .00  |
|          | GCK #125     | COMB |  ← MEANS THAT THIS WAS INTEGRATED TO GCK #125 AND SETTLED

| CNT  6   | SBTL | 235.46 |
|          | TAX  | 23.55  |
|          | TIP  | 25.00  |
|          | TOTL | 284.01 |

JACK
0123 FEB.21 21:15                REG0001

FIG.40

| RESTAURANT ABC | |
|---|---|
| GCK # 125 | |
| 1 FOOD A | 12.50 |
| 2 FOOD B | 7.00 |
| SBTL | 19.50 |
| GCK # 128 | |
| 1 FOOD C | 6.00 |
| 3 FOOD E | 3.00 |
| SBTL | 9.00 |
| TAX | 2.85 |
| TOTL | 31.35 |
| CASH | 31.35 |

FEB.21 1993

THANK YOU !

FIG.45

```
GCK # 101   PERSON # 2

1   FOOD A            12.50
1   FOOD B             3.50

TAX                1.60
    TOTL              17.60
    CASH              17.60
```

FIG.46

```
    RESTAURANT      ABC
-----------------------------------
GCK # 101   PERSON # 2
-----------------------------------
1   FOOD A            12.50
1   FOOD B             3.50

TAX                1.60
    TOTL              17.60
    CASH              17.60
FEB.21  1993         # 0014
-----------------------------------
    THANK YOU VERY MUCH !
```

FIG.47

```
* * * CLOSED GCK REPORT * * *

GCK #        TIME OPENED    SBTL
RECPT #      TIME CLOSED    TAX
SERVER       TABLE #        TIP
PAYMENT1     PAYMENT2       TOTL

GCK #101/    FEB.21 14:55   16.00
   PSN #2
  #0014      FEB.21 15:20    1.60
HELEN        TABL 12          .00
CASH 17.60                  17.60

GCK #128     FEB.21 14:30    9.00      ← CUSTOMER #2
  #00        FEB.21 15:30     .90        SETTLEMENT
  JIM        TABL 5           .00        DATA OF GCK
CASH 9.90                    9.90        #101

│
                │
                │

CNT   6         SBTL       235.46
                TAX         23.55
                TIP         25.00
                TOTL       284.01

JACK
0123  FEB.21 21:15          REG0001
```

FIG.52

```
┌─────────────────────────────────────┐
│         OPEN GCK REPORT             │
│─────────────────────────────────────│
│                                     │
│   # 101                      JIM    │
│                                     │
│       P / B                 12.60   │
│       FEB.18                18.15   │
│   # 125                     HELEN   │
│                                     │
│       P / B                  5.85   │
│       FEB.18                19.10   │
│   # 128   TRNG               BOB    │
│                                     │
│       P / B                  4.10   │
│       FEB.18                19.20   │
│                                     │
│                                     │
│                                     │
│                                     │
└─────────────────────────────────────┘
```

CHIT FILE ISSUED IN TRAINING MODE

FIG.53

```
*** CLOSED GCK REPORT ***

GCK #      TIME OPENED   SBTL
RECPT #    TIME CLOSED   TAX
SERVER     TABLE #       TIP
PAYMENT1   PAYMENT2      TOTL

GCK #102   FEB.21  14:55    19.50
 #0018     FEB.21  15:20     1.95
HELEN      TABL 12            .00
CASH 21.45                  TRNG

GCK #128   FEB.21  14:30     9.00
 #00       FEB.21  15:30      .90
 JIM       TABL 5            9.90
CASH 9.90

CNT    6              SBTL   235.46
                      TAX     23.55
                      TIP     25.00
                      TOTL   284.01
JACK
0123  FEB.21  21:15          REG0001
```

← CHIT DATA SETTLED IN TRAINING MODE

FIG.58

```
          OPEN GCK RESET REPORT.
─────────────────────────────────────

GCK# 110          HELEN
  P/B              16.00
FEB.21   14:55

GCK# 128          JIM
  P/B               9.00
FEB.21   14:30
              |
              |
              |
              |
─────────────────────────────────────
JACK
0155  FEB.21   15:00   REG0001
```

FIG.59

```
~~~~~~~~~~~~~~~~~~~~
 * * * CLOSED GCK REPORT * * *
─────────────────────────────
  GCK #     TIME OPENED   SBTL
  RECPT #   TIME CLOSED   TAX
  SERVER    TABLE #       TIP
  PAYMENT1  PAYMENT2      TOTL
─────────────────────────────
  GCK #110  FEB.21 14:55  16.00
   #0020    FEB.21 15:30   1.60
  HELEN     TABL.12         .00
  RESET                   17.60
─────────────────────────────
  GCK #128  FEB.21 14:30   9.00
   #0025    FEB.21 15:30    .90
  JIM       TABL 5          .00
  RESET                    9.90
─────────────────────────────
              ┊
              ┊
              ┊
─────────────────────────────
  CNT   6         SBTL   235.46
                  TAX     23.55
                  TIP     25.00
                  TOTL   284.01
─────────────────────────────
  JACK
  0123  FEB.21 21:15      REG0001
```

} DATA STORED AS SETTLEMENT DATA BASED ON ADJUSTMENT OF OPEN CHIT FILE

FIG.62

```
        * * * PREVIOUS TRANSACTION * * *

GCK # 123                JIM
      1   FOOD A             12.50
      1   FOOD B              3.50
          TAX                 1.60
          TOTL               17.60
          CASH               17.60

FEB.21  1993            # 1205
```

FIG.63

```
     GCK # 123                JIM
      1   FOOD A             12.50
      1   FOOD B              3.50
          TAX                 1.60
          TOTL               17.60
          CASH               17.60

FEB.21  1993            # 1205
     _____
     PREVIOUS TRANSACTION
     RECEIPT
```

FIG.65

\*\*\* PREVIOUS TRANSACTION RECALL \*\*\*

1 OPERATOR #
2 TABLE #
3 TIME / DATE
4 RECEIPT #

SETTLEMENT CHIT RECALL

TRANSACTION CHANGE

CREDIT CARD A

FIG.67

**\* \* \* TENDER CORRECTION \* \* \***

GCK # 123                    JIM

1  FOOD A              12.50
1  FOOD B               3.50
   TAX                  1.60
   TOTL                17.60
   CREDIT A            17.60
---
CORRECTION FROM
   CASH    17.60
---

FEB.21  1993              # 1308

FIG.70

```
*** CLOSED GCK REPORT ***

GCK #      TIME OPENED   SBTL
RECPT #    TIME CLOSED   TAX
SERVER     TABLE #       TIP
PAYMENT1   PAYMENT2      TOTL

GCK #101   FEB.21 14:55  18.60
  #0025    FEB.21 15:10   1.86
HELEN      TABL.12        2.00
CASH                     22.46

GCK #123   FEB.21 14:30  16.00
  #1308    FEB.21 15:30   1.60
JIM        TABL 5          .00
CREDITA 17.60            17.60
  * TENDER CORRECTION *
```

← MEANS THAT TRANSACTION CHANGE WAS DONE

```
CNT    6    G      SBTL   235.46
                   TAX     23.55
                   TIP     25.00
                   TOTL   284.01
JACK
0123  FEB.21 21:15        REG0001
```

ELECTRONIC CASH REGISTER HAVING CHIT FILES

BACKGROUND OF THE INVENTION

1. Field of the Invention

The present invention relates to electronic registers having chit files which are used mainly in such food service industries as restaurants and, more particularly, to an electronic register in which a client's order is registered in a chit file and its account is settled.

2. Description of the Related Art

In prior art electronic registers, it has been possible to register a client's order in the electronic register, and issue and settle a chit, but it has been difficult to adapt these electronic registers to any particular methods in individual restaurants, because the settling method and chit format are set for an electronic register at fabrication. Further, it has also been difficult to change the processing method, etc. For this reason, in such a store that requires frequent modification of the processing method, it has been necessary to employ an expensive system which comprises a host computer and electronic registers connected to the host computer through a line to download a program to be modified from the host computer.

Meanwhile, changes in various conditions such as development of food service industries, diversified clients' demands, and labor or working environments have been involving verifying restaurants' management methods and abrupt changes therein. In particular, with respect to function selection, management reports or the like in the chit and settlement processing directly associated with money transfer, there occur verifying and changing requests which vary from restaurant to restaurant. In addition, information to be registered in chit files, items to be described in chits, chit methods, etc. also vary with changes in the situations. Thus, there has been demanded a convenient electronic register that can meet such demands and also can modify the contents of the chit files easily and in a wide range.

SUMMARY OF THE INVENTION

It is an object of the present invention to provide an electronic register having chit files which can quickly cope with changes in management methods in food service industries.

Another object of the present invention is to provide an electronic register wherein the arrangement of chit files can be modified simply, quickly and conveniently so as to be adapted for a restaurant's operating environment.

Yet another object of the present invention is to provide an electronic register which can issue chits in a suitable order, as suitably integrated or divided as necessary.

A further object of the present invention is to provide an electronic register which can perform its necessary settling operation and issue settlement reports depending on changes in conditions.

Yet a further object of the present invention is to provide an electronic register which can perform sales management depending on changes in conditions.

In accordance with an aspect of the present invention, the above objects are attained by providing an electronic register having chit files which comprises means for setting various dimensions of the chit files, means for setting control information on chit processing, and means for issuing the chits or sales management reports on the basis of the control information.

The electronic register of the present invention further comprises means for setting a maximum person number and maximum registration item number per chit file as well as a maximum open-chit number and maximum chit number handled by the electronic register, means for setting information for control of chit processing for each chit file, and means for referring to the control information on the above chit processing and for issuing a sales management report based on the chit information.

In accordance with the electronic register of the present invention, since the maximum person number and maximum registration item number per chit file as well as the maximum open-chit number and the maximum chit number handled by the electronic register can be set, the arrangement of the chit files can be modified so as to be adapted for an application shop. Further, since the information for control of chit processing for each chit file can be modified in a simple, quick and convenient manner in a wide range, there can be issued sales management reports which are based on such chit information as to meet the operating environment of the application shop.

In accordance with the present invention, the electronic register can perform the following functions:

(1) selecting, on the basis of the control flag information previously set within the memory, when the settlement chit file area becomes full, either one of an operation of skipping storage of the settle chit information in the settle chit file area and an operation of discarding old settlement data on a first-in-first-out basis and storing the latest settlement data;

(2) previously setting the residual capacity alarm level of the settlement chit file area within the memory, and when the settlement chit information is stored in the settlement chit file area in the registering/settling operation, displaying a message when the residual capacity of the associated file becomes smaller than the above set level;

(3) when the settlement chit information is outputted to the display device or printer as sales management report data, selecting the chit number order or the generation (or storage) order of the settlement data on the basis of the control flag information previously set within the memory;

(4) in a system which comprises a plurality of registers interconnected with each other and each register includes a transmission unit for transfer of chit file information between the plurality of registers, setting their own register numbers and the number of a master register commonly used by the plurality of registers as a chit file memory in respective memories of the registers, communicating among the registers the information in open and settlement chit file areas provided in the memory of the master register so as to issue settlement chit information reports;

(5) on the basis of the control flag information previously set in the memory, integrating a plurality of customer chit files subjected to the registering operation into a selected one of the chit files, and storing the integrated chit file in the respective settlement chit file area as the integrated information;

(6) on the basis of the control flag information previously set in the memory, integrating a plurality of customer chit files subjected to the registering operation, settling the integrated chit files and storing the integrated and settled chit files in the respective settlement chit file area as the integrated settlement information;

(7) after registering a plurality of customers in the same chit file, dividing the chit file on each customer basis for settling operation, and outputting the customer-based settlement information to a display device or a printer as a sales management report on the settlement chit information;

(8) storing the registered and settled chit files in the settlement chit file area as training mode settlement information while in the training mode designated by the mode switch, and when it desired to output a sales management report of the settlement chit information, outputting the stored information to a display device or a printer as the training mode settlement information;

(9) storing the chit file registered and settled with use of a trainer-exclusive code previously set in the settlement chit file area as trainer settlement information, and when it is desired to output a sales management report of the settlement chit information, outputting the stored information to a display device or the printer as trainer settlement information;

(10) on the basis of the control flag information previously set in the memory, allowing issuance of an adjustment report of the customer chit file, carrying out adjusting operation and issuance of the settlement report, storing the adjusted chit file information in the respective settlement chit file area as adjustment chit file information, and outputting the adjustment information of the chit files being opened to the display device or the printer as a sales management report of the settlement chit information;

(11) providing a settlement chit recall key for recalling specific settlement chit information and a print key for printing the information, reading out the settlement chit information from the settlement chit file area corresponding to the entered chit number at depression of the recall key and displaying the corresponding settlement chit information on the display device or printing it by the printer at depression of the print key;

(12) when a retrieval factor of information attached to the settlement chit file is specified, sequentially reading out the settlement chit data with respect to the retrieval factor from the settlement chit file area to display it on the display device or to print it by the printer when the print key is depressed;

(13) providing a settlement chit recall key and a transaction change key, after the settlement chit information of the corresponding chit number is read to the display device and when the operator depresses the transaction change key, changing the payment data of the settlement chit file, subtracting the transaction amount of transaction data of the sales totalization data file from a totalizer for the old-transaction, adding it to a totalizer for the new transaction and to a totalizer for the transaction change, and displaying the changed settlement chit transaction result on the display device and printing it by the printer; and

(14) setting a chit file number (i.e. the total number of open chit files and settlement chit files) handleable by the register, storing settlement transaction data in the associated customer chit file at the depression of the settlement key, and using the stored data in the sales management report as the settlement chit file information of the corresponding customer chit file.

BRIEF DESCRIPTION OF THE DRAWINGS

FIG. 6 shows a structure of a chit file constituent element setting area in a control information setting file in the first embodiment of the present invention;

FIG. 10 shows, in a model form, an inspection report menu screen in the first embodiment of the present invention;

FIG. 11 shows, in a model form, an adjustment report menu screen in the first embodiment of the present invention;

FIG. 15 is an example of chit report in the first embodiment of the present invention;

FIG. 24 shows an example of a chit report (in a chit generation order) in the fourth embodiment of the present invention;

FIG. 25 shows another example of the chit report (in a chit number order) in the fourth embodiment of the present invention;

FIG. 35 shows an example of a chit report in the sixth embodiment of the present invention;

FIG. 39 shows an example of a chit report in the seventh embodiment of the present invention;

FIG. 40 shows an example of a receipt after the chit file integrating/settling operation in the seventh embodiment of the present invention;

FIG. 45 shows an example of display of the customer-based settling operation in the eighth embodiment of the present invention;

FIG. 46 shows an example of a receipt in the customer-based settling operation in the eighth embodiment of the present invention;

FIG. 47 shows a chit report in the customer-based settling operation in the eighth embodiment of the present invention;

FIG. 52 shows an example of print of an inspection report of an open chit file area in the ninth embodiment of the present invention;

FIG. 53 shows an example of a chit report in the ninth embodiment of the present invention;

FIG. 58 shows an example of an adjustment report for an open chit in an eleventh embodiment of the present invention;

FIG. 59 shows an example of a chit report in the eleventh embodiment of the present invention;

FIG. 62 shows an example of recall display for a chit in the twelfth embodiment of the present invention;

FIG. 63 shows an example of recall print for a chit in the twelfth embodiment of the present invention;

FIG. 65 shows an example of selection screen for the retrieval factor in the thirteenth embodiment of the present invention;

FIG. 66 shows an example of key manipulation in transaction change operation in a fourteenth embodiment of the present invention;

FIG. 67 shows an example of display and print for the transaction change operation in the fourteenth embodiment of the present invention;

FIG. 70 shows an example of a chit report in the fourteenth embodiment of the present invention;

DESCRIPTION OF THE PREFERRED EMBODIMENTS

(Embodiment 1)

Figure 1:
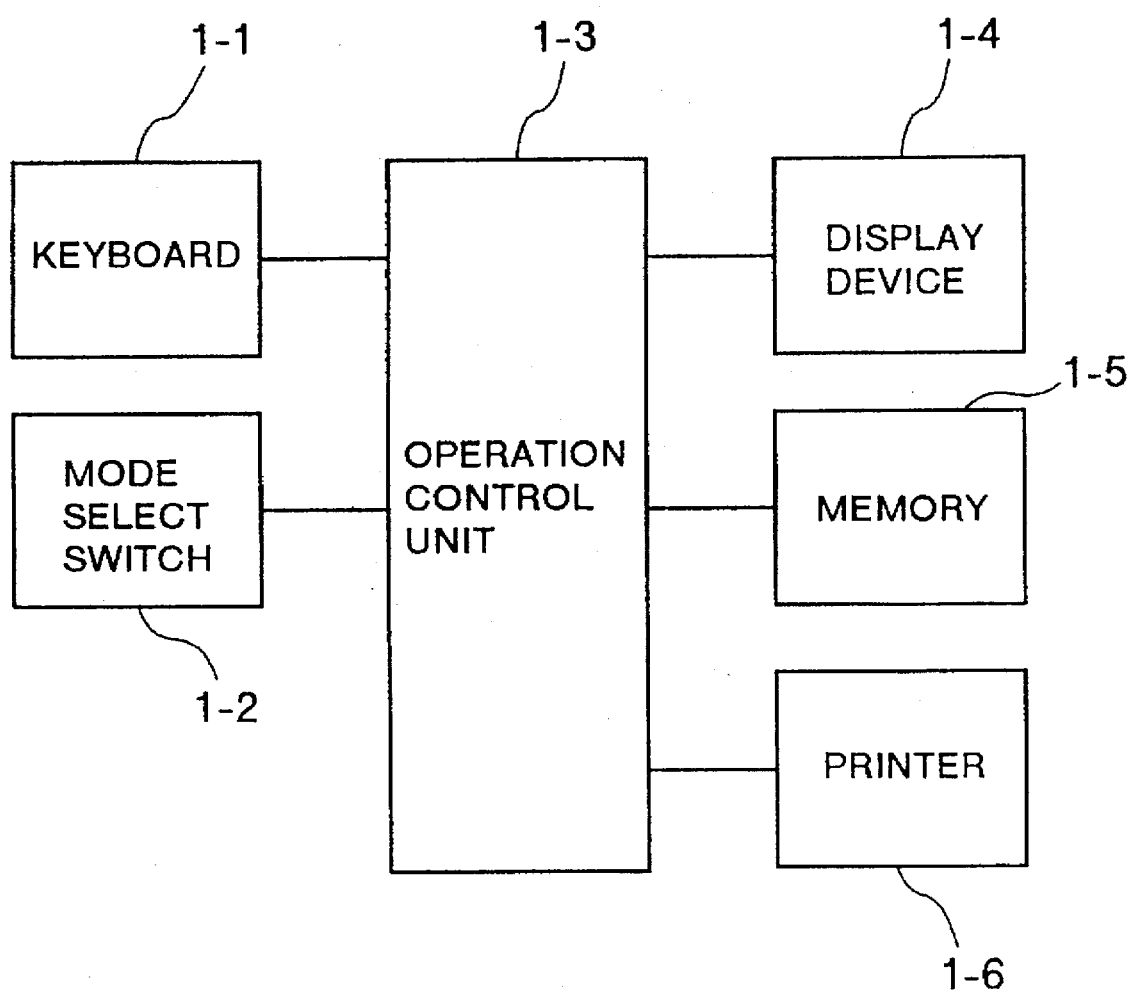
FIG. 1 is a block diagram of an electronic register in accordance with a first embodiment of the present invention.
Figure 2:
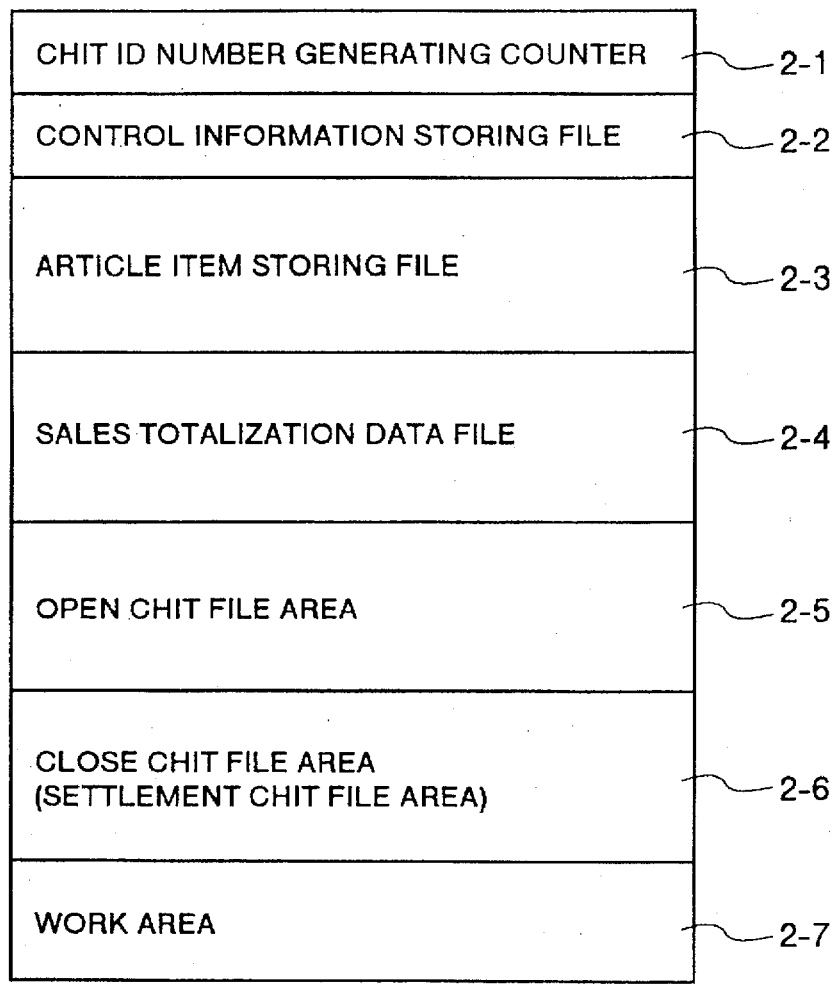
FIG. 2 shows a structure of a memory in the first embodiment of the present invention.
Figure 3:
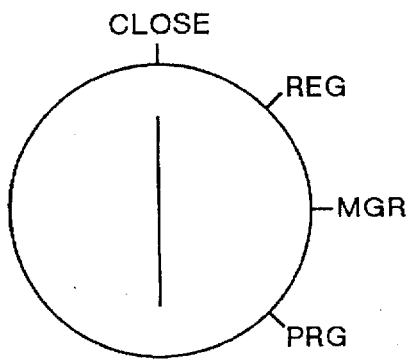
FIG. 3 is an appearance view of a mode switch in the first embodiment of the present invention.

A first embodiment of the present invention will be detailed with reference to the accompanying drawings. Referring first to FIG. 1, there is shown a block diagram of an electronic register in the first embodiment of the present invention. In more detail, a keyboard 1-1 has necessary keys arranged thereon including a chit issuance key, numeric keys, an item registration key and a chit settlement key, so that, when each of these keys is depressed, this causes generation of a key code corresponding to the depressed key, whereby the key code is sent from the keyboard 1-1 to an operation controller 1-3. The operation controller 1-3 has therein a read-only memory (ROM) in which are stored programs for processing of operations of respective register terminals. Connected to the operation controller 1-3 are, in addition to the keyboard 1-1, a mode switch 1-2, a display device 1-4, a memory 1-5 and a printer 1-6. The appearance of the mode switch 1-2 is shown in FIG. 3. The mode switch 1-2 is used for assigning one of the operational modes of the electronic register such as close (CLS), register (REG), manage (MGR) and set or program (PRG). The assigned data of the mode switch is read by the operation controller 1-3 prior to the start of each operation processing program of the electronic register to determine the corresponding processing. The display device 1-4 displays thereon the registration contents of an order or the contents of a report upon inspection and adjustment as the processed contents of the operation controller 1-3. The memory 1-5 has a chit number issuance counter 2-1, a control information setting file 2-2, a vending article setting file 2-3, a sales totalization data file 2-4, an open chit file area 2-5, a closed chit (settled chit) file area 2-6 for closed chits (occasionally called "close chits" herein), and a work area 2-7 for use of calculation of registering and totalizing operations therein, as shown in FIG. 2. The printer 1-6 prints the registration contents of orders, the contents of a report upon inspection and adjustment, etc. which are the results of processing by the operation controller 1-3.

Figure 7:
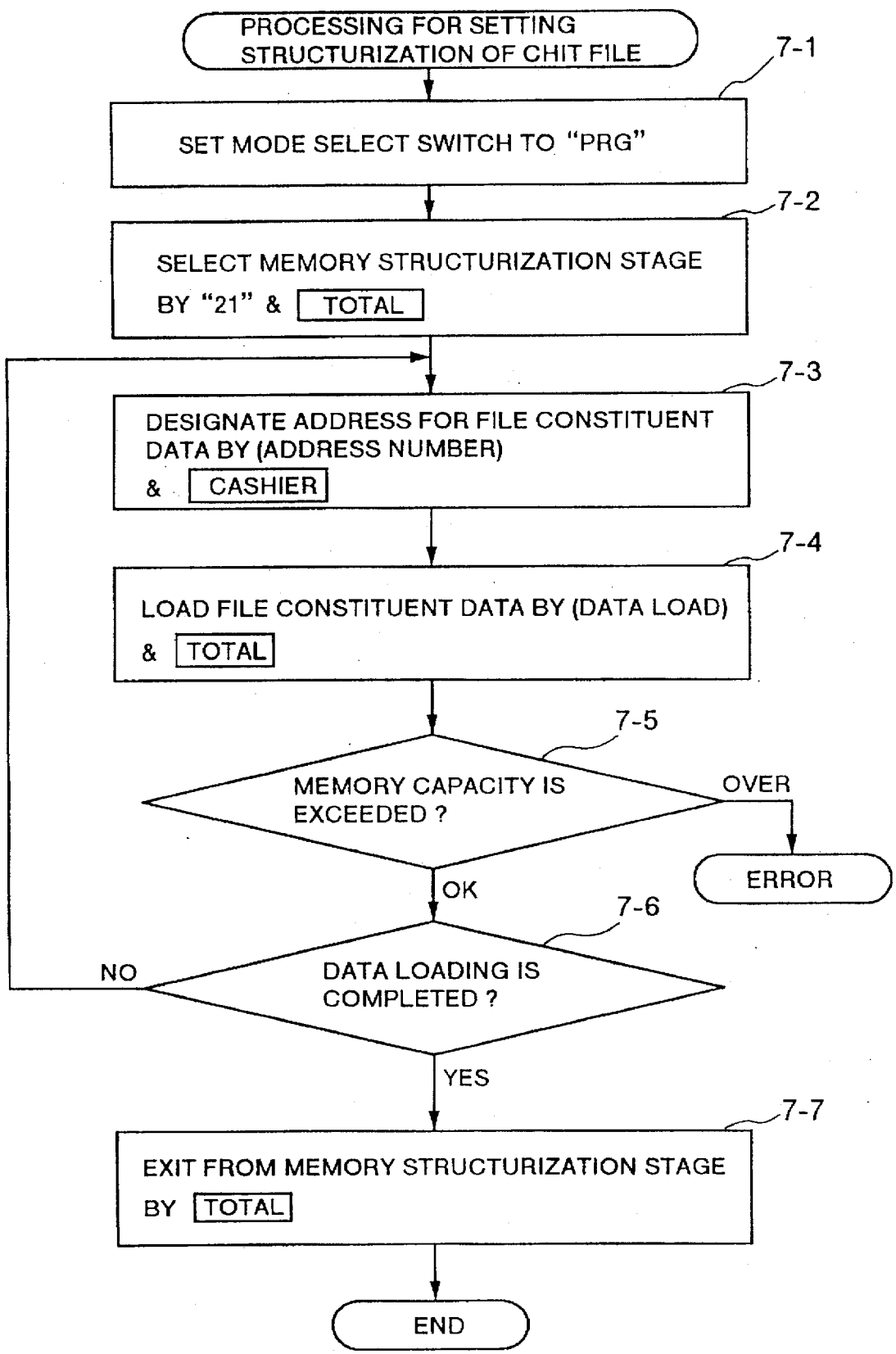
FIG. 7 is a flowchart for setting constituent elements of a chit file in the first embodiment of the present invention.
Figure 8:
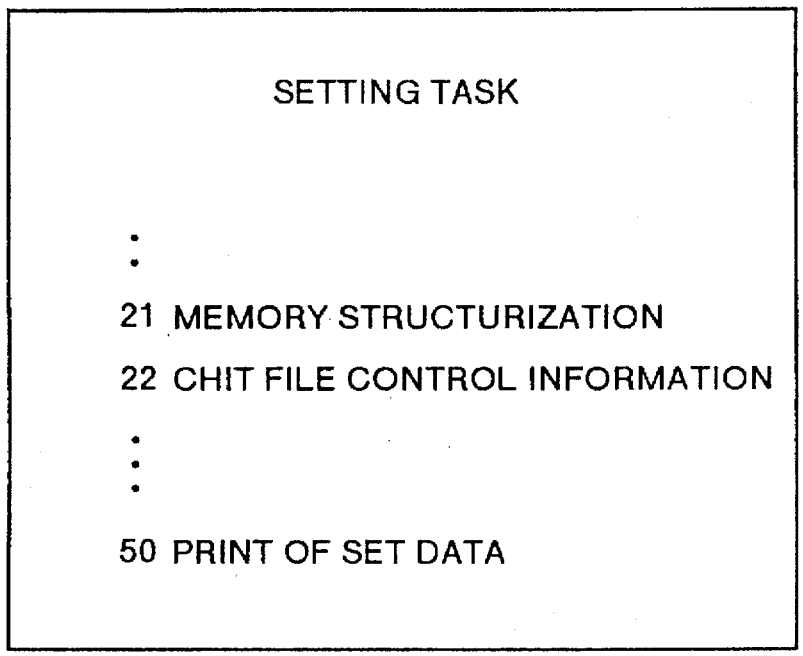
FIG. 8 shows, in a model form, a setting operation menu screen in the first embodiment of the present invention.

An explanation will next be made as to the operation of the first embodiment of the present invention. FIG. 7 shows a flowchart for explaining the setting operation of a chit file arrangement in the memory of the electronic register. Secured in the control information setting file 2-2 of the memory 1-5 is a chit file constituent element setting area of such a structure as shown in FIG. 6 in which the number of registration items per chit file is set at address #111 (6-1), the number of chit file issuances (open chit number) handleable by the register is set at address #112 (6-2), and the number of settled chits (closed chit number) handleable by the register is set at address #113 (6-3), respectively. When the operator assigns the operation of the register in its set mode (PRG) with use of the mode switch 1-2 (step 7-1), such a task menu in the set mode as shown in FIG. 8 is displayed together with their indicating numbers including 21 memory structure and 22 chit file control information. For executing the memory structure through the keyboard 1-1, when the operator strokes the keys "21" and "TOTAL", the memory structure setting stage 21 is selected (step 7-2). In this connection, "TOTAL" refers to a key marked with "TOTAL" thereon. For the purpose of minimizing the number of necessary keys for the register, the key "TOTAL" is used also as a key having an "ENTER" function in the illustrated example. Next, the operator's stroking of keys "111" and key "CASHIER" causes the address #111 of the chit file constituent element setting area shown in FIG. 6 to be specified (step 7-3). The key "CASHIER" is depressed for the purpose of entering the value of the address. Stroking of keys indicative of set data and the key "TOTAL" causes the number of registration or registered items per chit file to be set (step 7-4). When the above keying operation is repeated but the address numbers (#) changed, the open chit number is set at the address #112 and the settled chit file number (closed chit file number) is set at the address #113, respectively. In the above setting operation, the capacities of the chit file areas 2-5 and 2-6 are calculated on the basis of the set number and a total capacity of the memory structure of FIG. 2 including the former chit file area capacity is calculated (step 7-5). When the calculated total capacity exceeds the actual capacity of the memory 1-5, the operation becomes an error operation, with the result that an error message is displayed and the settings become invalid. After setting the present data, stroking the key "TOTAL" causes the register to go out or exit from the present set stage (step 7-7).

Figure 4:
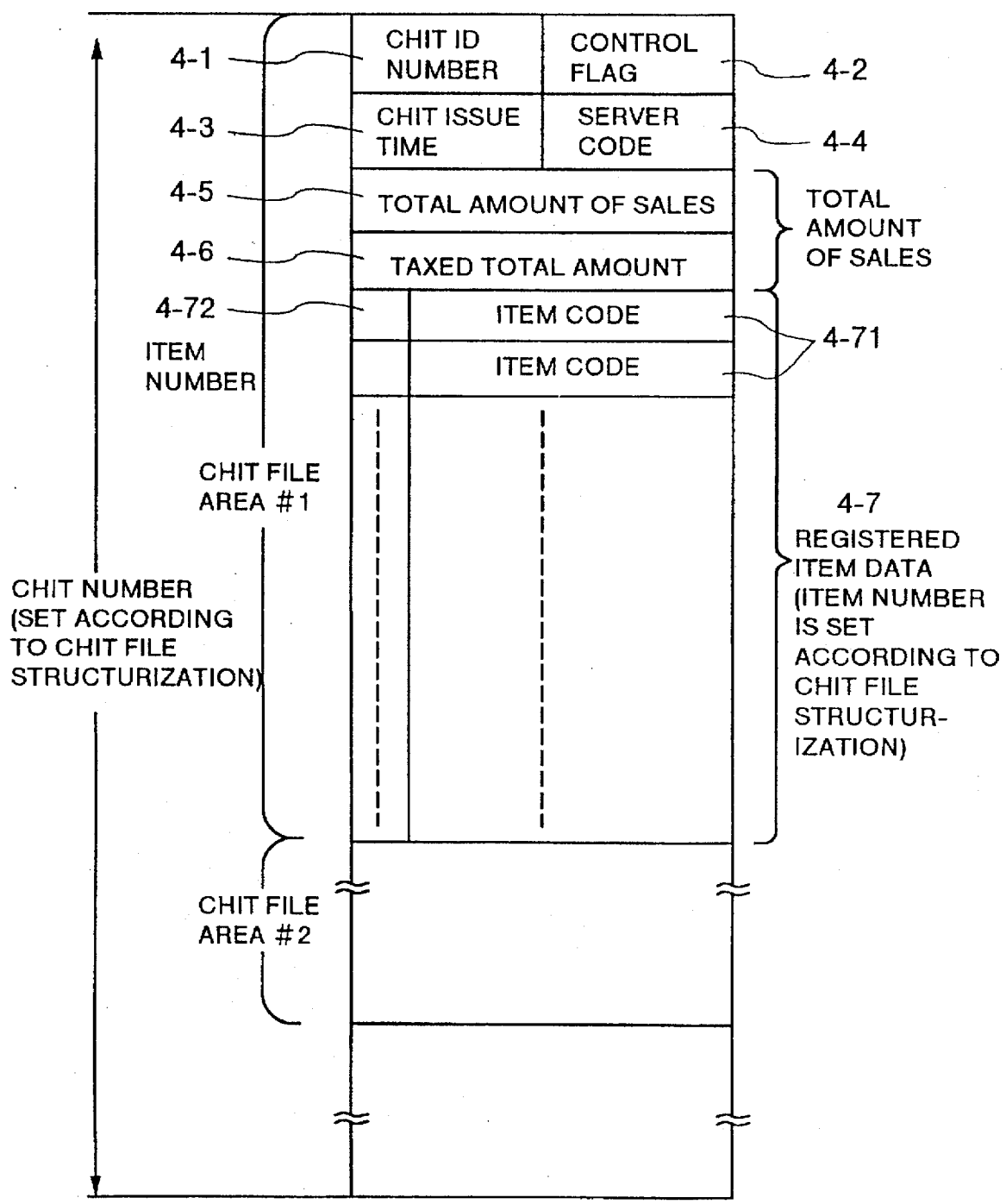
FIG. 4 shows a structure of a open chit file area in the first embodiment of the present invention.

Shown in FIG. 4 is the structure of the open chit file area 2-5. The set number (registration item number per chit file) at the address #111 of the chit file constituent element setting area of FIG. 6 determines the size of a registration item code area 4-7. Area 4-7 contains registered item data (the item number is set according to chit file structurization). The set number (open chit file number handleable by the register) at the same address #112 determines the total number of chit files in the open chit file area 2-5. In FIG. 4, reference numeral 4-1 denotes a chit number, 4-2 a control flag, 4-3 a chit issuance time, 4-4 a server code, 4-5 a total amount of sales, 4-6 a total amount of taxed sales, and 4-7 an area for storage of registration item data. The control flag 4-2 is used as an area for storage of status information indicative of the status of data of the corresponding file. Bracket 4-8 marks the total amount of sales. Bracket 4-9 marks a chit file area #1 and bracket 4-10 mark a chit file area #2. Arrow 4-11 corresponds to a chit number (which is set according to the chit file structurization).

Figure 5A:
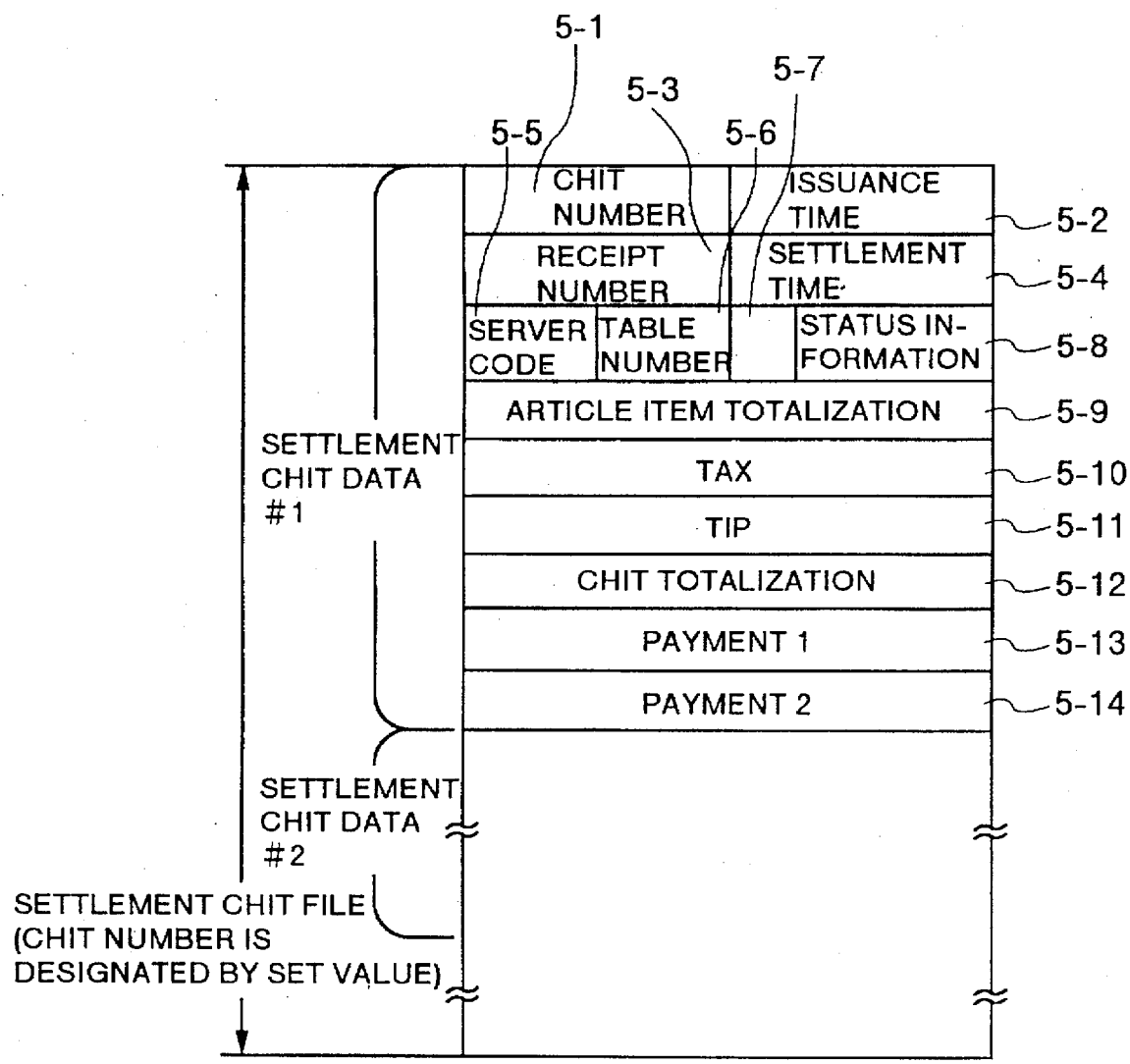
FIG. 5A shows a structure of a chit file area in the first embodiment of the present invention.
Figure 5B:
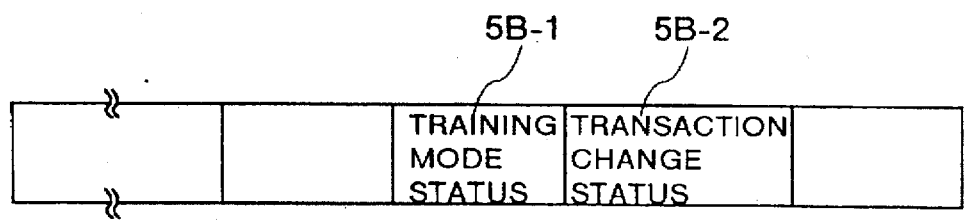
FIG. 5B shows a structure of a status information area of the chit file area in the first embodiment of the present invention.

FIG. 5A shows the structure of the settled chit file area 2-6. The total number of the chit files is determined by the set number (closed chit file number handleable by the register) of the address #113 of the chit file constituent element setting area of FIG. 6. In FIG. 5A, reference numeral 5-1 denotes a chit number, 5-2 a chit issuance time (in which the time 4-3 is stored), 5-3 a settled transaction receipt number, 5-4 a chit settlement time, 5-5 a server code, 5-6 a table number associated with the present chit, 5-7 a blank, 5-8 status information, 5-9 a total of item registration amounts, 5-10 a tax, 5-11 a chip storage area if the server received a chip, 5-12 a total amount of sales, 5-13 a payment code and amount of the settled transaction, and 5-14 an area for storage of a secondary payment code and amount if two sorts of settlement transactions were done. Bracket 5-15 marks settlement chip data #1, bracket 5-16 marks settlement chip data #2, and arrow 5-17 corresponds to the settlement chit file (the chit number is designated by a set value). The status information 5-8 includes a training mode status 5B-1 and a transaction change status 5B-2 as shown in FIG. 5B.

Figure 12A:
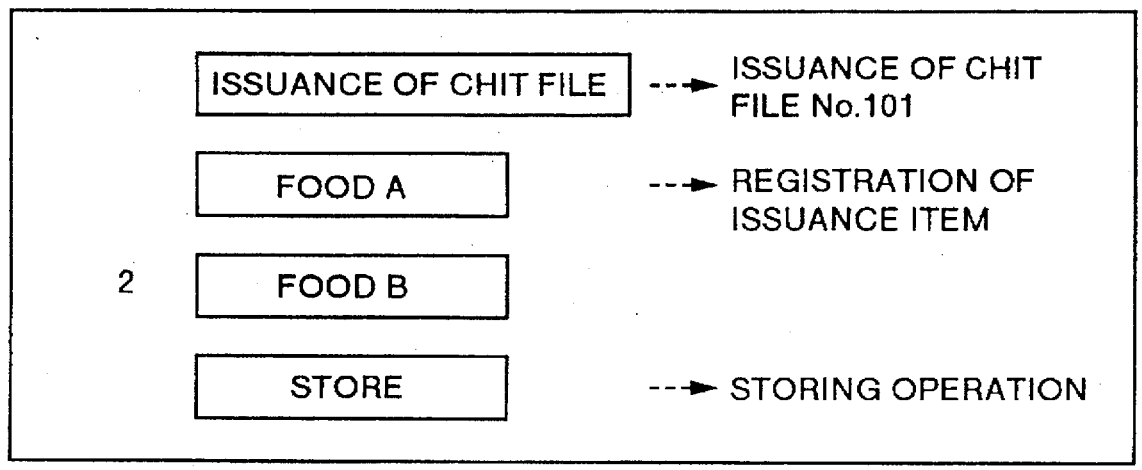
FIG. 12A is a diagram for explaining an example key operations for issuing a chit file in the first embodiment of the present invention.
Figure 12B:
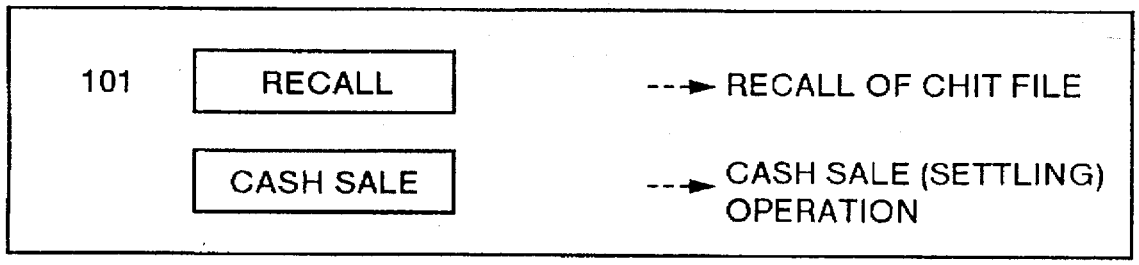
FIG. 12B is a diagram for explaining an example key operations for cash sale.

Next, all explanation will be made as to the chit issuing operation in a registration mode of the register. FIGS. 12A and 12B show examples of key manipulation for chit file issuance and settled cash sales. Through the key manipulation of FIG. 12A, the chit file #101 is issued, and one "food A" and two "food B" are registered in the present chit file. Thereafter, through the manipulation of the key "STORE", The chit file #101 is stored in the open chit file area 2-5. In the case of the settled cash sales, as shown in FIG. 12B, operating numeric keys corresponding to the file number #101 and then a key "RECALL" causes a chit file of the corresponding chit number to be called from the chit file area 2-5, after which operating a cash sales key causes the cash sales settling operation to be carried out.

Figure 13A:
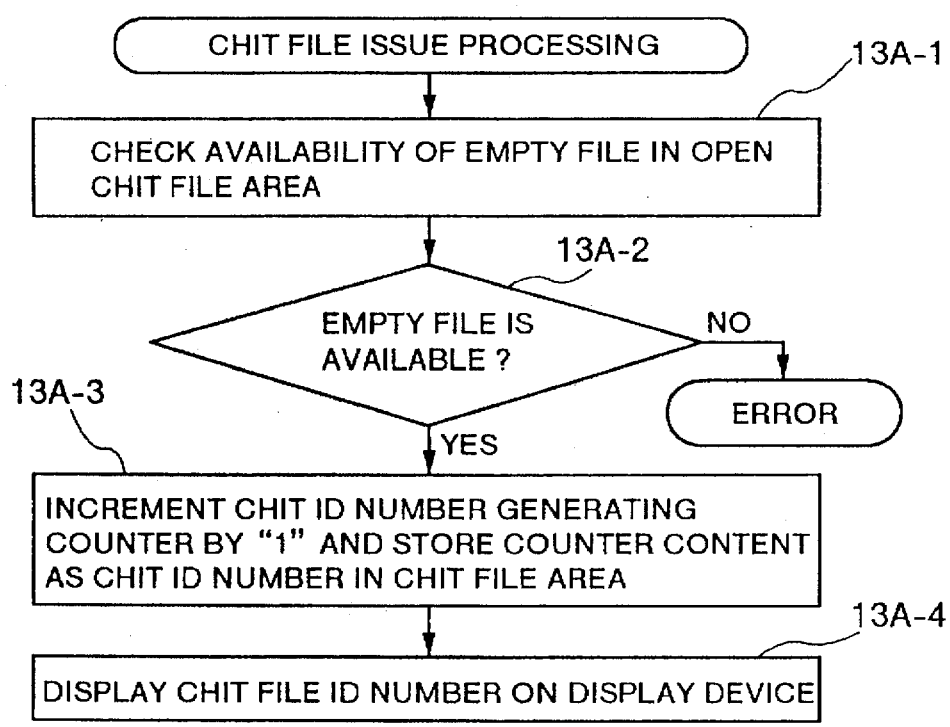
FIG. 13A is a flowchart of issuing an open chit file in the first embodiment of the present invention.

FIG. 13A is a flowchart for explaining the present chit file issuing operation. In more detail, it is first checked whether or not there is an empty chit file in the open chit file area 2-5 (step 13A-1). In the absence of an empty file, the register determines that there has been an error. In the presence of an empty file (step 13A-2), the count value of the chit number issuance counter is incremented by "1", so that the added count value is stored at a chit number part in the corresponding file of the chit file area (step 13A-3) and the corresponding chit file number is sent to the display device 1-4 to be displayed thereon (step 13A-4).

Figure 13B:
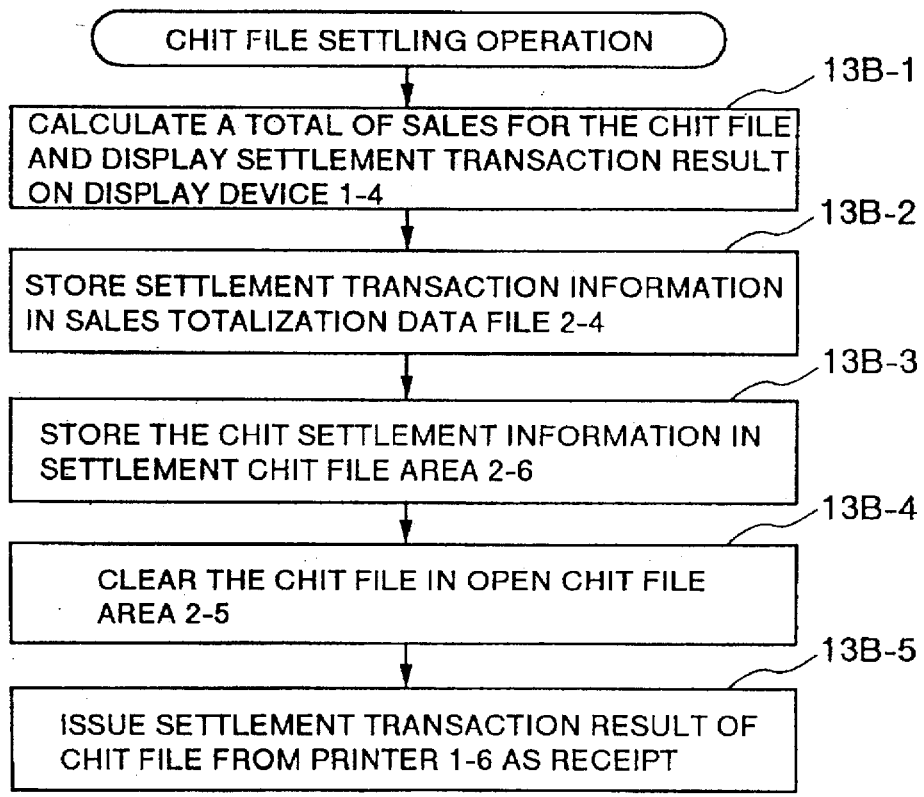
FIG. 13B is a flowchart of settlement processing for a chit file in the first embodiment of the present invention.

Referring to FIG. 13B, showing a flowchart of the chit settling operation, after the corresponding chit file is recalled from the chit file area 2-5 to the work area 2-7, the operation of the settlement key on the keyboard 1-1 causes a total sum of sales of the chit files in the chit file area 2-5 to be calculated, so that its settlement result is displayed on the display device 1-4 (step 13B-1) and also stored in the sales totalization data file (step 13B-2). Further, this settlement chit information is stored in the settled file area 2-5 (step 13B-3), the associated chit file information of the chit file area 2-5 is cleared (step 13B-4), and thereafter a settlement transaction result of the associated chit file is issued from the printer 1-6 in the form of a receipt (step 13B-5).

Figure 18A:
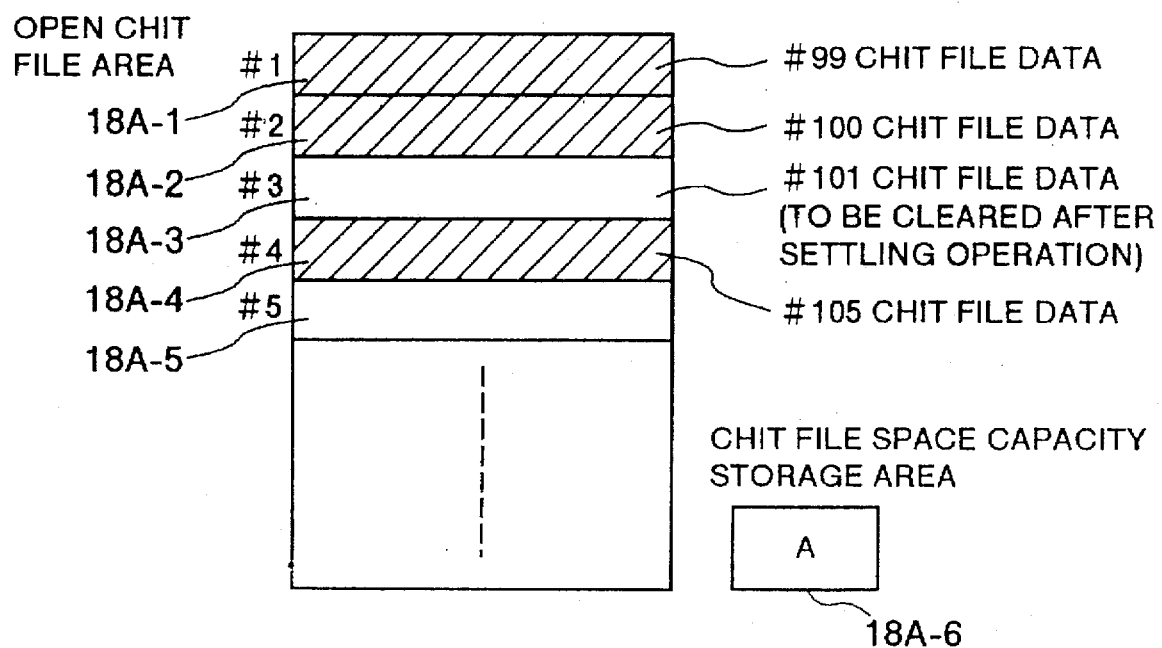
FIG. 18A shows contents of an open chit file area before its file control operation in the present invention.
Figure 18B:
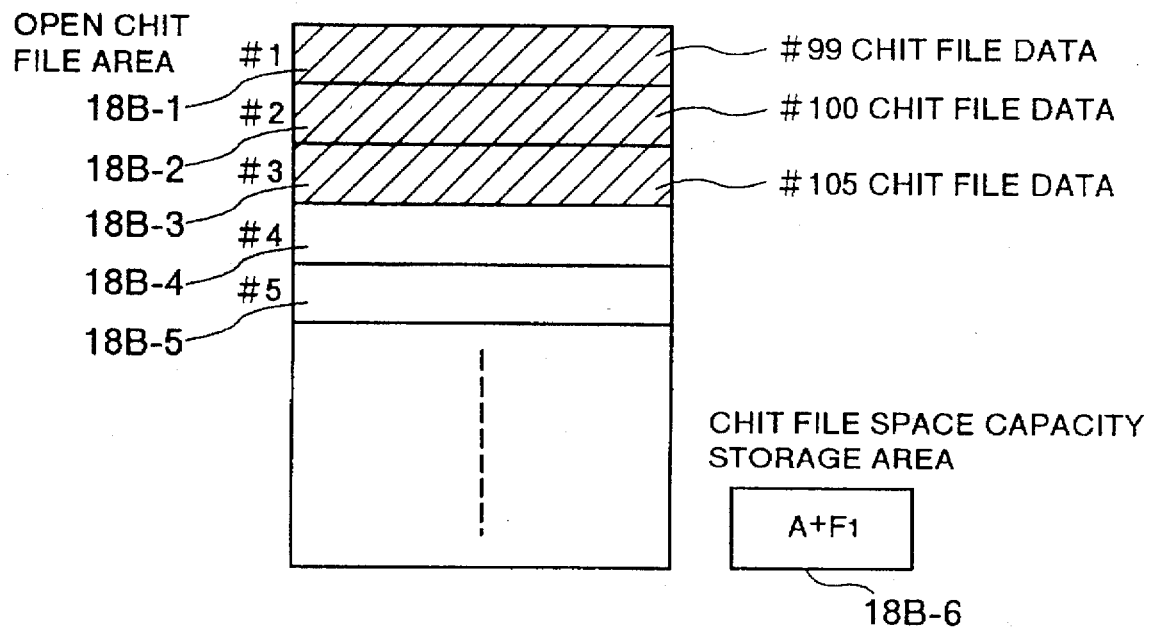
FIG. 18B shows contents of the open chit file area after the file control operation in the present invention.

The file control of the open chit file area 2-5 will be explained in connection with FIGS. 18A and 18B. Reference symbols 18A-1 through 18A-5 in FIG. 18A denote storage area #1 through storage area #5 in the open chit file area 2-5, and these same storage areas are denoted by reference symbols 18B-1 through 18B-5 in FIG. 18B. Assume that area 18A-1 in FIG. 18A currently stores open chit file data #99, that area 18A-2 currently stores open chit file data #1, that are 18A-3 currently stores open chit file data #101 (which is to be cleared after a settling operation), and that area 18A-4 currently stores open chit file data #105). In FIG. 18A, when the open chit file #101 is settled, the data of the corresponding area in the same drawing is cleared and that the subsequent chit data are put close together so as to leave no space as shown in FIG. 18B. Reference symbol 18A-6 in FIG. 18A denotes an area indicative of the space capacity of the open chit file area, which is secured in the work area 2-7, and reference symbol 18B-6 in FIG. 18B also denotes this chit file space capacity storage area. Assuming now that the space capacity is A when chits #99, 100, 101 and 105 are stored and the memory capacity of one open chit file is F1, then the space capacity 18A-6 of the open chit file area is reduced by the capacity F1 corresponding to one file each time a new file is stored, and is increased by the capacity F1 corresponding to one file each time a file is cleared, and the then space capacity is stored.

Figure 19A:
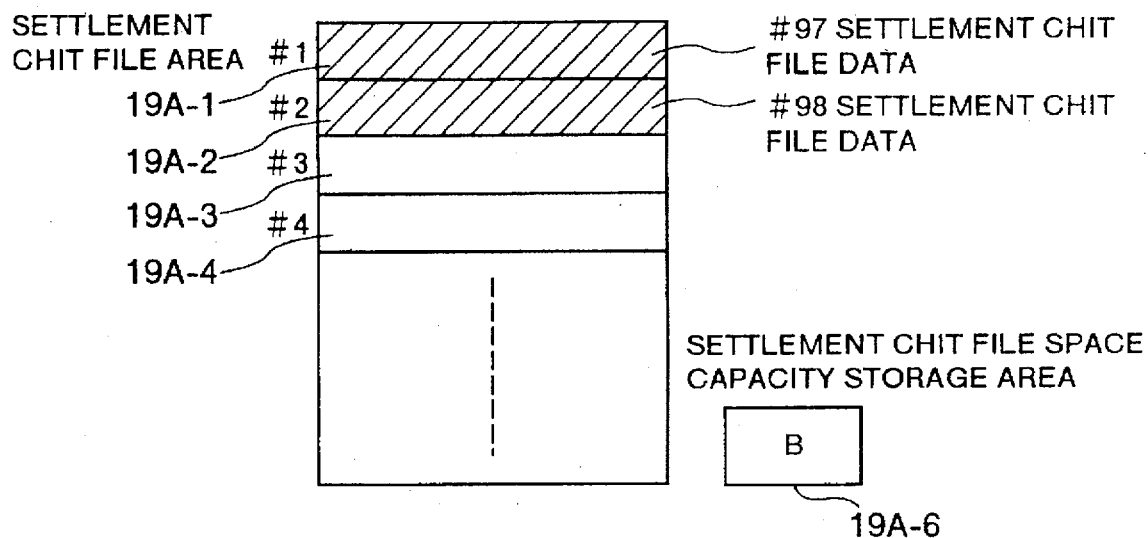
FIG. 19A shows contents of a chit file area before its file control operation in the present invention.
Figure 19B:
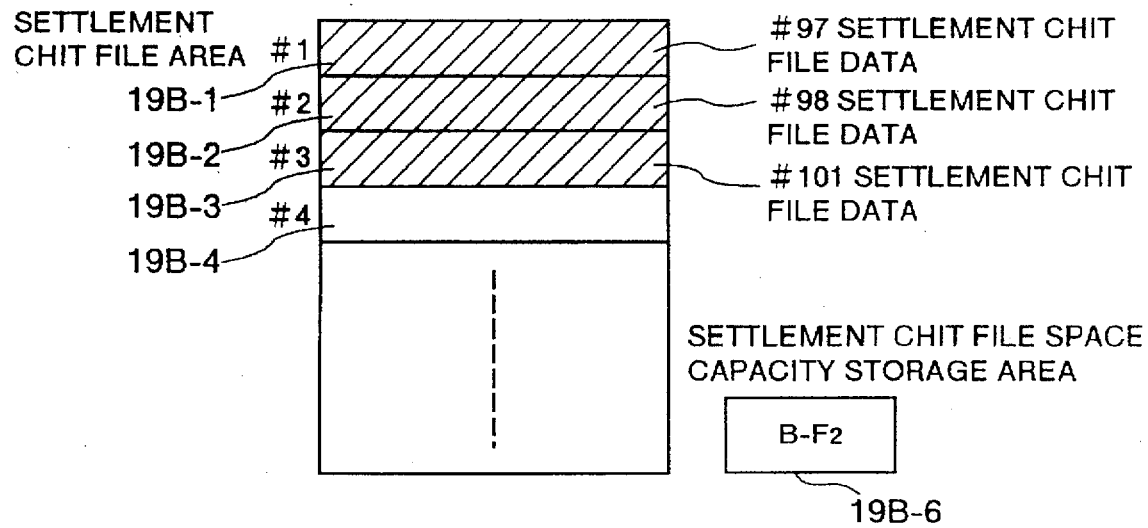
FIG. 19B shows contents of the chit file area after the file control operation in the present invention.

FIGS. 19A and 19B are diagrams for explaining the file control of the settlement chit file area. Reference symbols 19A-1 through 19A-4 in FIG. 19A denote storage area #1 through storage area #4 in the settlement chit file area 2-6, and these same storage areas are denoted by reference symbols 19B-1 through 19B-4 in FIG. 19B. Assume that area 19A-1 in FIG. 19A currently stores #97 settlement chit file data and that area 19A-2 currently stores #98 settlement chit file data. FIG. 19A shows the status of the settlement chit file area before the open chit file #101 is settled but after the chit files #97 and #98 are already settled. After the chit file #101 is settled, the settled chit information #101 is additionally stored in the settlement chit file 2-6 as shown in FIG. 19B. Reference symbol 19A-6 in FIG. 19A denotes an area indicative of the space capacity of the settlement chit file area, which is secured in the work area 2-7, and reference symbol 19B-6 in FIG. 19B also denotes this settlement chit file space capacity storage area. Assuming now that the space capacity when the chits #97 and #98 are stored is B and the memory capacity of one closed chit file is F2, then the space capacity 19A-6 of the closed chit file area is reduced by the capacity F2 corresponding to one file each time a new file is stored and the space capacity of the time is stored.

Figure 9:
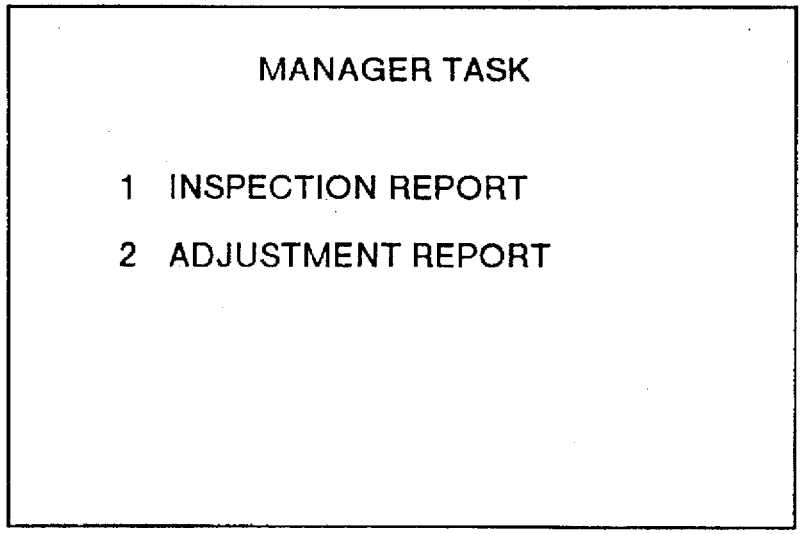
FIG. 9 shows, in a model form, a manager operation menu screen in the first embodiment of the present invention.
Figure 14:
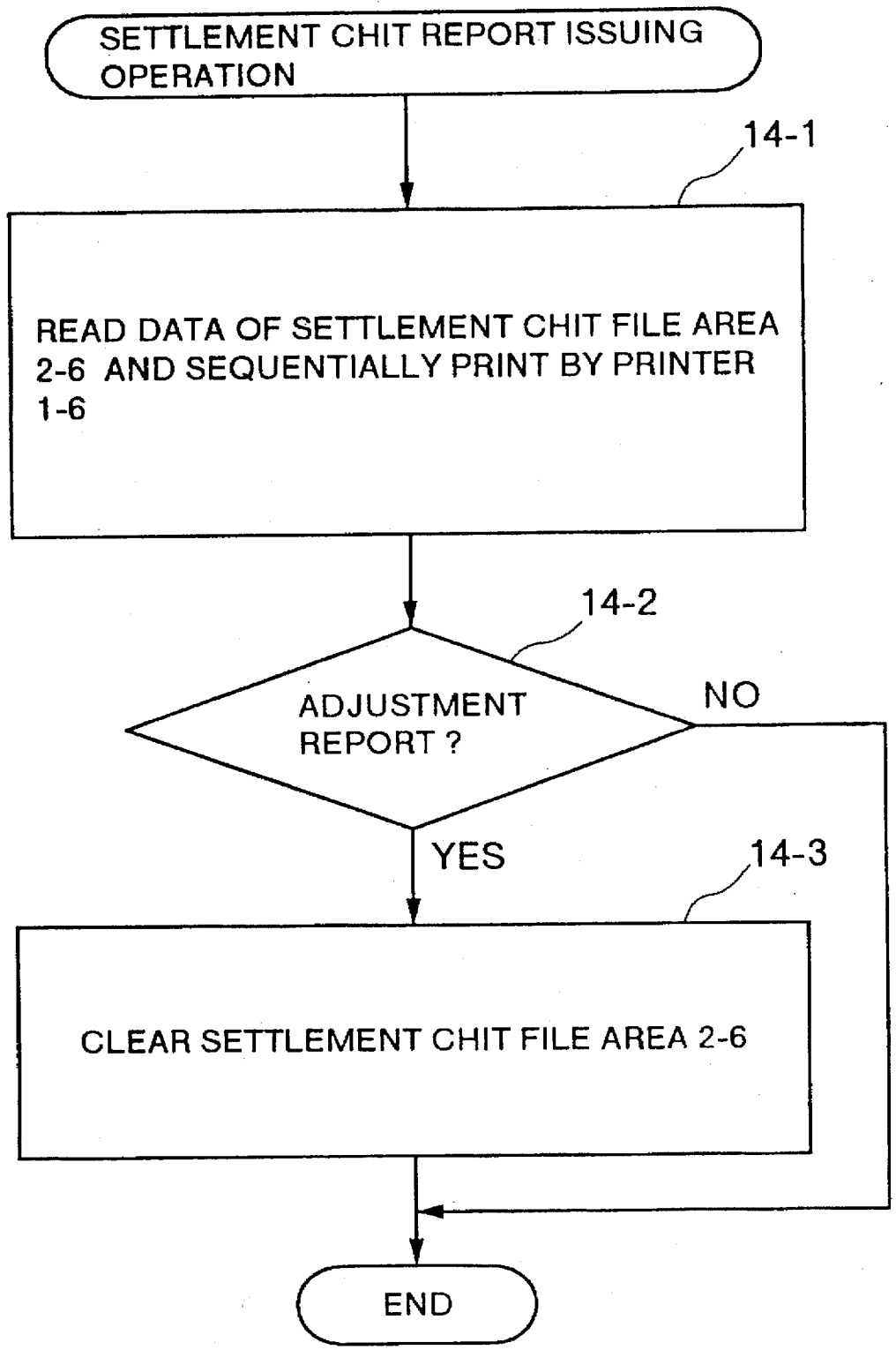
FIG. 14 is a flowchart of issuing an adjustment report in the first embodiment of the present invention.

An explanation will next be made as to the report issuing operation of the settlement chit information in the manager mode. FIG. 14 shows a flowchart for explaining the above report issuing operation. When the mode MGR of the register is specified with use of the mode switch 1-2, such a transaction menu of the manager mode as shown in FIG. 9 is displayed including such messages as '1. Inspection Report' and '2. Adjustment Report'. When the operator depresses the "1" and the key "TOTAL" on the keyboard 1-1, this causes the inspection report task is selected and such an inspection report menu as shown in FIG. 10 is displayed together with inspection objective items added by numbers including '1. Register Report' and '2. Time Report'. Subsequently, when the operator depresses the keys "12" and "TOTAL", the report issuing operation of the settlement chit (closed chit) information is selected so that settlement chit information (closed chits) are sequentially read out from the settlement chit file area 2-6 and issued from the printer 1-6 in the form of such a closed chit report as shown in FIG. 15 (step 14-1). When the adjustment report task is selected in place of the inspection report task in the above key operation (step 14-2), a closed chit report similar to the above is issued, in which case the settlement chit file area 2-6 is cleared after the issuance of the report (step 14-3).

A memory medium for the processing programs of the operation controller 1-3 may comprise any type of memory medium such as a floppy disk in addition to a read-only memory (ROM).

(Embodiment 2)

An explanation will then be made as to a second embodiment of the present invention wherein a new control function is added when the settlement chit file area becomes full during the settlement key operation in the first embodiment.

Figure 16:
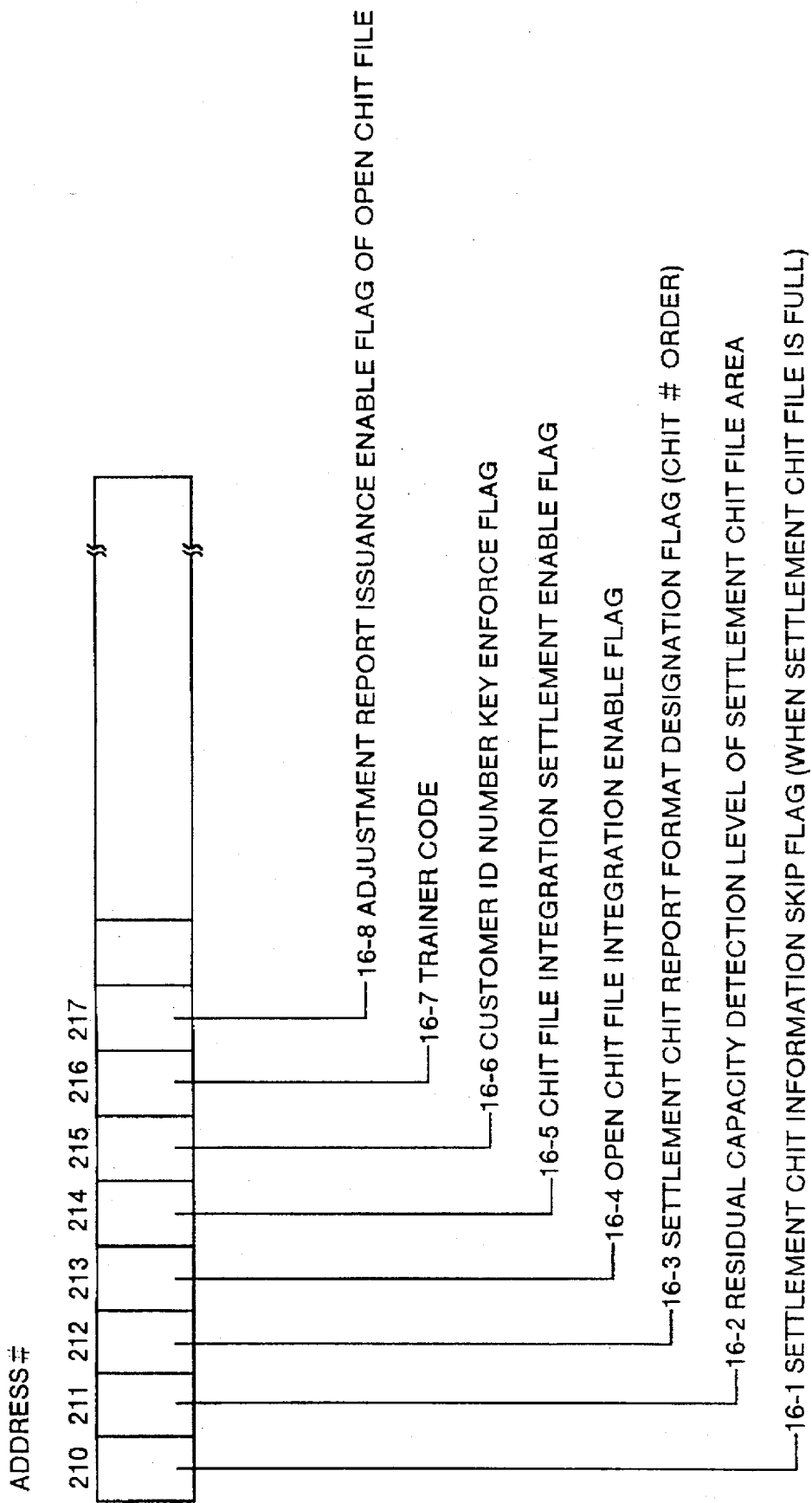
FIG. 16 is a structure of closed chit file control information setting area in the control information setting file of the present invention.

FIG. 16 shows the structure of a chit file control information setting area provided within the control information setting file 2-2, in which a settlement chit information store/skip flag if the settlement chit file area become full is set at address #210 (16-1). A residential capacity detection level of the settlement chit file area is stored at address #211 (16-2), a settlement chit report format designation flag (chit # order) is stored at address #212 (16-3), an open chit file integration enable flag is stored at address #213 (16-4), a chit file integration settlement enable flag is stored at address #214 (16-5), a customer ID number key enforcement flag is stored at address #215 (16-6), a trainer code is stored at address #216 (16-7), and an adjustment report issuance enable flag for an open chit file is stored at address #217 (16-8).

Figure 17:
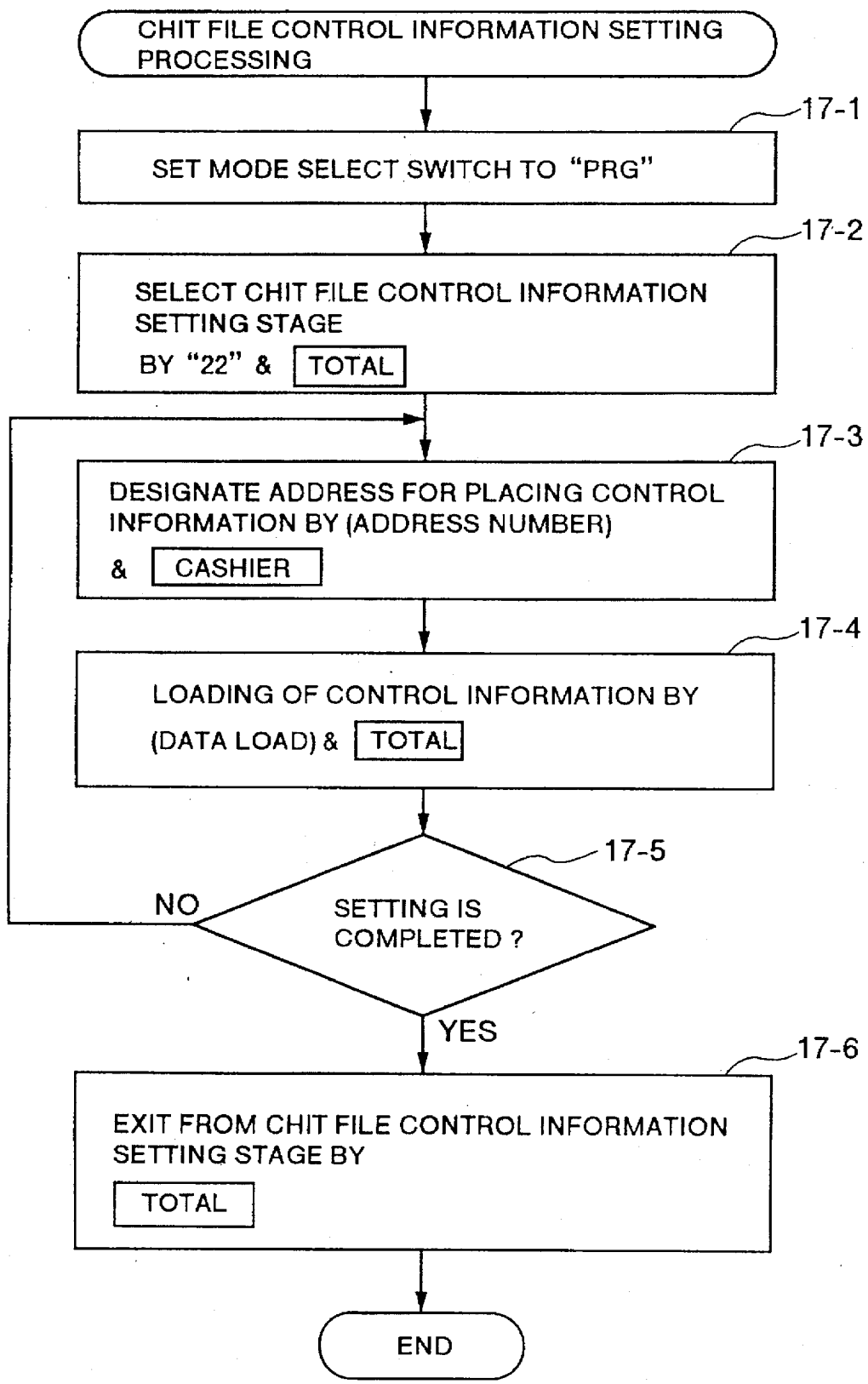
FIG. 17 is a flowchart for setting chit file control information in a second embodiment of the present invention.

Shown in FIG. 17 is a flowchart for explaining how to set data in the chit file control information setting area shown in FIG. 16. Secured within the control information setting file 2-2 is an area for setting various sorts of chit file control information having such a structure as shown in FIG. 16, which information are marked of with address numbers as was mentioned above. When the operation of the register is set in the set mode PRG with use of the mode switch 1-2 (step 17-1), such a task menu in the set mode as shown in FIG. 8 is displayed. When the operator depresses the keys "22" and "TOTAL" on the keyboard 1-1, the chit file control information setting stage 22 is selected (step 17-2). After this, the operator's subsequent operation of the keys "210" and "CASHIER" causes the address #210 (16-1) of the chit file control information setting area in FIG. 16 to be assigned (step 17-3). Subsequent operation of keys corresponding to 'set data' and the key "TOTAL" causes the settlement chit information store/skip flag to be set if the settlement chit file area has become full (step 17-4). If the above key operation is repeated with the address number changed, data corresponding to the each address number is set. After completion of the setting of the present data (step 17-5), depression of the key "TOTAL" results in that the register goes out from the present set stage (step 17-6).

Figure 20:
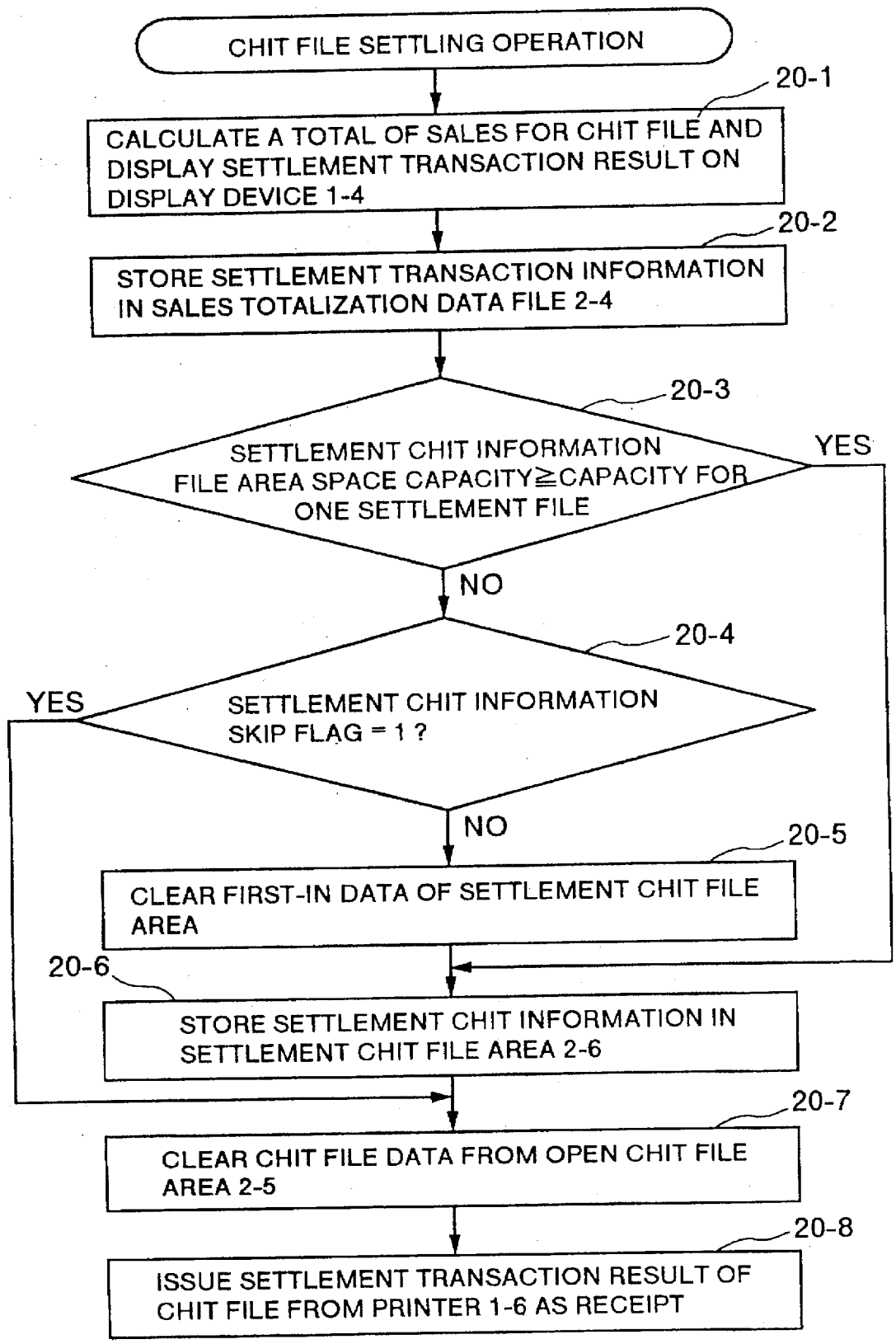
FIG. 20 is a flowchart for explaining chit file settling operation in the second embodiment of the present invention.
Figure 21:
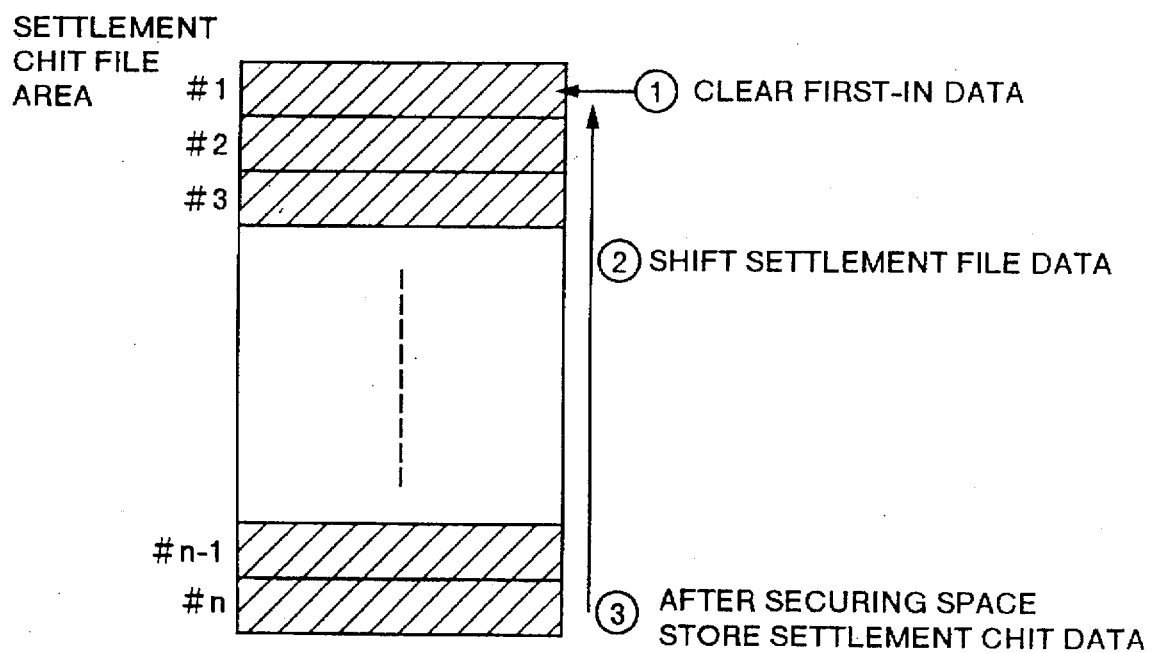
FIG. 21 is a diagram for explaining clearing operation first-in data and securing operation of a space in the chit file area in the second embodiment of the present invention.

Next, an explanation will be made as to the operation of the above settlement chit information store/skip flag in the registration mode of the register by referring to the flowchart of FIG. 20. After the chit file in question is recalled from the chit file area 2-5 to the work area 2-7, depression of the settlement key on the keyboard 1-1 causes the total amount of sales to be calculated with regard to the chit file of the open chit file area 2-5. After the calculation, a settlement result is displayed on the display device 1-4 (step 20-1) and its settlement transaction information is stored in the sales totalization file 2-4 (step 20-2). The settlement chit information is also stored in the settlement chit file area 2-6 and the corresponding chit file information of the chit file area 2-5 is cleared, at which stage it is judged whether or not there is a space enough to store therein the corresponding settlement chit information in the settlement chit file area 2-6 (step 20-3). Since the space capacity of the settlement chit file is recorded in the space capacity storage area 19A-6 provided in the work area 2-7, the space capacity is compared with the memory capacity per closed file for settlement chit information. When the data of the space capacity storage area 19A-6 exceeds the memory capacity per closed file, the settlement chit information is stored in the settlement chit file area 2-6 as it is (step 20-6). When the data of the space capacity storage area 19A-6 is smaller than the memory capacity per closed file, the register judges to be the settlement chit information store/skip flag 16-1 (step 20-4). When the present flag is set, the storage of the settlement chit information in question is skipped. When the present flag is not set, the first-in settlement chit information data is discarded to secure a space (step 20-5) and to store the corresponding settlement chit information (step 20-6) as shown in FIG. 21, which shows storage areas #1 through #n in the settlement chit file area, n being the settlement chit file capacity. Arrow 21-1 points to first-in data that is cleared and arrow 21-2 indicates that the remaining data is shifted in the direction of arrow 21-2 so that new settlement data can be stored as indicated by arrow 21-3 after space is secured. After the corresponding chit file data is cleared from the open chit file area 2-5 (step 20-7), a settlement transaction of the associated chit file is issued from the printer 1-5 in the form of a receipt (step 20-8).

In this way, in accordance with the foregoing second embodiment, when setting of the settlement chit information store/skip flag 16-1 causes the settlement chit file area to become full, how to handle the settlement chit information in the registration settling operation can be selected.

(Embodiment 3)

A third embodiment of the present invention is additionally provided with such a function that the residual capacity of the settlement chit file area is compared with a set value during the settlement key operation of the first embodiment so that, when the residual capacity is smaller than the set value, a message is displayed.

In the structure of the closed chit file control information setting area within the control information setting file 2-2 shown in FIG. 16, a residual capacity detection level of the settlement chit file area is set in the area having an address #211 (16-2). Setting of the present set value is carried out substantially in the same manner as in the method explained in connection with the flowchart of FIG. 17 of the second embodiment.

Figure 22:
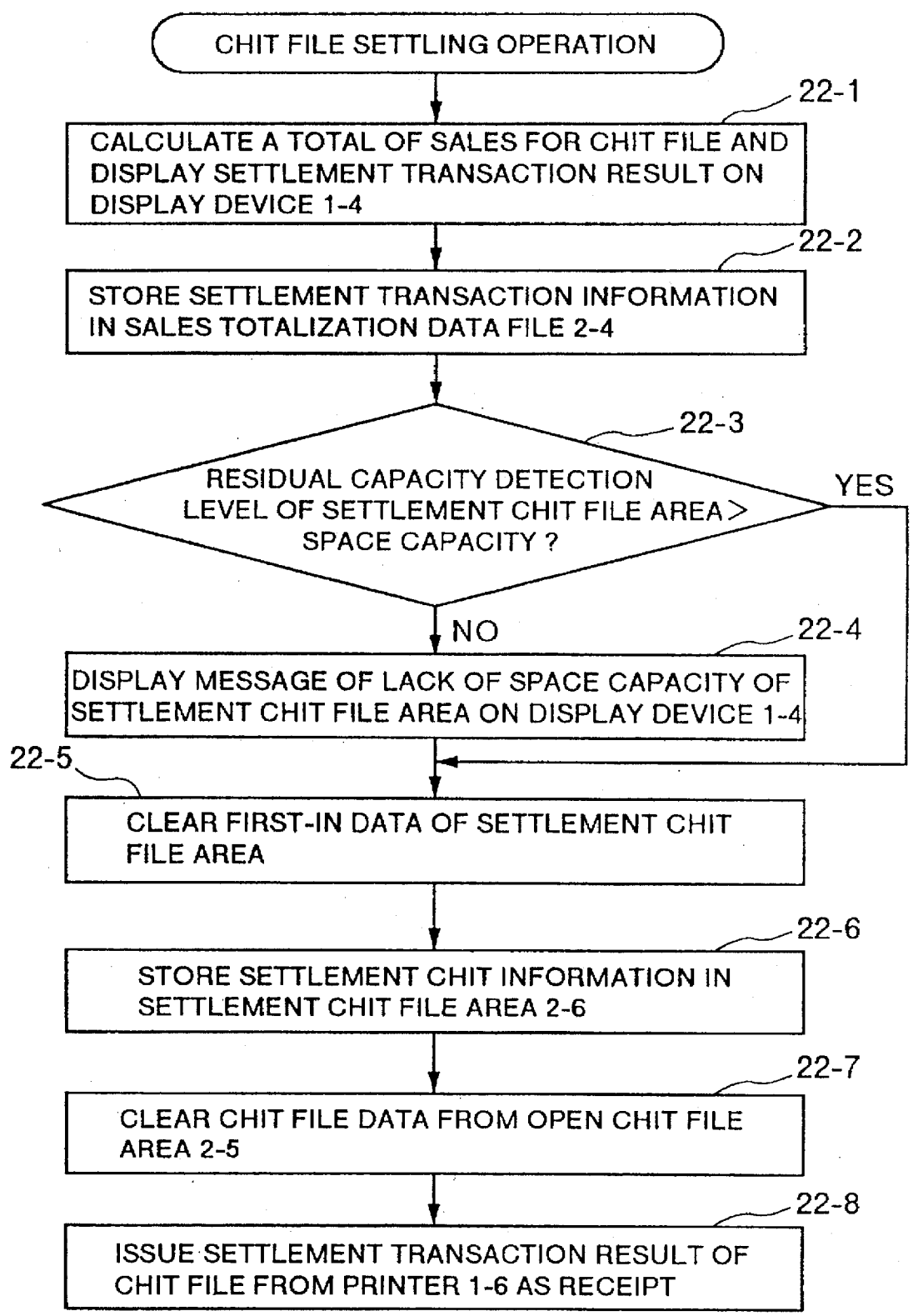
FIG. 22 is a flowchart for explaining chit file settling operation in a third embodiment of the present invention.

Next explanation will be directed to the above message displaying operation during the open chit settlement in the registration mode of the register by referring to the flowchart of FIG. 22. In the drawing, after the chit file in question is recalled from the open chit file area 2-5 to the work area 2-7, the depression of the settlement key on the keyboard 1-1 causes the total amount of sales to be calculated with regard to the chit file of the open chit file area 2-5, which results in that a settlement result is displayed on the display device 1-4 (step 22-1) and also stored in the sales totalization data file 2-4 (step 22-2). Next, the space capacity of the settlement chit file area 2-6 is compared with the set value of the residual capacity detection level of the address #211 (16-2) of FIG. 16 (step 22-3). Since the space capacity of the settlement chit file is stored in the settlement chit file space capacity storage area 19A-6 provided in the work area 2-7, the space capacity is compared with the set value of the address #211 of FIG. 16. When space capacity 19A-6 is larger than the set value 16-2, the register skips to a step 22-5. Whereas, when the space capacity 19A-6 is equal to or smaller than the set value 16-2, an alarm message previously prepared within the register is displayed on the display device 1-4 (step 22-4) and the first-in data of the settlement chit file area 2-6 is cleared (step 22-5), the settlement chit information is stored in the settlement chit file area 2-6 (step 22-6), and then the associated chit file information of the open chit file area 2-5 is cleared (step 22-7). Thereafter, a settlement transaction result of the chit file in question is issued from the printer 1-6 as a receipt (step 22-8).

(Embodiment 4)

A fourth embodiment of a the present invention is directed to selection of format in the management report of settlement chit information in the first embodiment. In the structure of the closed chit file control information setting area within the control information setting file 2-2 shown in FIG. 16, the area having an address #212 (16-3) is used to set therein a report format assignment flag (chit # order) for the settlement chit information. Setting of the present set value is carried out substantially in the same manner as in the method explained in connection with the flowchart of FIG. 17 in the second embodiment. In the open chit settling operation in the registration mode of the register, as in the first embodiment, after the chit file in question is recalled from the chit file area 2-5 to the work area 2-7, depression of the settlement key on the keyboard 1-1 causes the total amount of sales to be calculated with regard to the chit file of the open chit file area 2-5, so that its settlement result is displayed on the display device 1-4. Further, this settlement chit information is stored in the settlement chit file area 2-6 and the associated chit file information of the open chit file area 2-5 is cleared.

Figure 23:
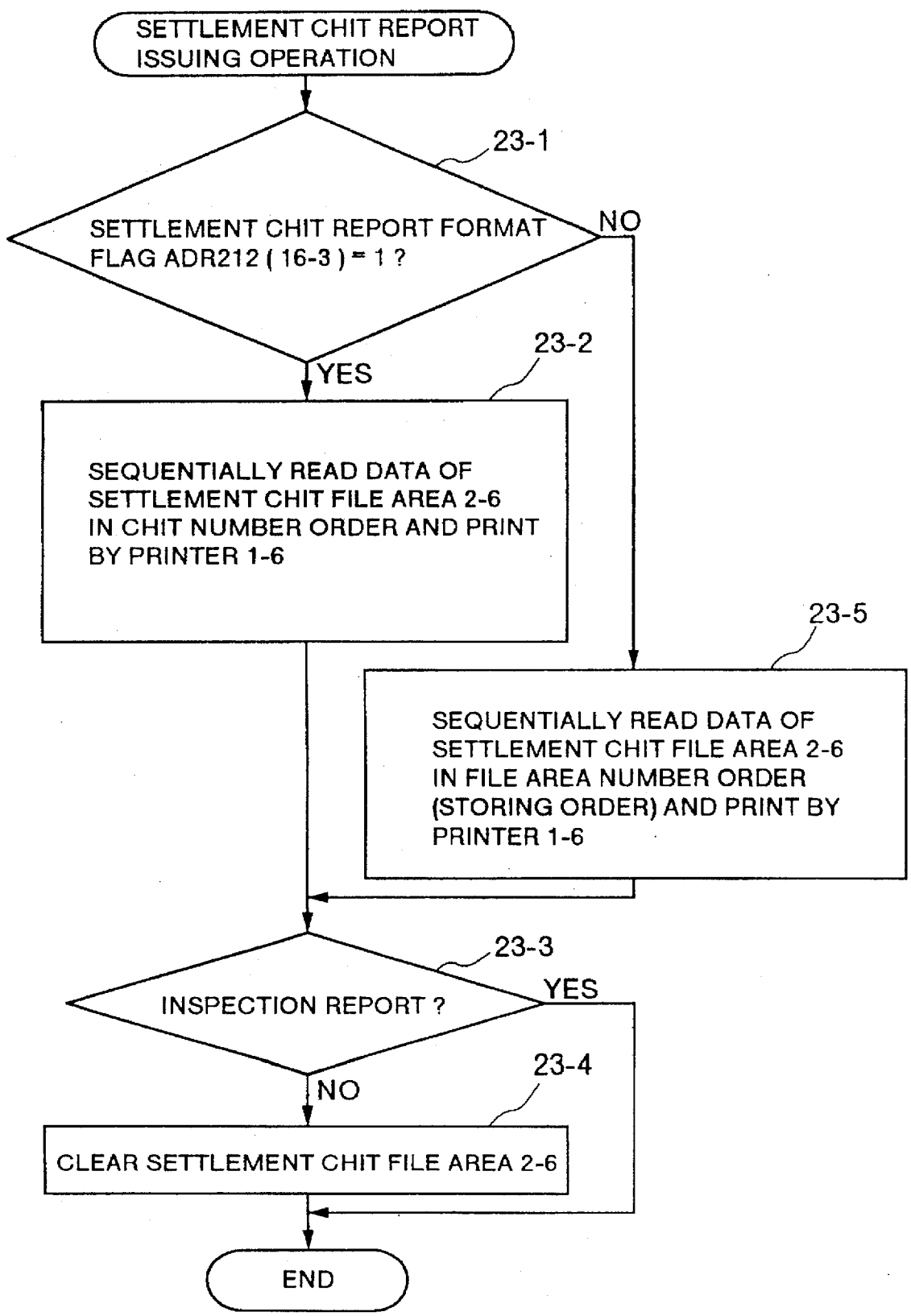
FIG. 23 is a flowchart for explaining chit report issuing operation in a fourth embodiment of the present invention.

Next an explanation will be made as to the report issuing operation of the settlement chit information in the manager MGR mode of the register. FIG. 23 shows a flowchart for explaining the above operation. When the operator specifies the mode MGR in the register with use of the mode switch 1-2, the transaction menu of the manager mode shown in FIG. 9 is displayed. Depression of the keys "1" and "TOTAL" on the keyboard 1-1 causes the inspection report task to be selected so that such an inspection report menu as shown in FIG. 10 appears. Subsequent depression of the keys "12" and "TOTAL" causes the report issuing operation of the settlement chit information (closed chit) to be selected. In this case, the report format assignment flag (chit # order) of the settlement chit information of the address #212 (16-3) is judged (step 23-1). When the address #212 (16-3) is not set, the settlement chit information (closed chits) are sequentially read out as it is from the settlement chit file area 2-6 and issued from the printer 1-6 (step 23-2). In this case, since the settlement chit information are stored in the settlement chit file area 2-6 in the order of generation (in the closed-time order of the same report), a closed chit report having such a format (settlement chit generation order) as shown in FIG. 24 is issued. As is pointed out by arrows 24-1 and 24-2, the settlement information is printed in the order of settlement (time closed). Meanwhile, when the address #212 (16-3) is set, the settlement chit information (closed chits) are sequentially sorted in an increasing chit number order from the settlement chit file area 2-6 and issued from the printer 1-6 (step 23-5). The closed chit report of this case has the format shown in FIG. 25 arranged in order of chit number. As is pointed out by arrows 25-1 and 25-2, the settlement information is printed in chit number order. When the operator designates the settlement report task instead of the inspection report task in step 23-3, the closed chit report is issued in the same format and the settlement chit file area 2-6 is cleared after issuance of the report (step 23-4). In this case, in order to distinguish the inspection report from the adjustment report, an identification symbol or message may be printed on the report.

(Embodiment 5)

Figure 26:
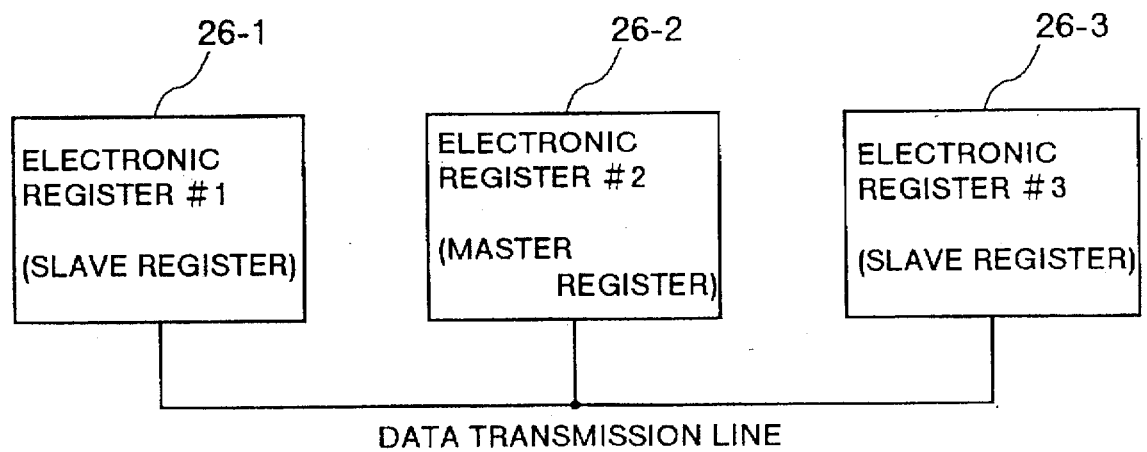
FIG. 26 is an arrangement of a system having a plurality of electronic registers interconnected one another in a fifth embodiment of the present invention.

FIG. 26 shows a system in accordance with a fifth embodiment of the present invention which comprises a plurality of registers such as, for example, slave registers #1 and #3 and a master register #2 connected one another through a data transmission line 26-1, and wherein any of the registers can issue a customer chit file, perform a temporarily closing operation (storing operation), a calling operation (recalling operation), an additional article registering operation and a settlement chit operation, and also which can output the present settlement chit information to the display device or printer as a sales management report.

Figure 27:
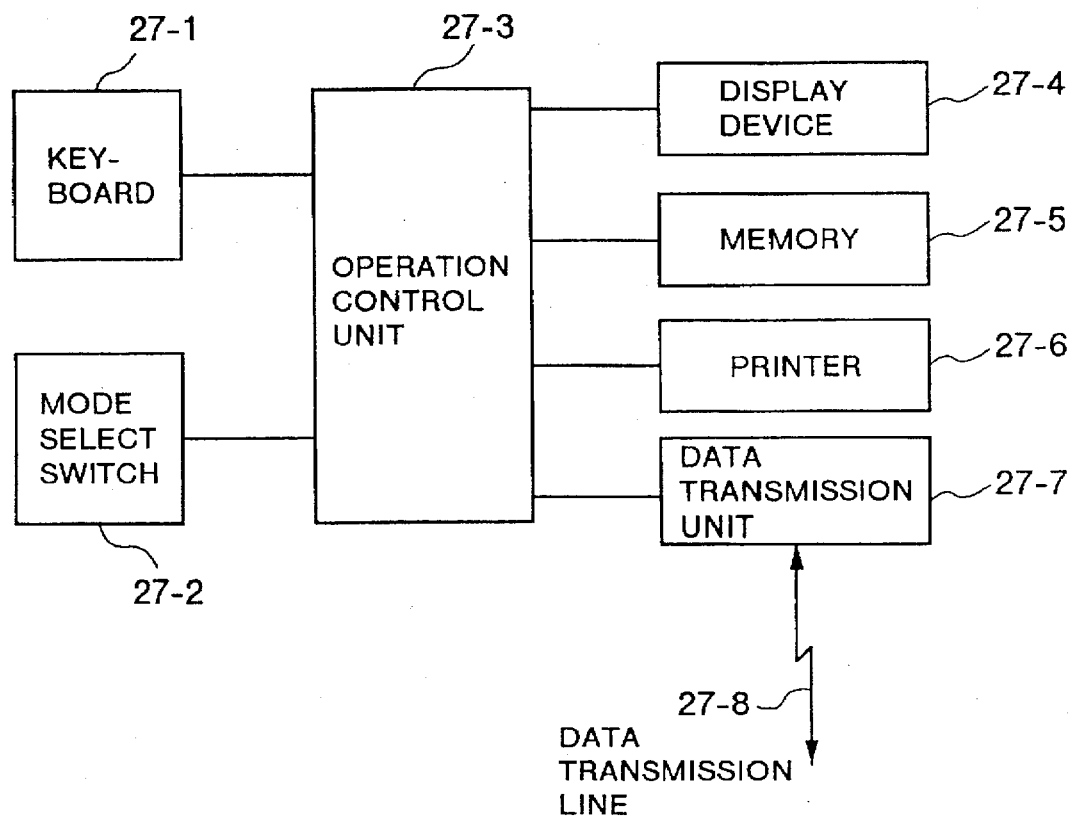
FIG. 27 is a block diagram of one of the electronic registers in the fifth embodiment of the present invention.

FIG. 27 is a block diagram of one of the electronic registers for use in the present embodiment. The present electronic register of FIG. 27 corresponds to the arrangement of the electronic register of the first embodiment of FIG. 1 but a data transmission unit 27-7 is additionally provided for transmitting such data as a chit file via the data transmission line 26-1.

Figure 28:
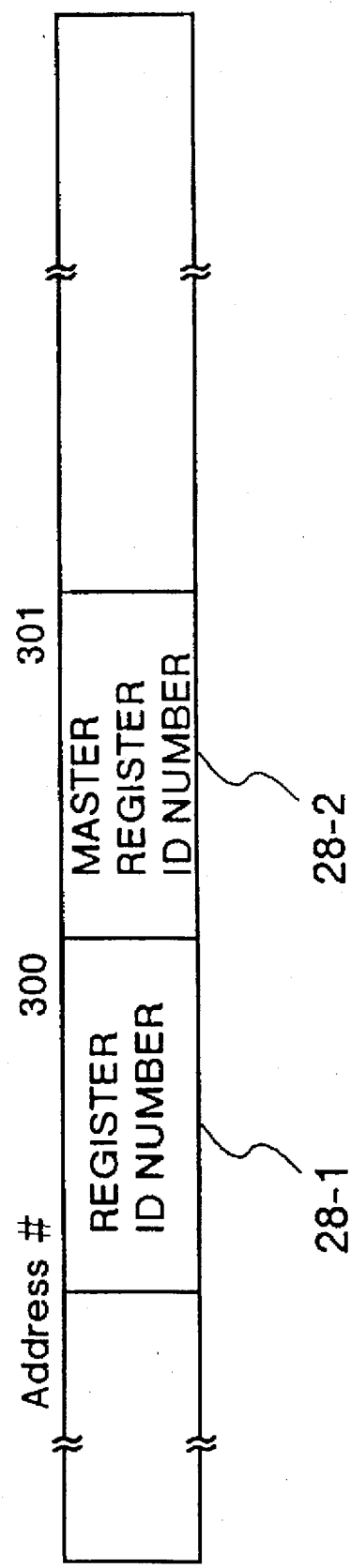
FIG. 28 is a structure of an area for setting of a register number and a master register number within a control information setting file in the fifth embodiment of the present invention.

Shown in FIG. 28 is a structure of register number and master register number setting areas, etc. provided within a control information setting file 29-2 of each register, in which a register number is set at an address #300 and a master register number is set at an address #301. Data setting to these areas 28-1 and 28-2 is carried out substantially the same manner as in the flowchart of FIG. 17 in the second embodiment. In this connection, the word "master register number" refers to the one of the plurality of registers which uses both of the open and settlement chit files, and which corresponds in FIG. 26 to the electronic register #2 (26-2).

Figure 29:
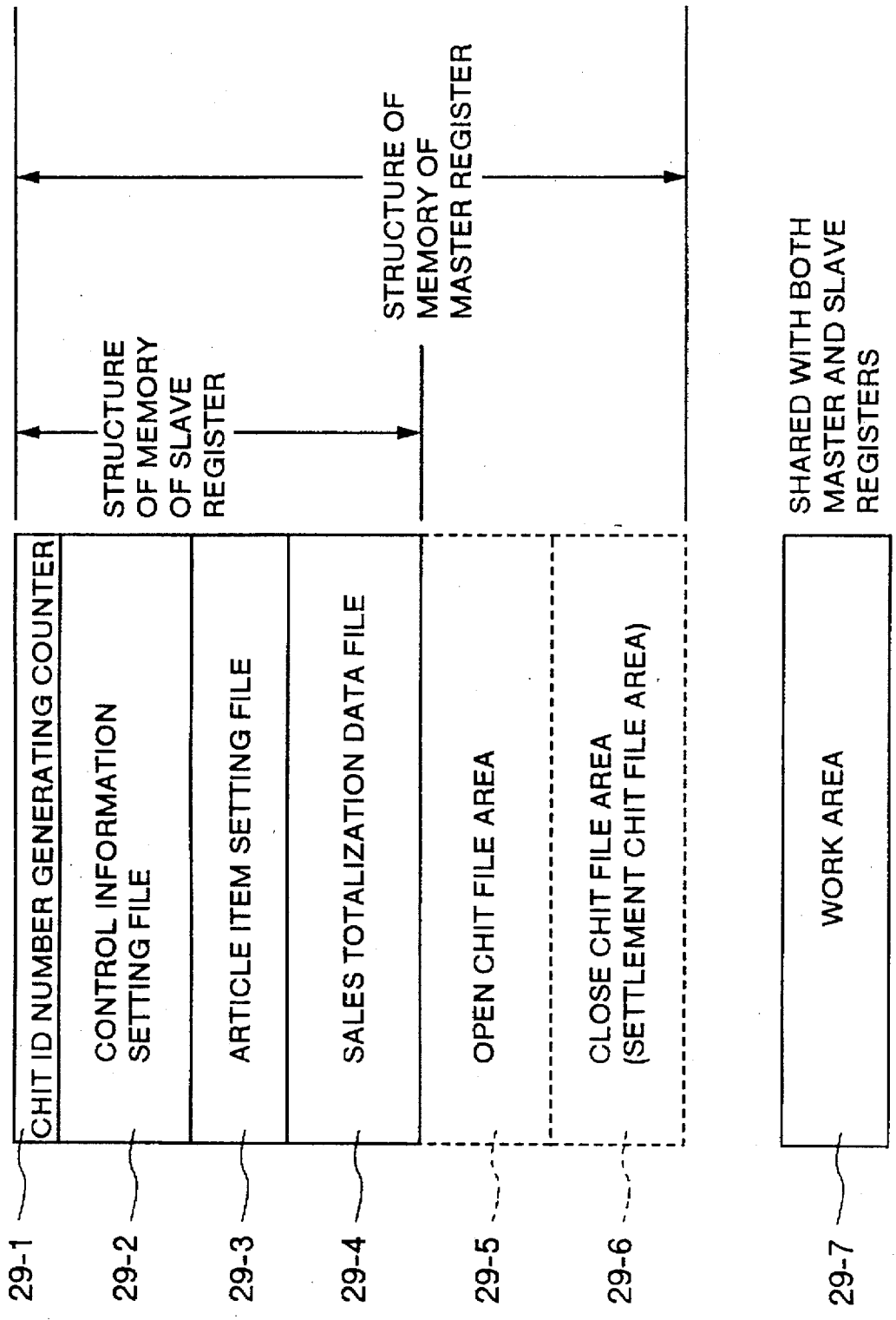
FIG. 29 is a structure of a memory of slave and master registers in the fifth embodiment of the present invention.

FIG. 29 is a structure of a memory 27-5 which, in the case of the master register, is similar to FIG. 2 of the first embodiment, that is, which has a chit number issuance counter 29-1, a control information setting file 29-2, an article item setting file 29-3, a sales totalization data file 29-4, an open chit file area 29-5, and a close chit (settlement chit) file area 29-6. Arrow 29-8 corresponds to the memory structure of the master register. The slave register has the chit number issuance counter 29-1, control information setting file 29-2, article item setting file 29-3 and sales totalization data file 29-4, commonly to the master register. Arrow 29-9 corresponds to the memory structure of the slave register. Reference numeral 29-7 denotes a work area which is shared with the master and slave registers. In the master register, in accordance with the flowchart of FIG. 7, a registration item number per chit file is set at the address #111 in the chit file constituent element setting area of the structure of FIG. 6, a chit file number (open chit number) handleable by the register is set at the address #112, and a settlement chit file number (closed chit number) handleable by the register is set at the address #113, respectively. Through the present setting operation that is the same as described in the first embodiment, the open chit file area 27-5 of the master register is determined to have such a structure as shown in FIG. 4 and the closed chit file area 27-6 is determined to have such a structure as shown in FIG. 5A.

Figure 30:
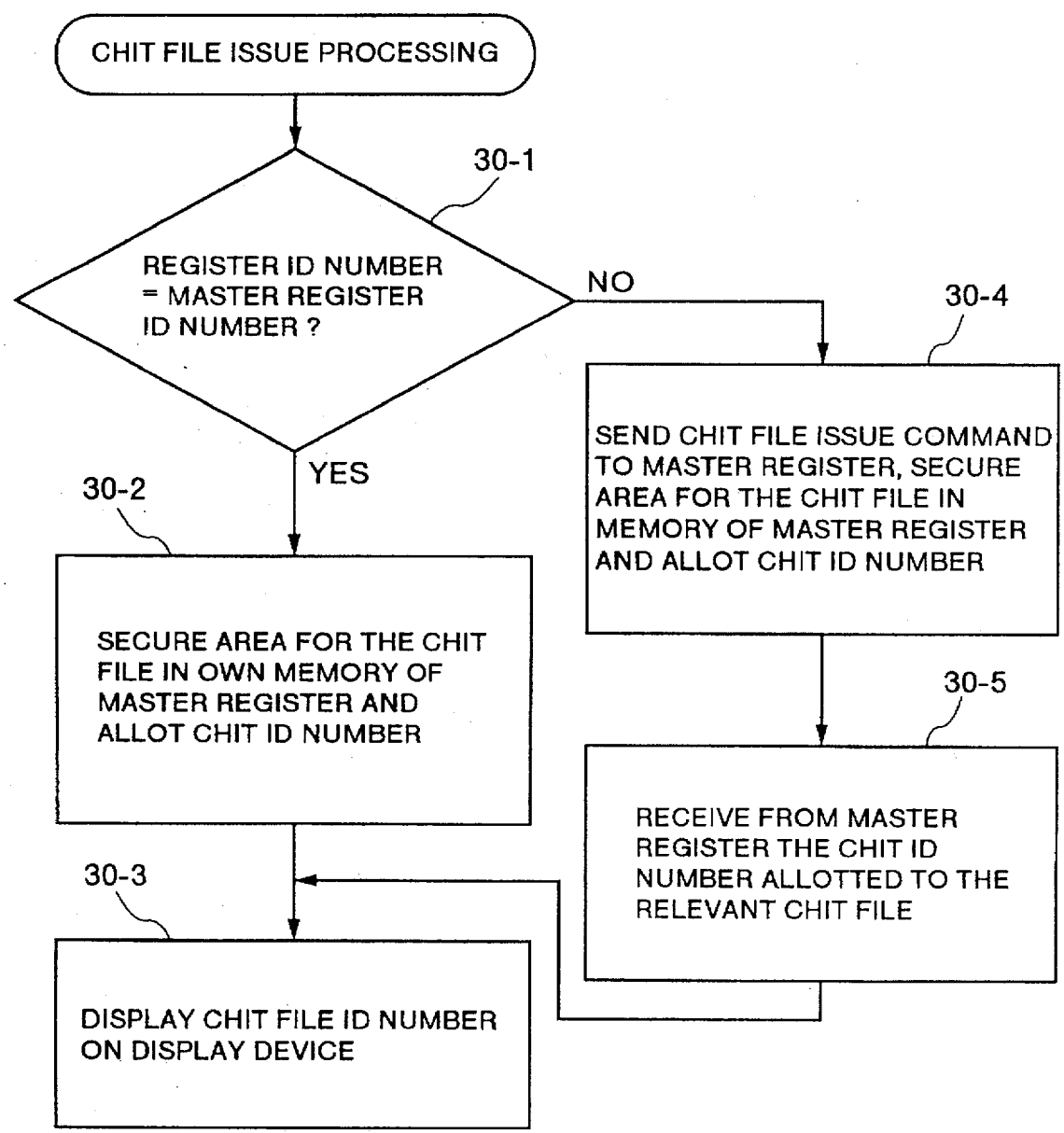
FIG. 30 is a flowchart for explaining chit file issuing operation in the system of the fifth embodiment of the invention having the plurality of electronic registers interconnected one another.

Next, an explanation will be made as to the chit issuing operation in the registration mode of the register. Referring to FIG. 30 showing a flowchart of the chit issuing operation, when the chit issuance key on the keyboard 1-1 is operated, the register number 28-1 having the address #300 provided within its own control information setting file 29-2 is compared with a master register number 28-2 having the address #301 for judgement (step 30-1). When the register number is the same as the master register number, it is checked whether or not there exists an empty file not applied by a chit number with respect to the chit file of the chit file area 29-5 of its own memory. In the absence of an empty file, the operation of the above chit issuance key is made invalid and an error message is displayed. In the presence of the an empty file, "1" is added to the chit number issuance counter 29-1 and the present number is stored in the chit number area 4-1 of the above empty file (step 30-2). Further, the present chit number is displayed on the display device 27-4 (step 30-3). When the master register number 28-2 is not the same as the register number (28-1), a chit file issuance command is sent to the register of the master register number via the above transmission unit 27-7, and it is checked whether or not there exists an empty file not applied by a chit number with respect to the chit file of the chit file area 27-5 of the master register memory. In the absence of an empty file, the present information is sent from the master egister to the corresponding slave register through the above transmission unit 27-7. The slave egister, when receiving the information having no empty file, invalidates the operation of the chit issuance key and displays an error message. In the presence of an empty file, the master register adds "1" to the chit number issuance counter 29-1 and stores the present number in the chit number area 4-1 of the above empty file (step 30-4). Further, the present chit number is sent from the master register to the slave register through the above transmission unit 27-7. The slave register, when receiving the present chit number (step 30-5), displays the received chit number on the display device 27-4 (step 30-3). Even in the operation of the store and recall keys, similarly to the operation of the above chit file issuance key, it is judged whether or not the number of the master register is the same as its own register number. If the master register number is the same as its own register number, the master register performs operation over the associated customer chit file within its own memory. If the master register number is not the same as its own register number, the master register performs operation over its own associated customer chit file through the transmission unit. In this way, in the integrated system having the plurality of registers, any of the registers issues the customer chit file, and performs temporary closing operations (storing operations), calling operations (recalling operations) and additional article registering operations.

Figure 31:
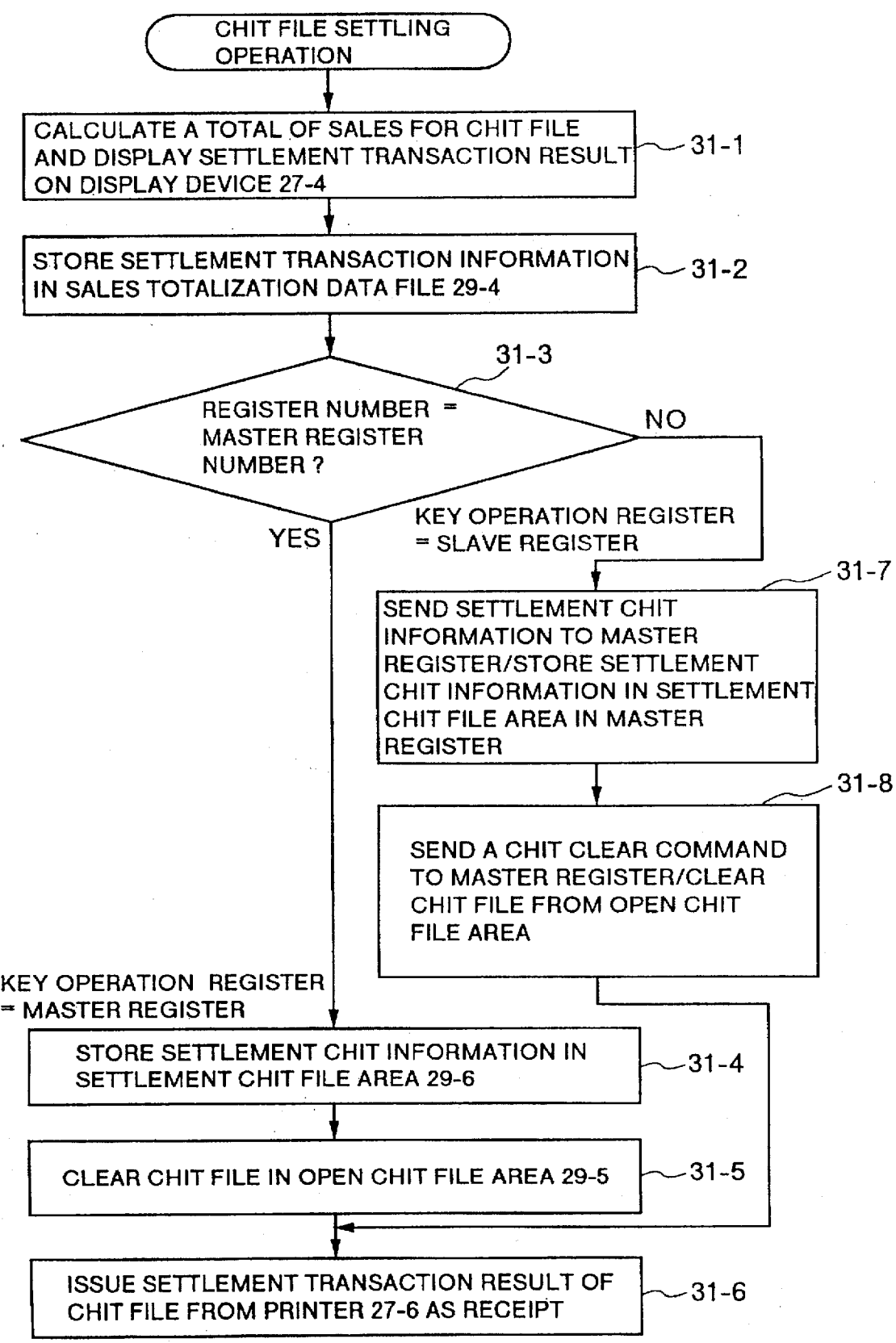
FIG. 31 is a flowchart for explaining chit file settling operation in the fifth embodiment of the present invention.

FIG. 31 shows a flowchart for explaining the chit settling operation. More specifically, when the operator depresses the settlement key on the keyboard 1-1 over the open chit recalled through the above operation, a total amount of sales for article items registered in the associated customer chit file is calculated, outputted to the display device 27-4 of the associated register (step 31-1), and stored in the sales totalization data file 29-4 (step 31-2). Next, the register number 28-1 having the address #300 provided within its own control information setting file 29-2 is compared with the master register number 28-2 having the address #301 for judgement (step 31-3). When the comparison difference result is zero, the chit information on the associated chit is stored in the settled chit file area 29-6 of its own memory (step 31-4), the associated customer chit file information of the open chit file area 29-5 of its own memory is cleared (step 31-5), and the settlement transaction result of the associated chit file is issued from the printer 27-6 in the form of a receipt (step 31-6). When the master register number 28-2 is not the same as the register number 28-1, a clear command for the associated open chit file and a settlement information store command for the chit are sent through the transmission unit 27-7 to the register having the master register number. The master register stores the settlement information on the corresponding chit in the settlement chit file area 29-6 of its own memory (step 31-7), and clears the associated chit file information of the open chit file area 29-5 of its own memory (step 31-8).

Figure 32:
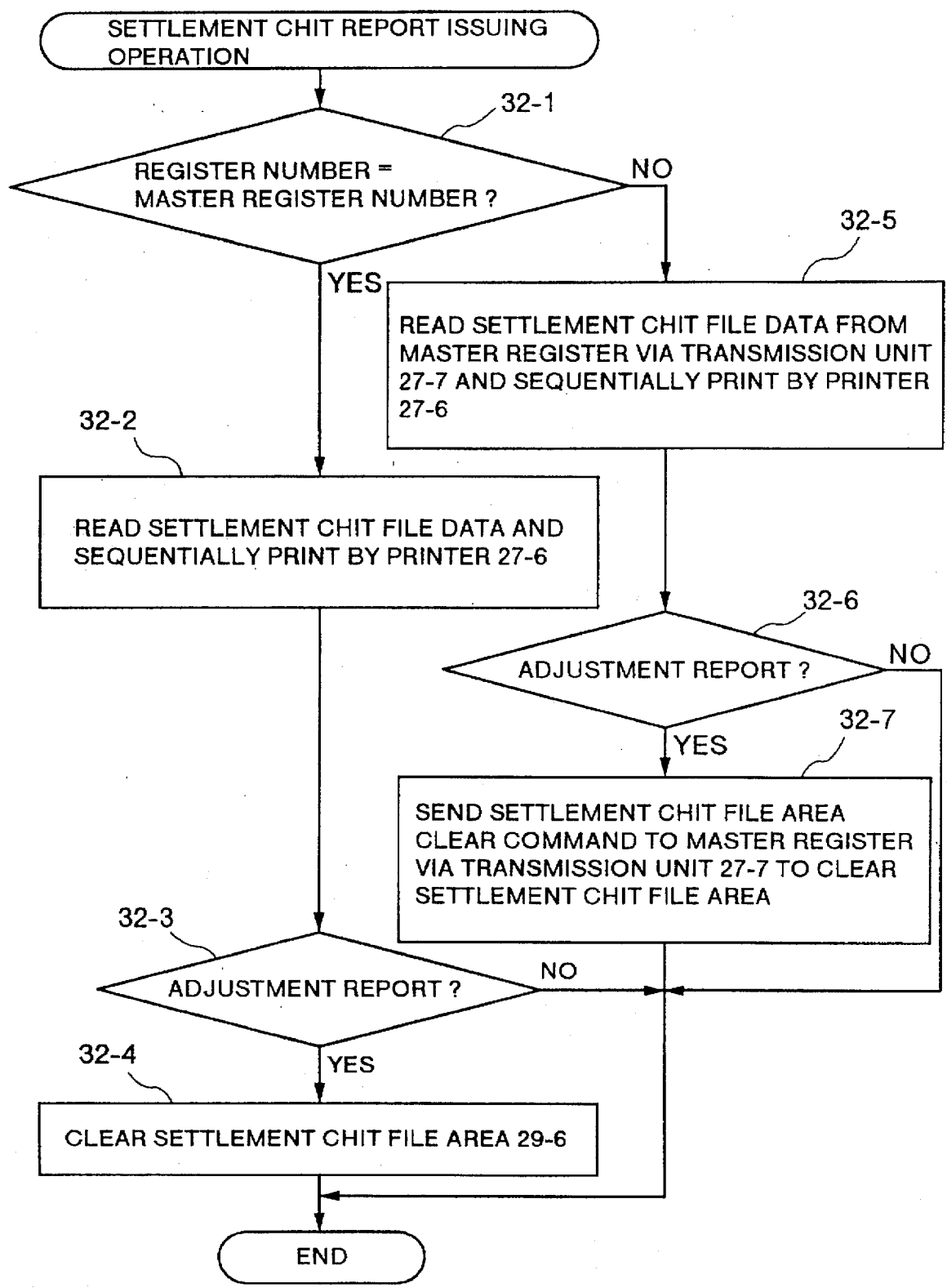
FIG. 32 is a flowchart for explaining chit report issuing operation in the fifth embodiment of the present invention.

An explanation will next be made as to the report issuing operation of the settlement chit information in the manger MGR mode of the register. The present operation is shown by a flowchart in FIG. 32. When the operator specifies the mode MGR for the register with use of the mode switch 1-2, such a task menu of the manager mode as shown in FIG. 9 is displayed. Depression of the key "1" and the key "TOTAL" causes selection of the inspection report task, whereby the inspection report menu is displayed as shown in FIG. 10. Subsequently, depression of the keys "12" and "TOTAL" causes selection of the report issuing operation of the settlement chit information (closed chit). At this time, the register number 28-1 having the address #300 provided within its own control information setting file 29-2 is compared with the master register number 28-2 having the address #301 for judgement (step 32-1). When these register numbers are the same, the settlement chit information are sequentially read out from the close chit file area 29-6 of its own memory and issued from the printer 27-6 as a report (step 32-2). When the master register 28-2 is not the same as the register number 28-1, settlement chit information read command is sent through the above transmission unit 27-7 to the register having the master register number. The master register, after receiving the above command, transmits the data of the closed chit file area 29-6 of its own memory to the corresponding slave register. The slave register issues the received settlement chit information from the printer 27-6 as a close chit report (step 32-5). When the above key operation causes selection of the adjustment report task in place of the inspection report task (steps 32-3 and 32-6), a closed chit report similar to the above is issued, but in this case the settlement chit file area 29-6 is cleared (step 32-4), and after issuing the report, the settlement chit file area 29-6 is cleared (step 32-7).

(Embodiment 6)

A sixth embodiment of the present invention is directed to the function of integrating a plurality of open chit files subjected to the registering operation to produce a single open chit file and storing the single open chit file.

In the structure of the closed chit file control information setting area of the control information setting file 2-2 of FIG. 16, an area 16-4 having an address #213 is for setting therein a flag for permitting integration of open chit files. Setting of the present set value is carried out substantially in the same manner as a method explained in connection with the flowchart of FIG. 17 in the second embodiment.

Figure 33:
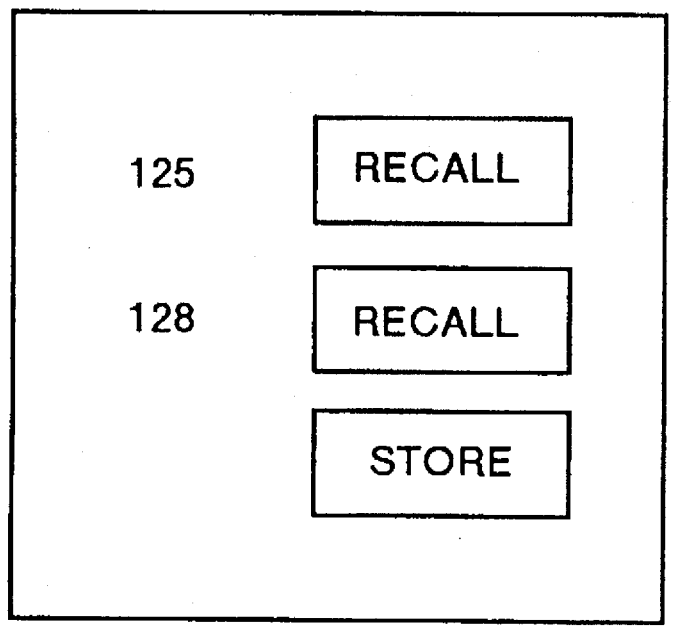
FIG. 33 shows an example of key manipulation for chit file integrating operation in a sixth embodiment of the present invention.

FIG. 33 shows an example of the key operations for integrating open chits #125 and #128 already subjected to the registering operation into the open chit #125. More in detail, when the operator first depresses numeric keys corresponding to the chit number 125 and then the recall key, the operation explained in the first embodiment causes the registration data of the chit file #125 to be read from the open chit area 2-5 to the work area 2-7 and also displayed on the display device 1-4. Subsequently, when the operator operates numeric keys corresponding to the chit number 128 and then the recall key, this causes the integration enable flag set at the area 16-4 having the address #213 to be judged. When the integration enable flag is OFF, the recalling operation of the chit number 1128 is inhibited and a corresponding message is displayed. In this case, integration of the open chit files is inhibited. When the integration enable flag is ON, the registration data of the chit file #128 is read from the open chit area 2-5 to the work area 2-7 so that the read data is integrated to the registration data of the chit file #125 already read. At this time, depression of the store key causes the present integrated data to be stored in the open chit file area 2-5 as the data of the open chit file #125. Further, the open chit file #128 is cleared and the present data is stored in the settlement chit file area 2-6 as integration information to be integrated.

Figure 34:
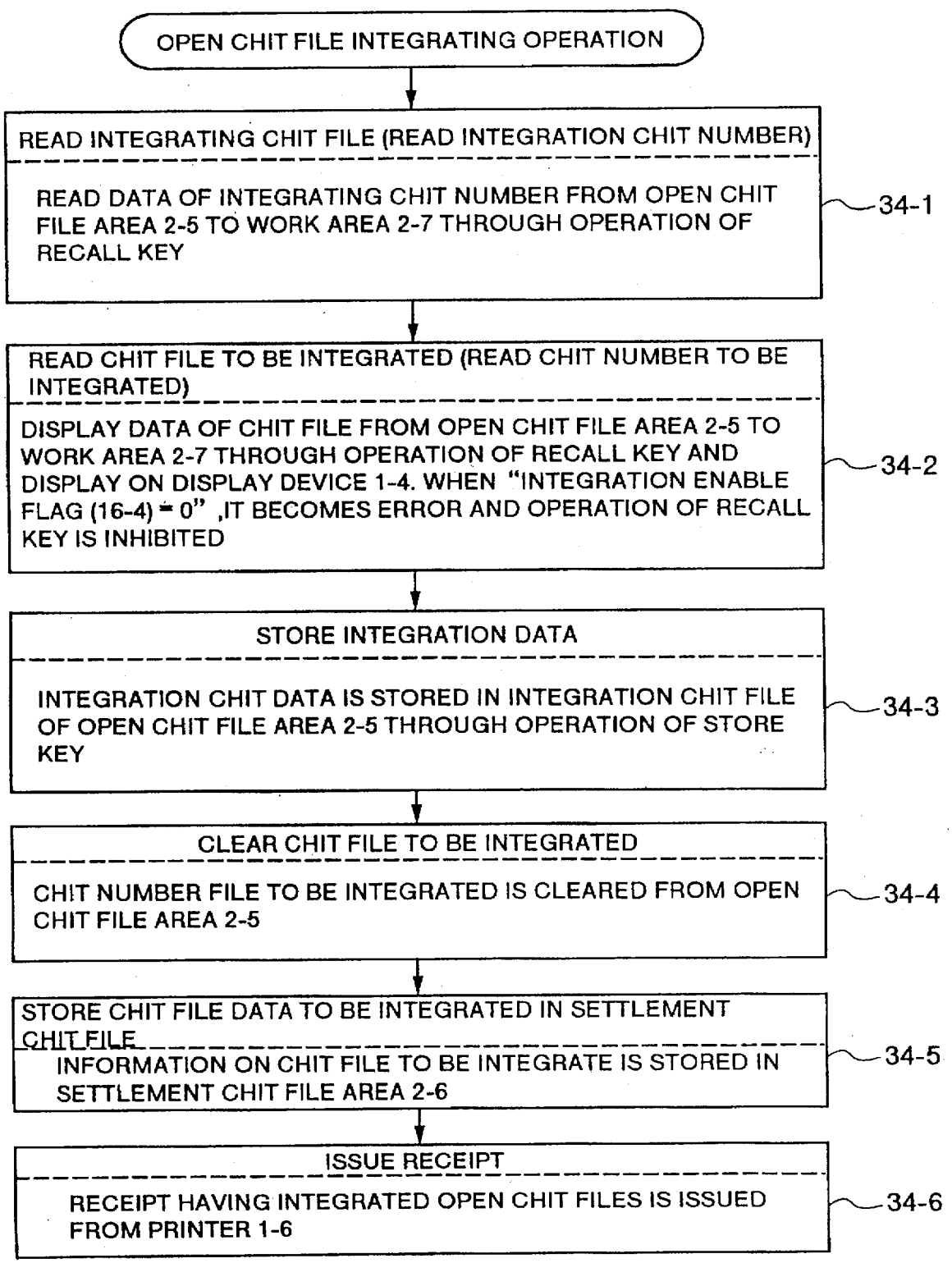
FIG. 34 is a flowchart for explaining an open chit file integrating operation in the sixth embodiment of the present invention.
Figures 36, 37:
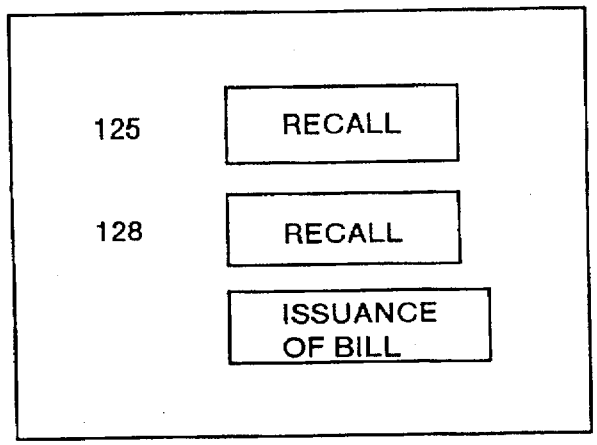
FIG. 36 shows an example of a receipt in the open chit integrating operation in the sixth embodiment of the present invention.
FIG. 37 shows an example of key manipulation for chit file integrating/settling operation in a seventh embodiment of the present invention.

FIG. 34 is a flowchart for explaining the aforementioned open chit files integrating operation, and FIG. 35 is an example of a close chit report issued from the printer 1-6 through the close chit report issuing operation similar to in the first embodiment. In FIG. 35, 'TRANS' (see arrow 35-1) and 'GCK #125' (see arrow 35-2) are printed for items 'TOTAL' and 'PAYMENT' for the chit file #128, and this means that the chit file of GCK #128 was integrated to the GCK #125. FIG. 36 is an example of a receipt issued from the printer 1-6 during the above open chit files integrating operation.

(Embodiment 7)

A seventh embodiment of the present invention is directed to the function of integrating a plurality of open chit files subjected to the registering operation for settlement.

In the structure of the close chit file control information setting area of the control information setting file 2-2 of FIG. 16, an area 16-5 having an address #214 is used for setting therein a flag for permitting integration of open chit files. Setting of the present set value is carried out substantially in the same manner as the method explained in connection with the flowchart of FIG. 17 in the second embodiment.

Shown in FIG. 37 is an example of the key operations for integration of the open chits #125 and #128 already subjected to the registering operation for settlement. When the operator first depresses keys corresponding to the chit number 125 and then the recall key, the operation explained in the first embodiment causes the registration data of the chit file #125 to be read from the open chit area 2-5 to the work area 2-7 and displayed on the display device 1-4. Subsequently, depression of numeric keys corresponding to the chit number 128 and then the recall key causes the integration settlement enable flag set in the area 16-5 of the address #214 to be judged. When the present integration settlement enable flag is OFF, the recalling operation of the chit number 128 is inhibited and the corresponding error message is displayed. In this case, the integration settlement of the open chit files is inhibited. When the above integration settlement enable flag is ON, the registration data of the chit file #128 is read from the open chit area 2-5 to the work area 2-7 and integrated to the registration data of the chit file #125 already read. At this time, when the operator depresses a cash settlement key, the total of the open chit files #125 and #128 is displayed on the display device 1-4 as integration settlement information and the respective files are cleared from the open chit file area 2-5. Further, the above settlement chit information are stored in the settlement chit file area 2-6 respectively as close chit files #125 and #128.

Figure 38:
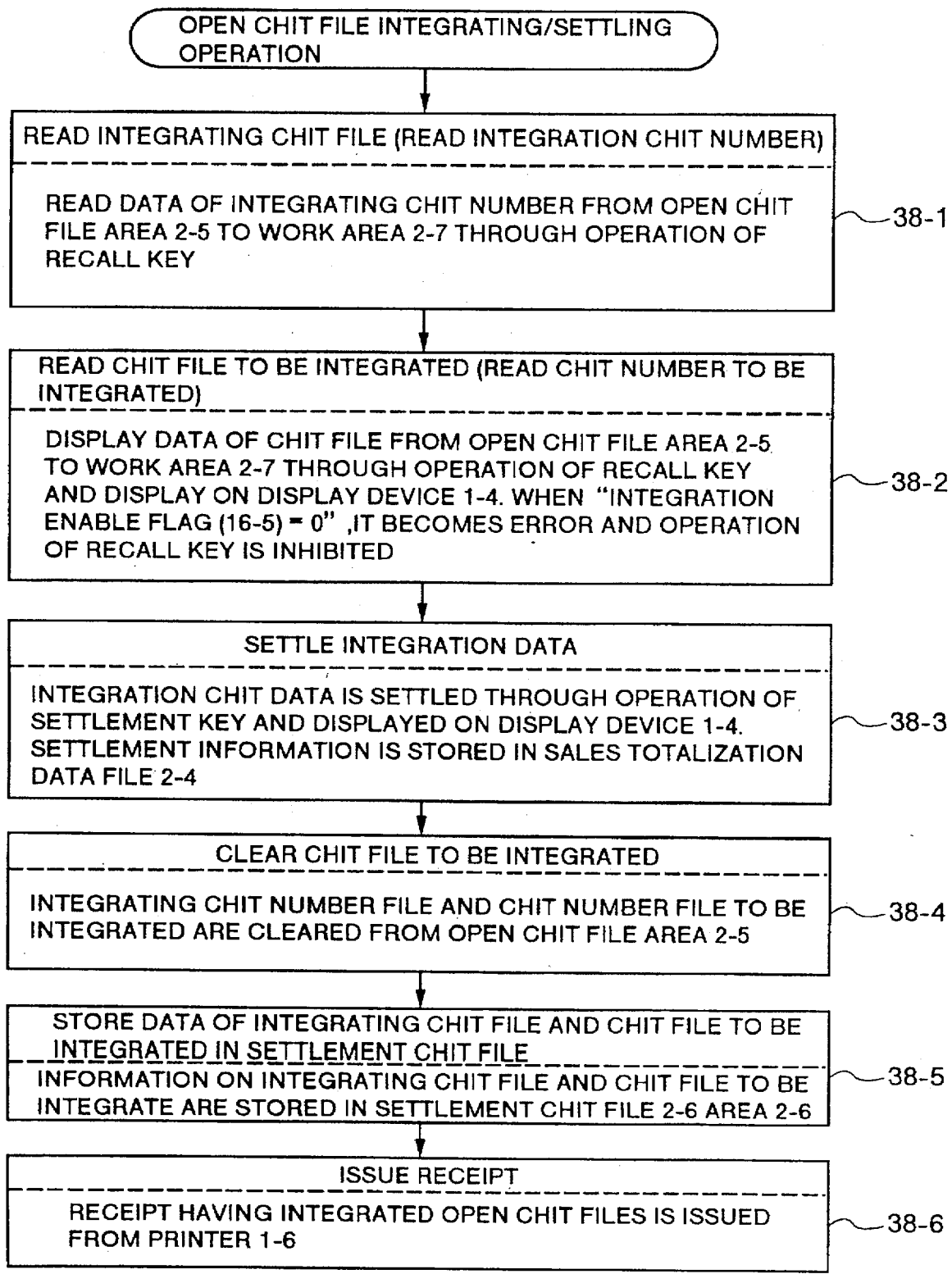
FIG. 38 is a flowchart for explaining the chit file integrating/settling operation in the seventh embodiment of the present invention.

FIG. 38 is a flowchart for explaining the aforementioned open chit files integrating operation, and FIG. 39 is an example of a closed chit report issued from the printer 1-6 through the closed chit report issuing operation similar to in the first embodiment. In FIG. 39, 'COMB' (see arrow 39-1) and 'GCK#125' (see arrow 39-2) are printed for the items 'TOTAL' and 'PAYMENT' for the chit file #128, which means that the chit file of GCK #128 was integrated to the chit file of GCK #125 for settlement. An item 'PAYMENT' for the chit file #125 shows an integration settlement amount indicative of the total of sales for GCK #125 and GCK #128. FIG. 40 is an example of a receipt issued from the printer 1-6 during the above open chit files integration/settlement.

(Embodiment 8)

An eighth embodiment of the present invention is direction to the function of registering items corresponding to a plurality of customers in the same chit file and then separating the chit file for each of the customers for settlement (sales end operation).

Figure 41:
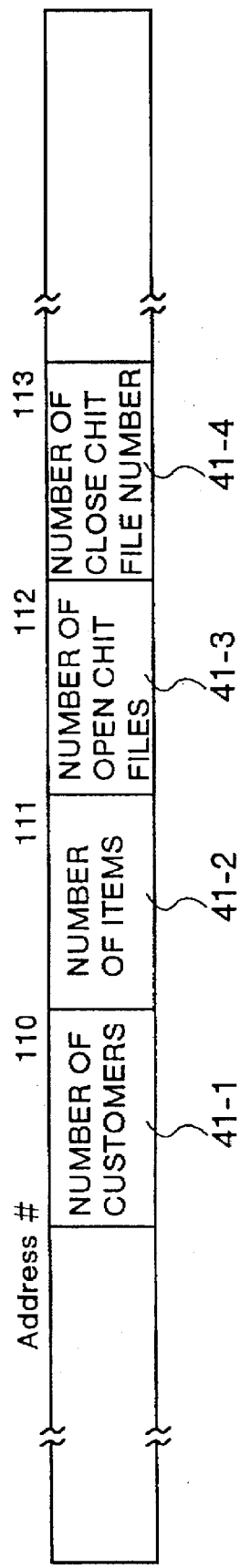
FIG. 41 shows a structure of a chit file constituent element setting area in a control information setting file in an eighth embodiment of the present invention.

Provided in the control information setting file 2-2 of the memory 1-5 is a chit file constituent element setting area having such a structure as shown in FIG. 41, in which an area 41-1 having an address #110 is used for setting therein a customer number per chit file (corresponding to the number of divisions of the single chit file corresponding to the respective customers), an area 41-2 having an address #111 is for setting therein the number of registration items per chit file, an area 41-3 having an address #112 is for setting therein the number of chit files handleable by the register (open chit number), and an area 41-4 having an address #113 is for setting therein the number of settlement chit files handleable by the register (closed chit file number). When the operator sets the operational mode PGR for the register with use of the mode switch 1-2, such a task menu of the set mode as shown in FIG. 8 is displayed. The same operation as shown by the flowchart in FIG. 7 causes the respective address data to be set in the respective chit file constituent element setting area of FIG. 41.

Figure 42:
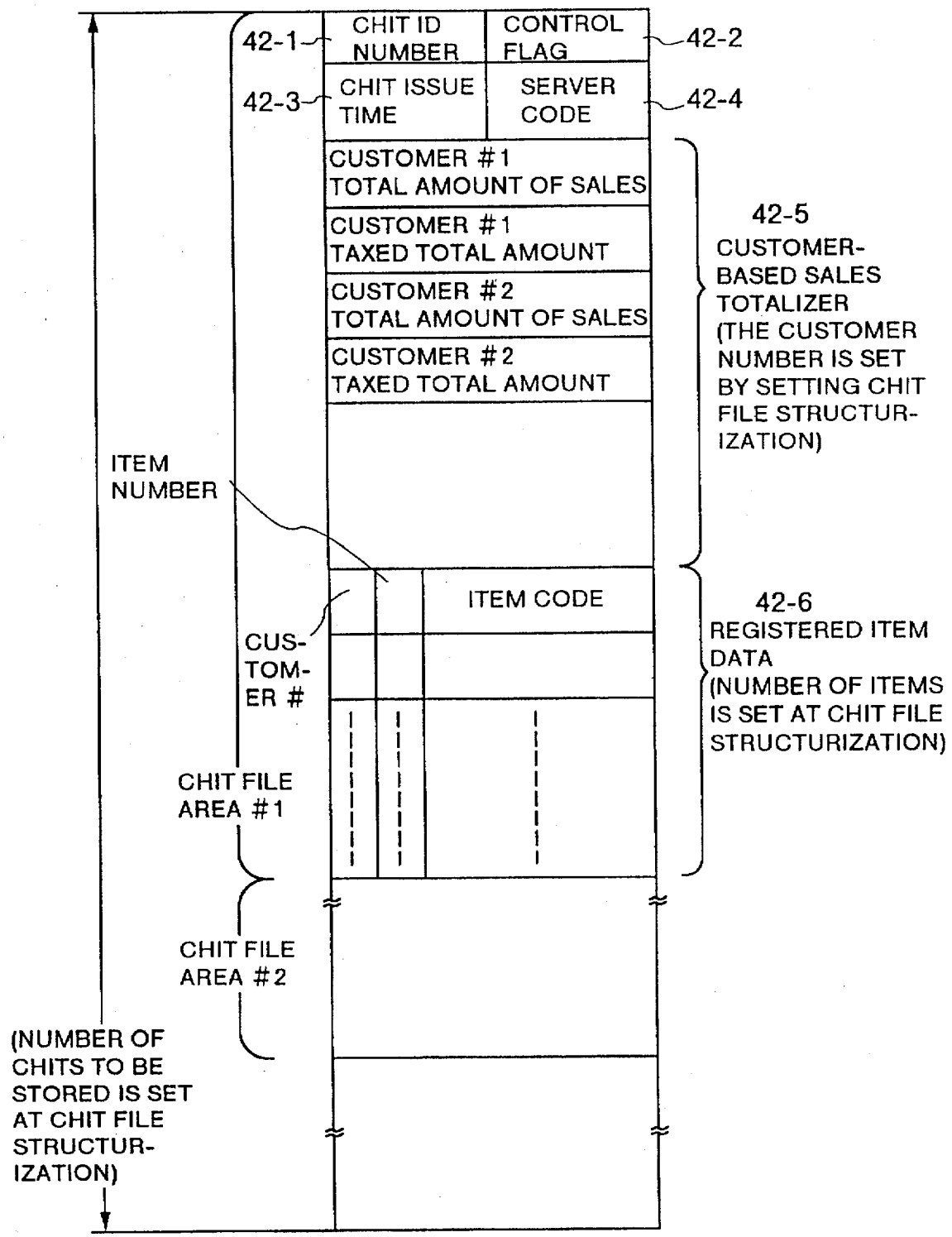
FIG. 42 shows a structure of an open chit file area in the eighth embodiment of the present invention.

FIG. 42 shows the structure of the chit file area 2-5 in the present embodiment. The size of a customer-based sales totalizer marked by bracket 42-5 is determined by the set number (customer number per chit file) of the address #110 of the chit file constituent element setting area of FIG. 41; while the size of the registration item data marked by bracket 42-6 is determined by the set number (registration item number per chit file) of the address #111. The total number of chit files in the open chit file area 2-5 is determined the set number (open chit file number handleable by the register) of the same address #112. In FIG. 42, an area 42-1 is used for storing therein a chit number, an area 42-2 is used for storing therein a control flag, an area 42-3 is for storing therein a chit issuance time, an area 42-4 is for storing therein a server code, the area 42-5 is for storing therein sale totals and taxed sale totals for the respective customer numbers (the customer number is set in accordance with the chit file structurization), and the area 42-6 is for storing therein registered item data (the number of items is set at chit file structurization). The control flag stored in the area 42-2 shows status information indicative of the data status of the corresponding file. An area 42-7 is for a customer number and an area 42-8 is for an item number. Bracket 42-9 marks a chit file area #1 and bracket 42-10 marks a chit file area #2. Arrow 42-11 corresponds to the number of chits to be stored, which is set at chit file structurization.

Figure 43:
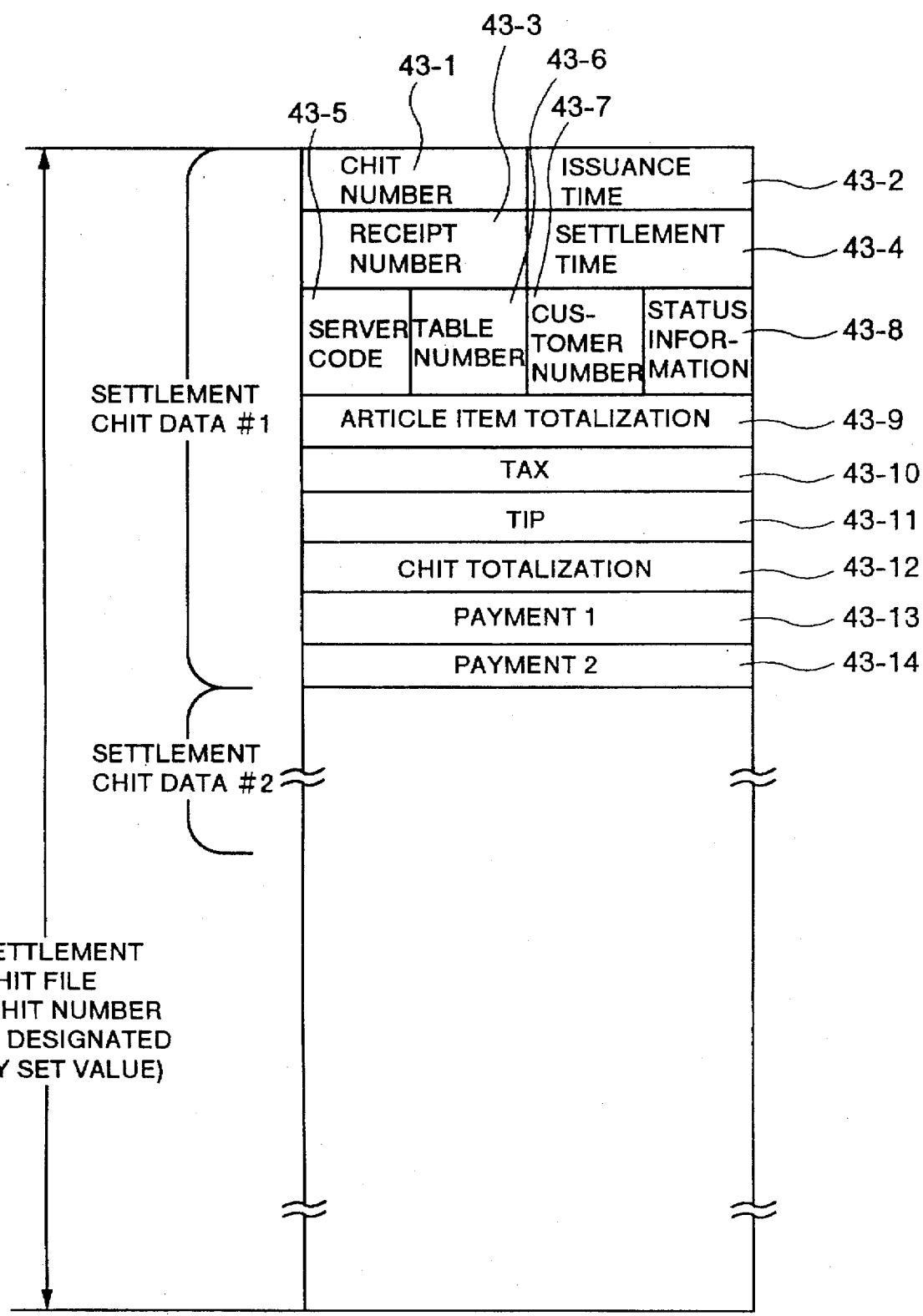
FIG. 43 shows a structure of a chit file area in the eighth embodiment of the present invention.

Shown in FIG. 43 is the structure of the settlement chit file area 2-6. The total number of chit files is determined by the set number (closed chit file number handleable by the register) of the address #113 of the chit file constituent element setting area of FIG. 41. In FIG. 43, an area 43-1 is used for storing therein a chit number, an area 43-2 is for storing therein a chit issuance time (the time of the area 42-3), an area 43-3 is for storing therein a settlement transaction receipt number, an area 43-4 is for storing therein a chit settlement time, an area 43-5 is for storing therein a server code, an area 43-6 is for storing therein a table number associated with the present chit, an area 43-7 is for storing therein a customer number, an area 43-8 is for storing therein chit status information, an area 43-9 is for storing therein a total of registration item amounts, an area 43-10 is for storing therein a tax, an area 43-11 is for storing therein an amount of chip when receiving the chip payment, an area 43-12 is for storing therein a total of sales, an area 43-13 is for storing therein a payment code and a payment amount for the settlement transaction, and an area 43-14 is for storing therein a secondary payment code and amount when two sorts of settlement transactions were done.

Furthermore, in FIG. 43 bracket 43-15 marks settlement chit data #1 and bracket 43-16 marks settlement chit data #2. Arrow 43-17 corresponds to the settlement chit file (the chit number is designated by a set value).

In the structure of the chit file control information setting area of the control information setting file 2-2 of FIG. 16, an area 16-6 having an address #215 is used for storing therein a customer ID keying enforce flag. Data setting to the area 16-6 is carried out substantially in the same manner as explained in the flowchart of FIG. 17 in the second embodiment.

Figure 44A:
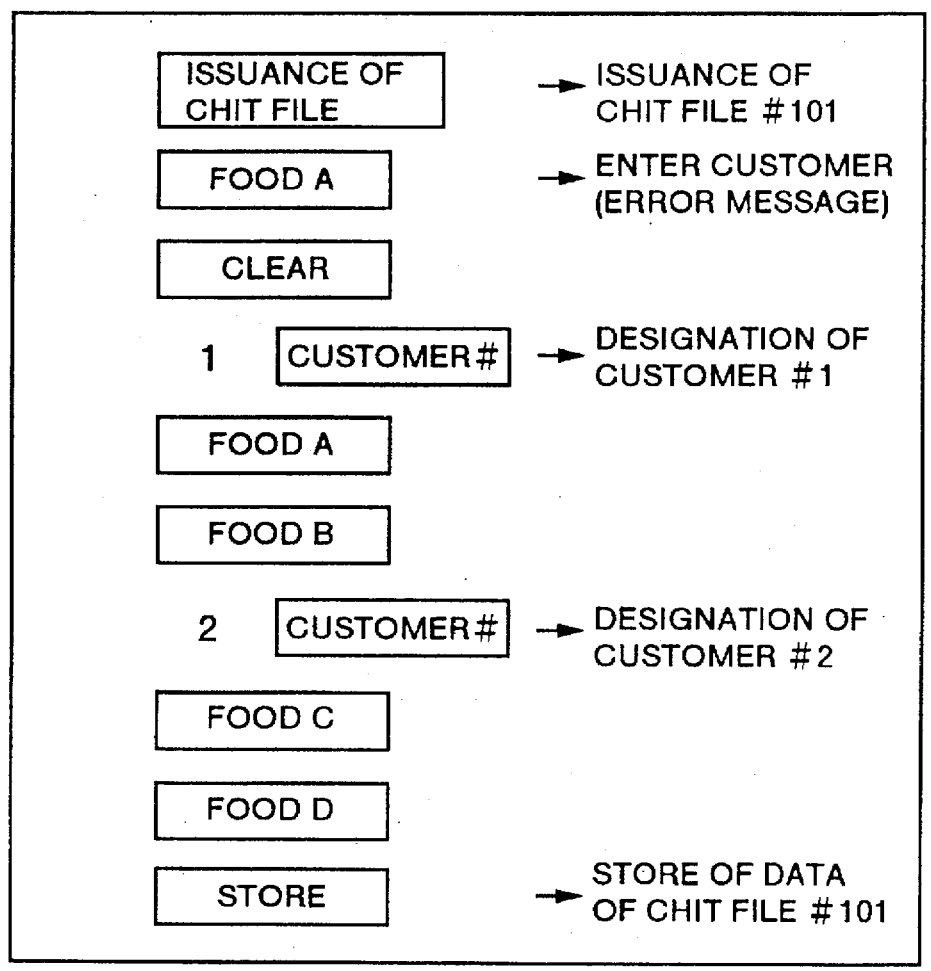
FIG. 44A shows an example of key manipulation for customer ID number key registering operation in the eighth embodiment of the present invention.
Figure 44B:
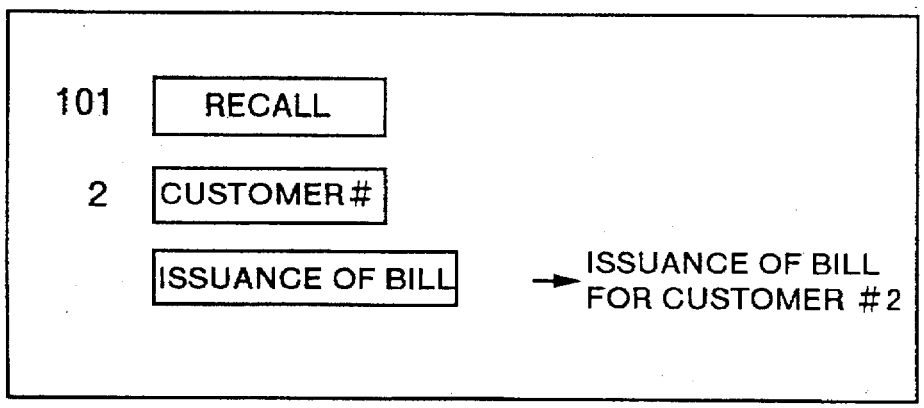
FIG. 44B shows an example of key manipulation for customer-based settling operation.
Figure 48:
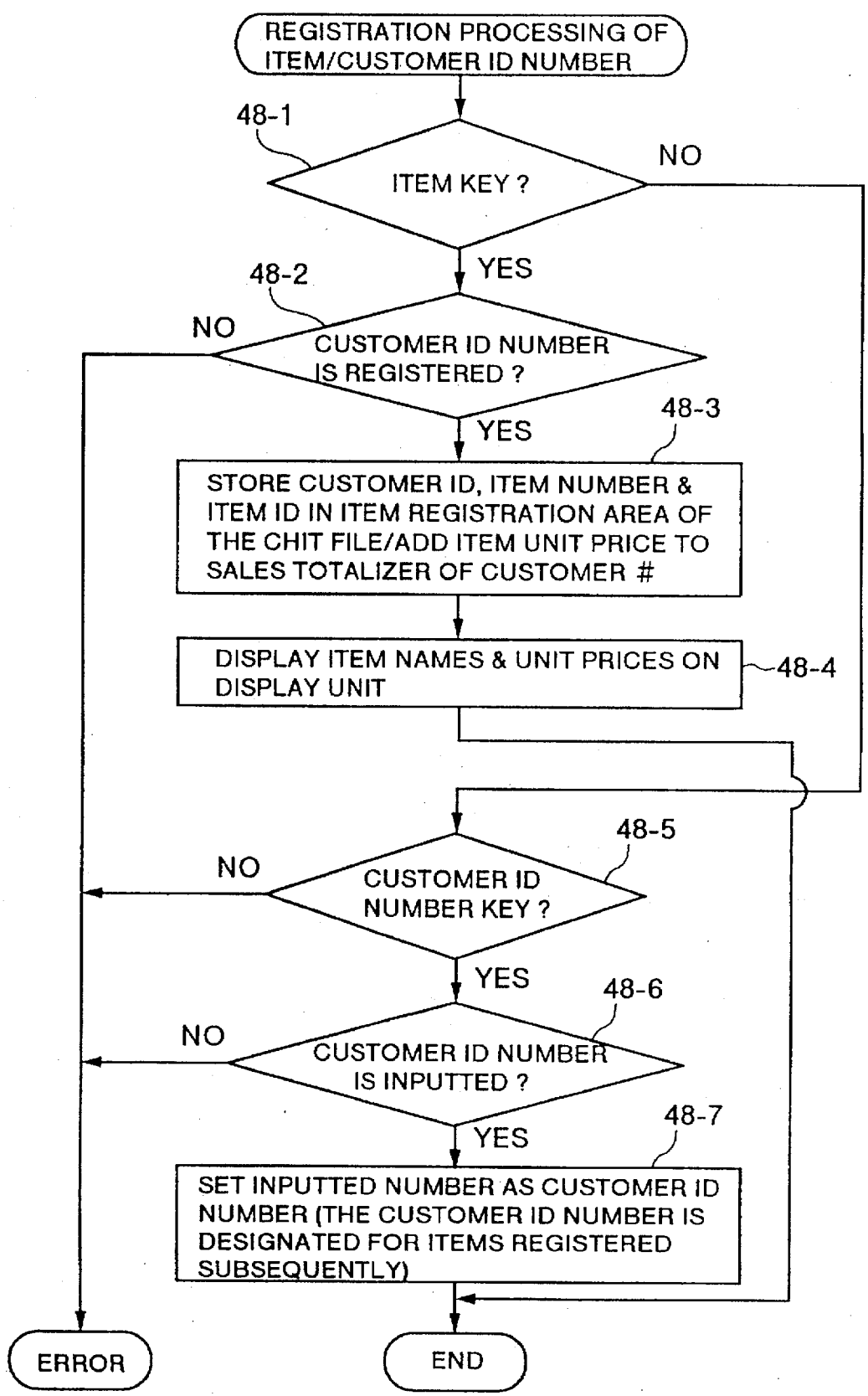
FIG. 48 is a flowchart for explaining item/customer ID number registering operation in the eighth embodiment of the present invention.

An explanation will next be made as to the chit issuing operation in the registration mode of the register. FIG. 44A shows an example of registration key operations based on customer ID number specification. More specifically, first of all, depression of the chit file issuance key causes issuance of the chit file #101. In this case, when the operator depresses the item key without entering a customer ID number, this operation is made invalid, resulting in that an error message is displayed. Entering the customer ID number and then depression of the item key causes the corresponding item to be registered with the same format as shown by the registration item data 42-6 (in the form of the corresponding customer ID applied to the item code). The input of such customers IDs is possible within a customer ID number range (corresponding to the number of customers per chit file) settable at the address #110 of the chit file constituent element setting area of FIG. 41. When the number of input customers IDs exceeds the range, the input is made invalid and an error message is displayed. When the operator enters the corresponding item for each customer and then depresses the store key, the registration data is stored in the chit file of the corresponding chit number of the chit file 2-5 with such a format as shown in FIG. 42. FIG. 48 is a flowchart for explaining the item/customer ID registering operation.

Next, an example of cash settlement key operations based on a customer ID number specification will be described. First, when the operator depresses numeric keys corresponding to a file number and then the recall key, the chit file having the corresponding chit number is called from the chit file area 2-5 to the work area 2-7. After this, entering a customer ID number causes the sales totalization data of the corresponding customer ID to be displayed on the display device 1-4. Depression of the cash settlement key causes execution of a sales ending operation (settlement) for the data (sales totalization data for the corresponding customer ID in the corresponding chit file) being displayed on the display screen, which results in that its transaction type and sales totalization are displayed as shown in FIG. 45, sent to the printer 1-6, and issued in the form of such a receipt as shown in FIG. 46. Further, the present transaction data is collected to the sales totalization data file 2-4, and the registered article item data corresponding to the customer ID in the registration item data area 42-6 of the corresponding open chit file as well as the customer ID sales totalization data for the customer ID in the customer-based sales totalization area 42-5 are cleared. Further, the settlement information corresponding to the customer ID in the corresponding file is stored in the settlement chit file area 2-6 with such a structure of the settlement chit file of FIG. 43. The customer-based settlement information is issued as such a report as shown in FIG. 47 through the closed chit report issuing operation similar to in the first embodiment. In the report, when the chit number is followed by the customer ID number, this means that the chit was settled only for the customer ID. A chit without such followed number was settled for all the customers. In FIG. 47, arrow 47-1 points out customer #2 settlement data for chit GCK #101.

(Embodiment 9)

A ninth embodiment of the present invention is directed to such a function that an operator sets an electronic register in its training mode to perform chit registering operations.

Figure 49:
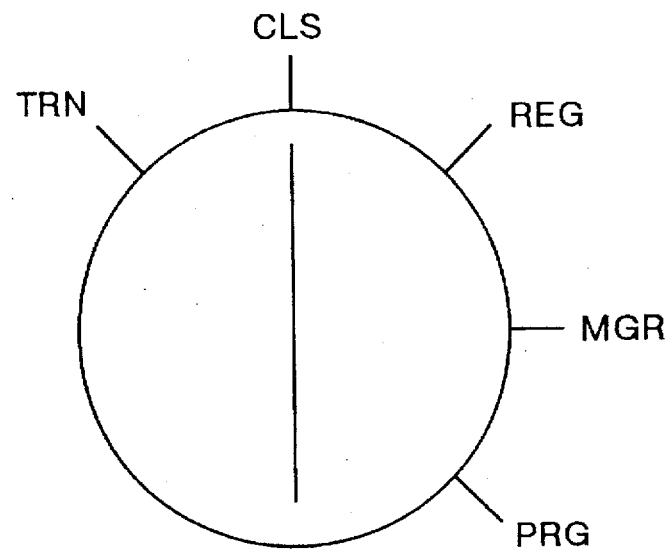
FIG. 49 is an appearance view of a mode switch in a ninth embodiment of the present invention.

FIG. 49 shows a mode switch which can specify a training mode TRN in addition to the mode switch (see FIG. 3) in the first embodiment.

Figure 50:
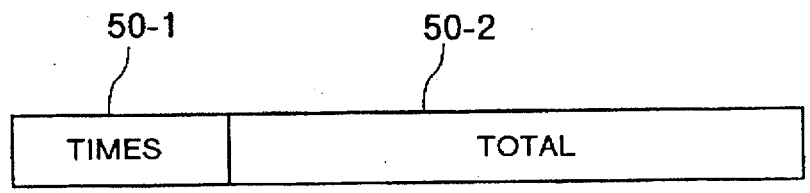
FIG. 50 shows a structure of a training totalizer provided to a sales totalization data file in the ninth embodiment of the present invention.

FIG. 50 shows the structure of a training totalizer which is provided in the sales totalization data file 2-5 and which includes a repetition area 50-1 for storage of the number of training times and a totalizer 50-2.

Figure 51:
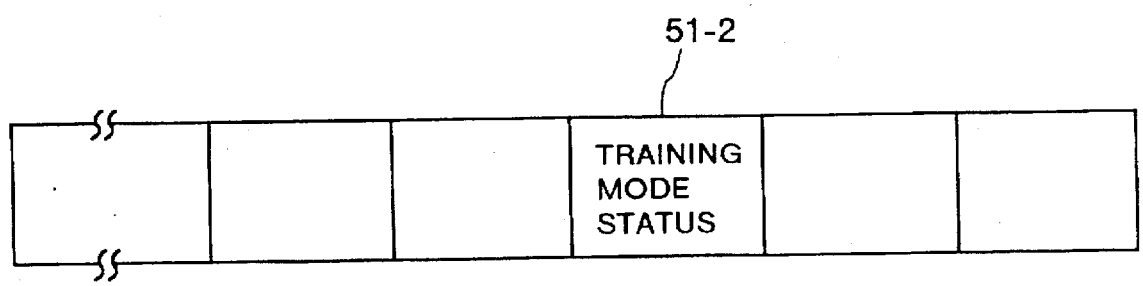
FIG. 51 shows a structure of a control flag area of a chit file in the ninth embodiment of the present invention.

FIG. 51 is shows structure of the control flag area 4-2 within the open chit file in which a training mode status 51-2 is provided. The present training mode status 51-2 indicates that the mode switch 1-2 was set at the training mode and a chit was issued.

When the operator sets the mode switch 1-2 at the training mode and then operates a chit issuance key, a chit file number is issued through operations similar to those in the first embodiment and a chit file for the corresponding chit number is secured in the open chit file area 2-5. At this time, the training mode status 51-2 of the control flag area 4-2 for the chit file is set for the chit file issued in the present training mode, and the chit file having the training mode status 51-2 set therein can be subjected to the recalling and settling operations only when the mode switch 1-2 is set at the training mode. Further, with regard to the chit file having the training mode status 51-2 set therein, the collection data of the chit registering operation is added only to the training totalizer (refer to FIG. 50) provided in the sales totalization data file 2-4 and no addition thereof to other totalizers provided in the same file 2-4 is carried out. The contents of the training totalizer (see FIG. 50) are printed on an inspection/adjustment report so that the trainer can confirm the state of the chit registering operation in the training mode.

In the open chit inspection report of the chit file area 2-5, all the associated chit files are judged with respect to the training mode status 51-2 of the control flag area 4-2. With regard to the chit files having the training mode status set therein, the files are printed with such a symbol as TRNG (TRAINING) attached to be distinguished from the data of the chit file issued in the registration mode REG as shown in FIG. 52. Arrow 52-1 points out a chit file issued in the training mode.

The chit file information settled in the present training mode is stored in the settlement chit file area 2-6, at which time the training mode status is set in the status information area 5-8 of the settlement chit file. When a close chit report is issued through operations similar to in the first embodiment, the above training mode status 5-8 is judged so that the settlement information in the training mode is outputted to the display device 1-4 or printer 1-6 as a sales management report on the settlement chit information as shown in FIG. 53. Arrow 53-1 points out chit data that was settled in the training mode.

Figure 54:
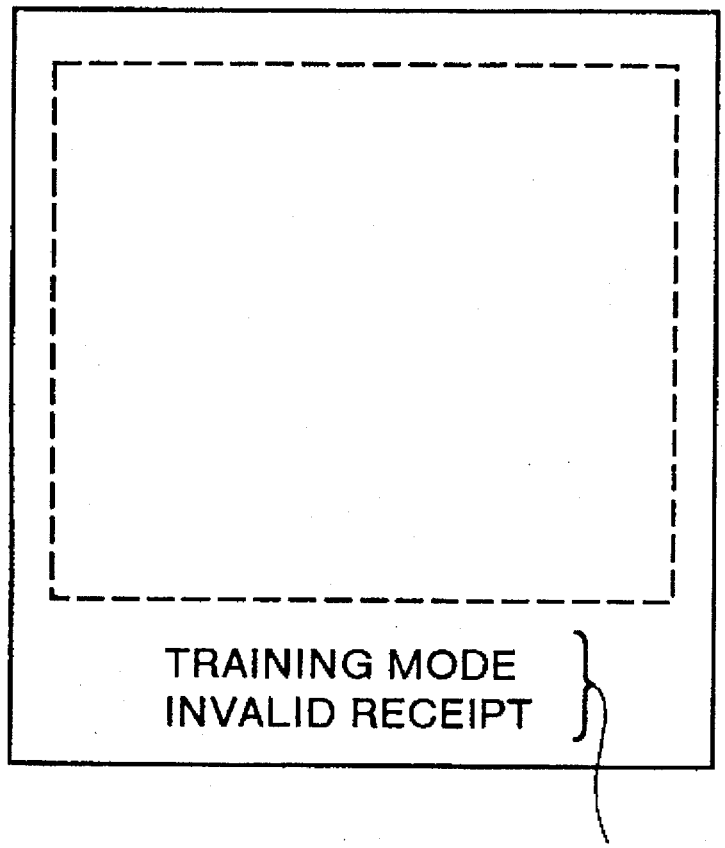
FIG. 54 shows an example of a receipt issued in a training mode in the ninth embodiment of the present invention.

In the bill chit and settlement receipt issued in the present training mode, such messages as "TRAINING MODE" and "INVALID RECEIPT" are printed to distinguish the receipt of the training mode from the receipt issued in the registration mode REG as shown in FIG. 54. Bracket 54-1 marks a message specifying the training mode.

(Embodiment 10)

A tenth embodiment of the present invention is directed to the function of previously setting a trainer-exclusive code in a memory to perform chit registering operations.

In the structure of the chit file control information setting area of the control information setting file 2-2 of FIG. 16, an area 16-7 having an address #216 is used for storing therein the trainer-exclusive code. Data setting to the present area 16-7 is carried out substantially in the same manner as shown in the flowchart of FIG. 17 in the second embodiment.

Figure 55A:
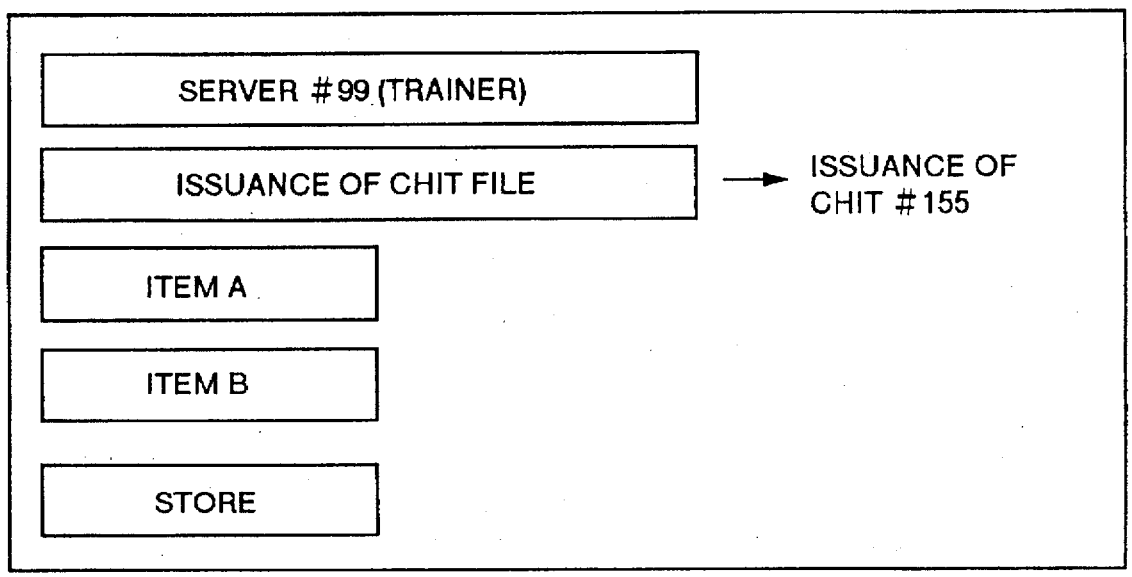
FIG. 55A is an example of key manipulation for trainer code chit issuing operation in a tenth embodiment of the present invention.
Figure 55B:
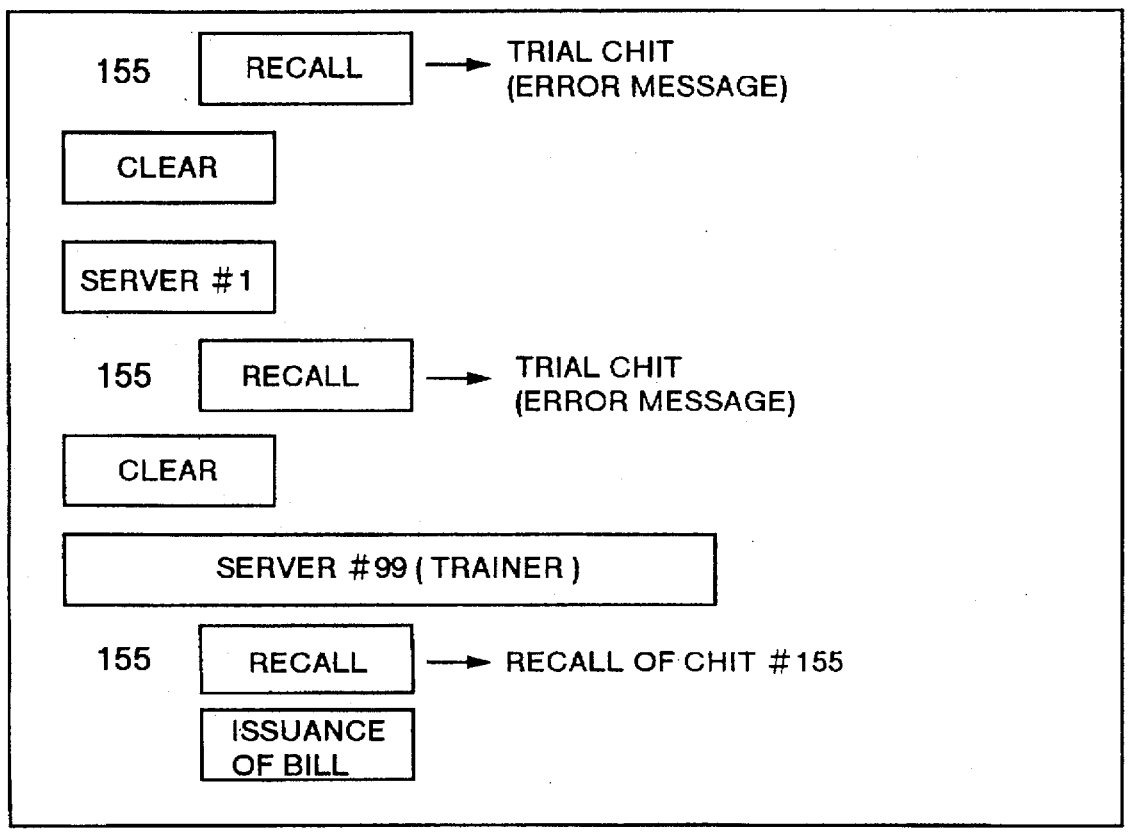
FIG. 55B is an example of key manipulation for cash settling operation.
Figure 56:
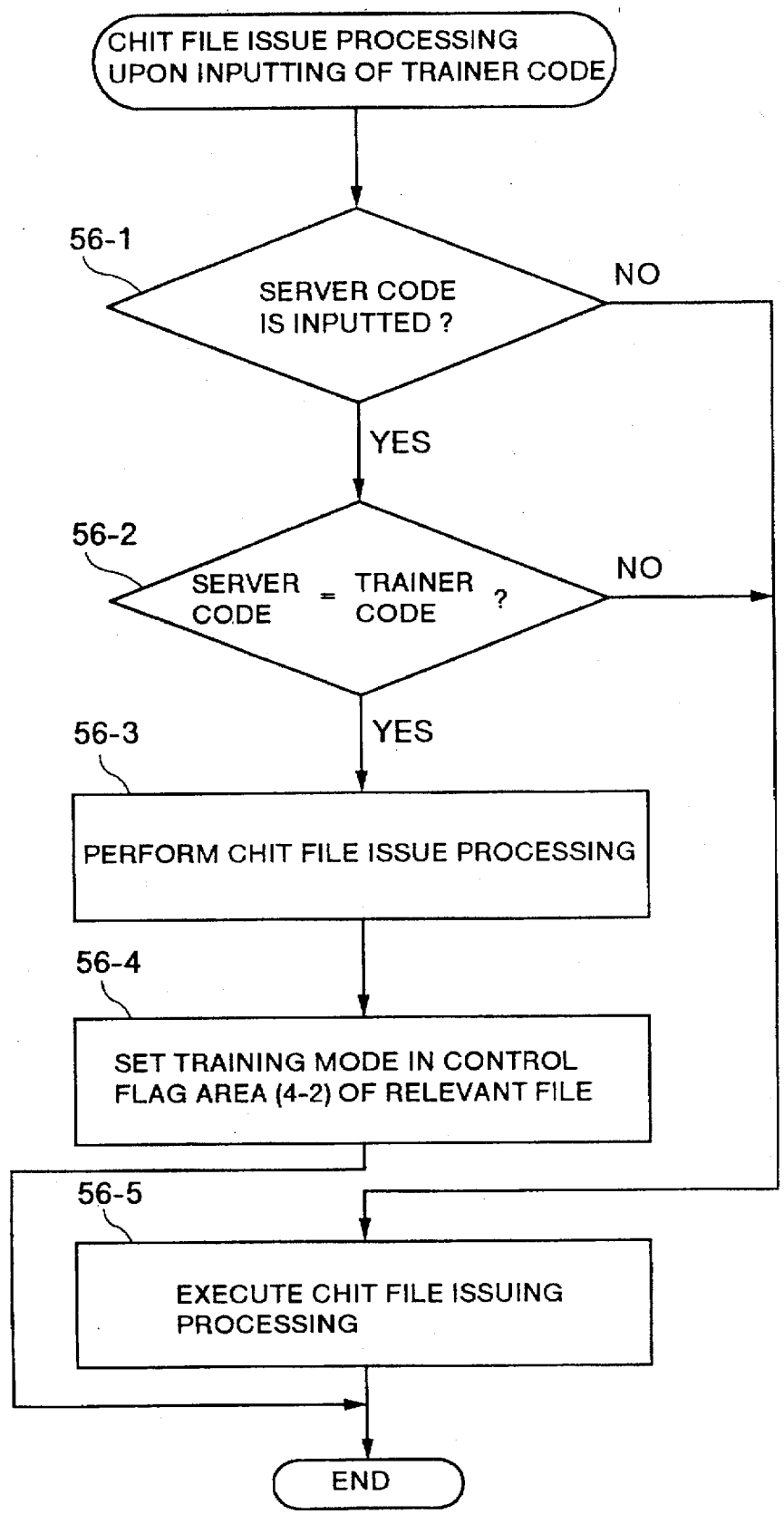
FIG. 56 is a flowchart for explaining chit issuing operation when a training code is designated to a server in the tenth embodiment of the present invention.

FIGS. 55A and 55B show examples of key operations in the present embodiment, in which a trainer-exclusive server code 99 is set in the 'trainer-exclusive code' setting location 16-7 of the above chit file control information setting area. In FIG. 55A, when the operator specifies the 'SERVER 99' and then depresses the chit issuance key, a chit file number is issued through the operation similar to those in the first embodiment and a chit file having the corresponding chit number is secured in the chit file area 2-5. In this case, the training mode status 51-2 of the control flag area 4-2 of the chit file is set in the chit file issued based on the trainer code specification. And with respect to the chit file having the present training-mode status 51-2 set therein, the recalling and settling operations can be made possible only when the trainer code is specified as shown by the key operation example of FIG. 55B. As in the ninth embodiment, with regard to the chit file having the present training mode status 51-2, the collection data of the chit registering operation is added only to the training totalizer provided in the sales totalization data file 2-5 and no addition to other totalizers provided in the same file 2-5 is carried out. The contents of the training totalizer (see FIG. 50) are printed on an inspection/adjustment report so that the trainer can confirm the results of the chit registering operation in the training mode.

As in the ninth embodiment, with respect to the open chit inspection report of the chit file area 2-5, the corresponding chit files are all judged with respect to the training mode status 51-2 of the control flag area 4-2. And with regard to the chit file having the present training mode status set therein, the file is printed with such a symbol as TRNG (TRAINING) attached to be distinguished from the data of the chit file issued in the registration mode REG as shown in FIG. 52.

The chit file settled in the present training mode is stored in the settlement chit file area 2-6, at which time the training mode status is set in the status information area 5-8 of the settlement chit file. When a closed chit report is issued through operations similar to in the first embodiment, the above training mode status 5-8 is judged and the settlement information in the training mode is outputted to the display device 1-4 or printer 1-6 as shown in FIG. 53.

In the bill chit and settlement receipt issued when the trainer code is specified, as in the ninth embodiment, such messages as 'TRAINING MODE' and 'INVALID RECEIPT' are printed thereon to distinguish such chit and receipt from the receipt issued in the registration mode REG.

An explanation will next be made as to the chit issuing operation when the trainer code is specified.

Figure 57:
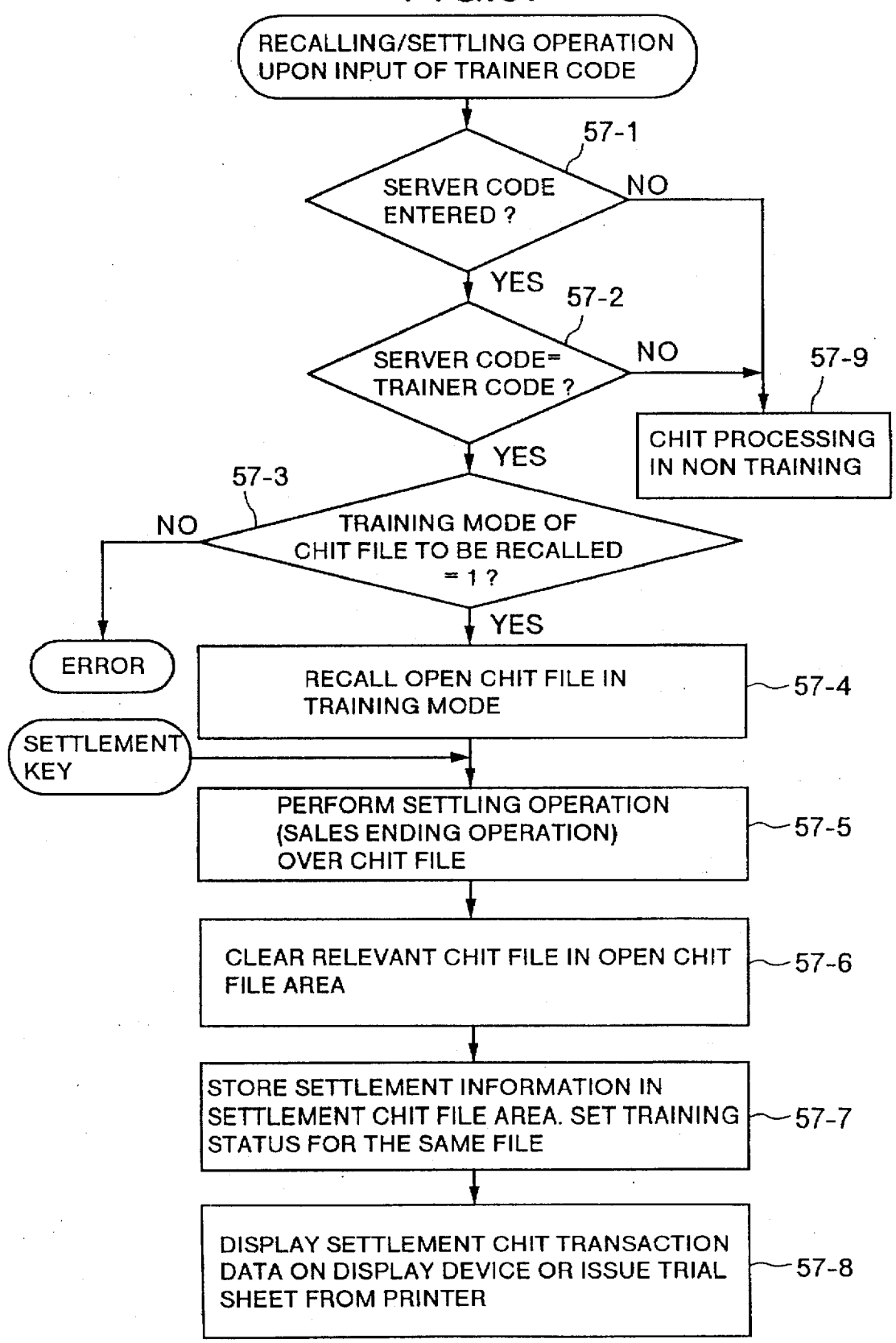
FIG. 57 is a flowchart for explaining recall and settling operation when a server is designated to a training code in the tenth embodiment of the present invention.

FIG. 57 is a flowchart for explaining the recalling and settling operations when the trainer code is specified.

(Embodiment 11)

An eleventh embodiment of the present invention relates to a function of storing the adjustment chit information of an open chit file reset based on issuance of an adjustment report in the settlement chit file and outputting it to the display device or printer as a sales management report.

In the structure of the close chit file control information setting area of the control information setting file 2-2 of FIG. 16, an area 16-8 having an address #217 is used for storing therein a flag for permitting issuance of an adjustment report to an open chit file. Setting of the present set value is carried out substantially in the same manner as in the method explained in connection with the flowchart of FIG. 17 in the second embodiment.

An explanation will next be made as to the adjustment report issuing operation of open chit information in the manager mode of the register. When the operator sets the mode MGR for the register with use of the mode switch 1-2, a task menu of the manager mode such as shown in FIG. 9 is displayed. Depression of the appropriate numeric key and then the key "TOTAL" causes selection of the adjustment report task, whereby an adjustment report menu is displayed as shown in FIG. 11. Subsequent depression of numeric keys "11" and then the key "TOTAL" causes selection of the adjustment report issuing operation of the open chit information. The above adjustment report issuance enable flag 16-8 set at the address #217 is judged so that, when the same flag is not set, a message indicative of disabled issuance of the adjustment report is displayed on the display device 1-4. When the same flag is set, the open chit information are sequentially read out from the open chit file area 2-5 and such an open chit adjustment report as shown in FIG. 58 is issued from the printer 1-6. At this time, the open chit file issued in the form of a report is cleared from the open chit file area 2-5 and also stored in the settlement chit file area 2-6. Further, in the settlement chit file area 2-6, the adjustment flag is set in the status information area of the settlement chit file, which means that the settlement chit information is the settlement based on the adjustment report of the open chit file. When a settlement chit report is issued through operation similar to those in the first embodiment, such a sales management report on the settlement chit information as shown in FIG. 59 is outputted to the display device 1-4 or printer 1-6. Bracket 59-1 marks data stored as settlement data based on adjustment of open chit files.

(Embodiment 12)

A twelfth embodiment of the present invention is directed to the function of reading corresponding chit information from a settlement chit file through input of a chit number, calling it to a display device or printing it on a printer to confirm a past registration/settlement transaction.

In the present embodiment, a settlement chit recall key and a print key are provided on the keyboard 1-1. The chit information subjected to the settling operation through operations similar to those explained in the first embodiment are sequentially stored in the settlement chit file area 2-6.

Figure 60:
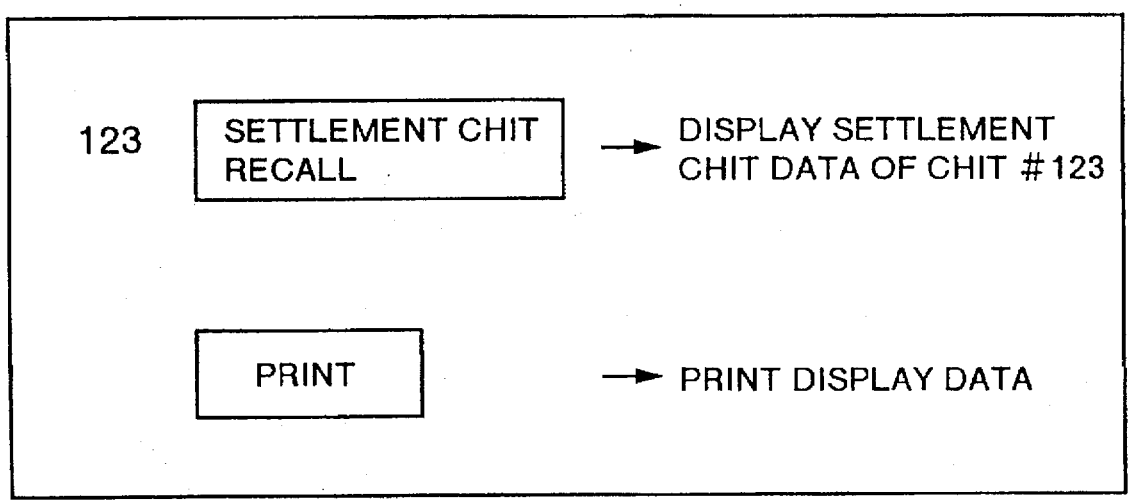
FIG. 60 shows an example of recall operation for a chit in a twelfth embodiment of the present invention.

FIG. 60 shows an example of a key operation for reading settlement chit information 123 with use of the above settlement chit recall key. When the operator specifies a chit number to be read and then depresses the settlement chit recall key, the settlement chit information 123 is read from the settlement chit file area 2-6 to the work area 2-7 and displayed on the display device 1-4, and then the displayed information is printed by the printer 1-6.

Figure 61:
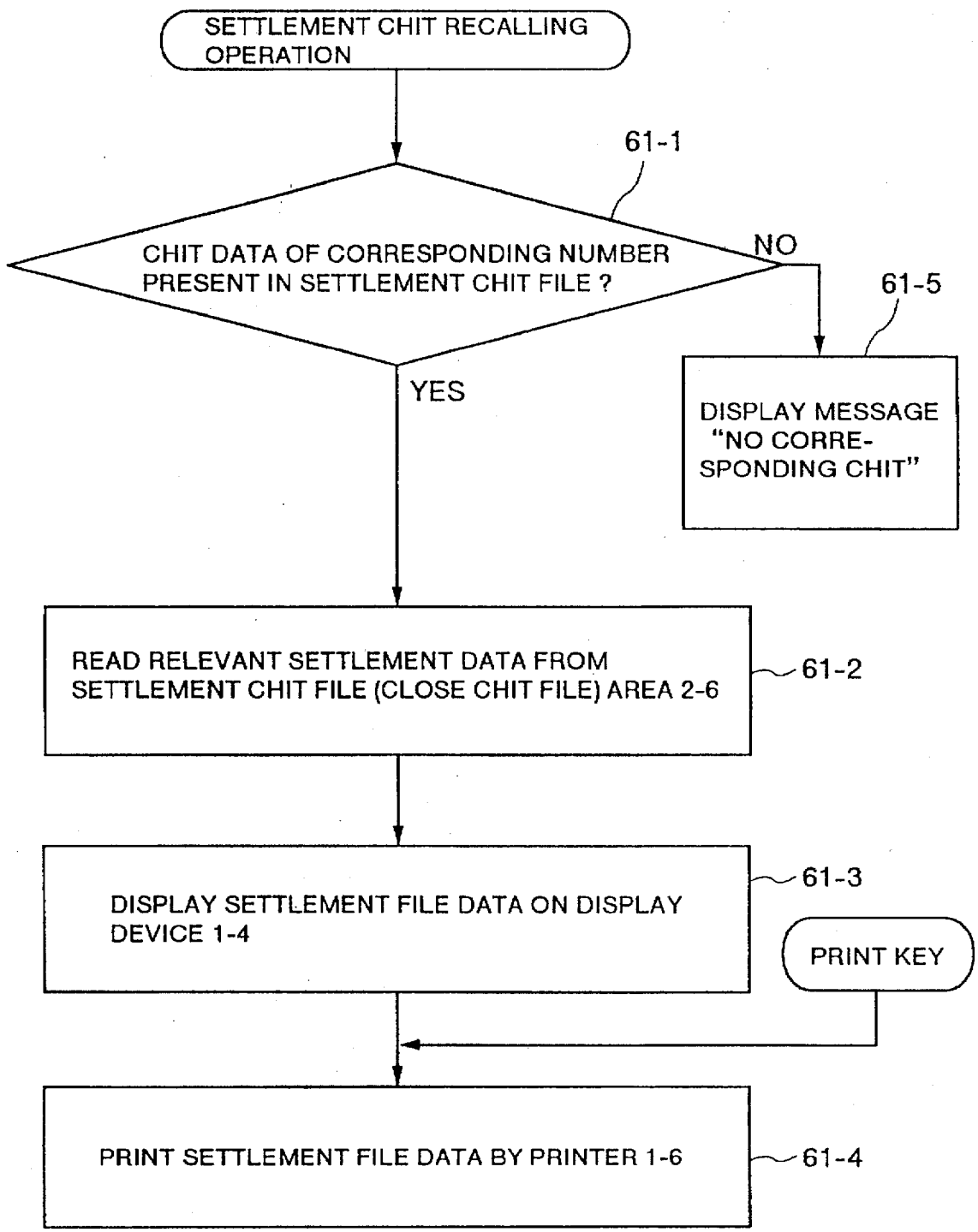
FIG. 61 is a flowchart for explaining recall operation of a settlement chit in the twelfth embodiment of the present invention.

FIG. 61 shows a flowchart for explaining the present operation. When the operator specifies the registration mode for the operation controller with use of the mode switch, enters a chit number and then depresses the above settlement chit recall key, the settlement chit information of the corresponding cit number is retrieved in the settlement chit file area 2-6 (step 61-1). In the absence of the corresponding chit information, a message indicative of absence of the corresponding chit is displayed on the display device 1-4 (step 61-5). In the presence of the corresponding chit information, the chit information is read (step 61-2), displayed on the display device 1-4 (step 61-3), or printed by the printer 1-6 with use of the print key (step 61-4).

FIG. 62 is an example settlement chit information displayed on the display device based on the depression of the settlement chit recall key, and FIG. 63 is an example of the settlement chit information printed by the printer based on the subsequent operation of the print key.

(Embodiment 13)

There is provided a thirteenth embodiment of the present invention wherein, when a chit number is not clear upon retrieval of the corresponding chit information from the settlement chit file, the corresponding chit information is retrieved on the basis of information attached to the settlement chit file. The information attached to the settlement chit file includes, for example, the operator number, table number, date, time and receipt number.

In the present invention, as in the twelfth embodiment, a settlement chit recall key and a print key are provided on the keyboard 1-1. The chit information subjected to the settling operation through operations similar to those in the first embodiment are sequentially stored in the settlement chit file area 2-6.

Figure 64:
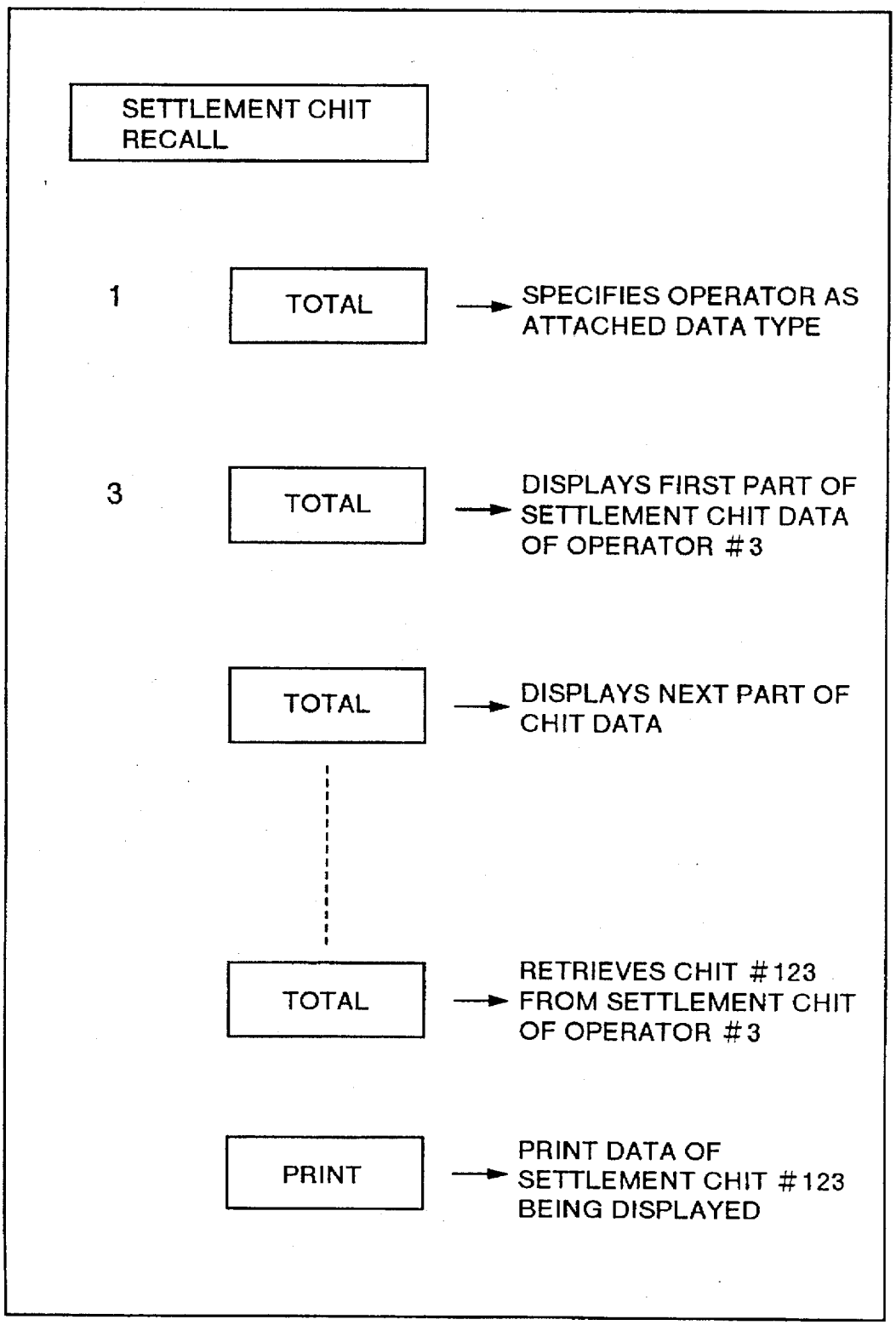
FIG. 64 shows an example of key manipulation for recall operation when a chit is retrieved with use of a server as a retrieval factor in a thirteenth embodiment of the present invention.

FIG. 64 is an example of key operations for retrieving a settlement chit having an operator number (server code) 3 as the information attached to the settle chit file with use of the above settlement chit recall key.

Finally, the operator depresses the settlement chit recall key "SETTLEMENT CHIT RECALL". This operation causes the appearance of a selection menu including the information attached to the settlement chit file and items such as the operator, table and time are selectable as retrieval factors on the display device 1-4 as shown in FIG. 65. At this time, depression of the keys "1" and "TOTAL" on the keyboard 1-1 causes the operator (server) to be specified as the retrieval factor of the settlement chit file. Subsequent depression of the keys "3" and "TOTAL" causes the operator number (server code) 3 to be specified as the above retrieval factor. Through this key operation, the first data address of the chit file having the operator number (server code) 3 is read out from the settlement chit file 2-6. A display format similar to that in the twelfth embodiment is shown as an example in FIG. 62. Subsequently, when the operator depresses the key "TOTAL", the next data address of the chit file having the operator number (server code) 3 is read out from the settlement chit file 2-6. In this way, the key "TOTAL" functions to sequentially shift the data display of the corresponding chit file. When the operator confirms the desired chit number #123 on the display device 1-4, the operator pushes the key "PRINT" to print out the settlement chit data being displayed from the printer 1-6. A printing format similar to that in the twelfth embodiment is shown in FIG. 63 as an example.

(Embodiment 14)

A fourteenth embodiment of the present invention is directed to the function of changing transaction data of a settlement chit file. In the present embodiment, a settlement chit recall key and a transaction change key are provided on the keyboard 1-1 of FIG. 1.

Figure 68:
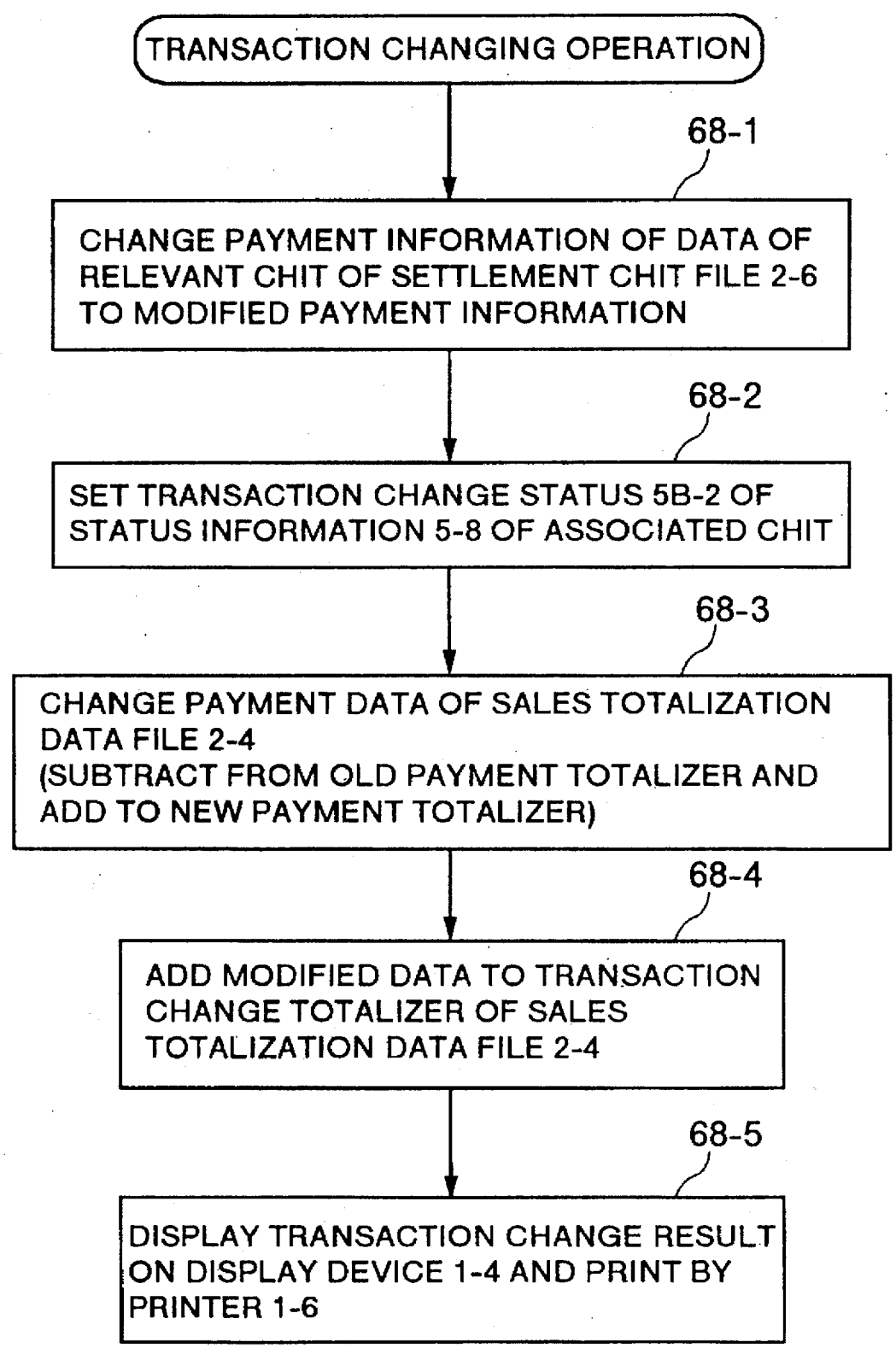
FIG. 68 is a flowchart for explaining the transaction change operation in the fourteenth embodiment of the present invention.

FIG. 66 shows an example of key operations for changing a sales transaction of a settlement chit 123 from "cash sale" to "credit card A". FIG. 68 is a flowchart for explaining the above transaction changing operation.

Figure 69:
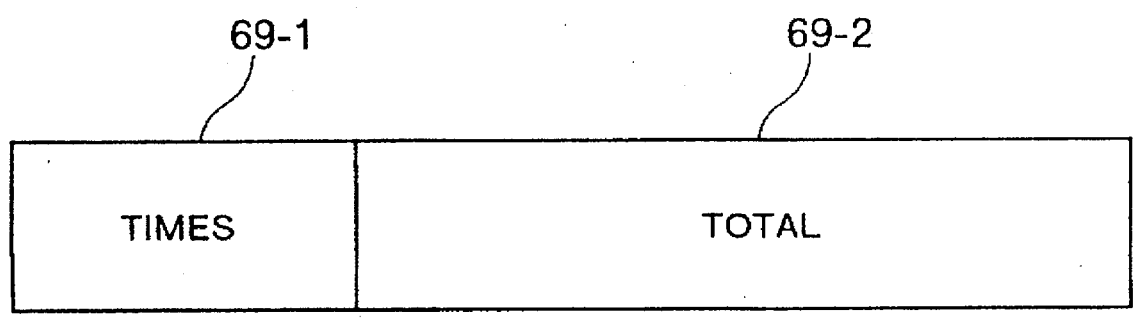
FIG. 69 shows a structure of a transaction change totalizer in the fourteenth embodiment of the present invention.

It is assumed now that the cash sale settlement is carried out through the operation of the first embodiment and thus such settlement chit information as shown in FIGS. 62 and 63 are stored in the settlement chit file 2-6. Depression of the keys "123" and "settlement chit recall" causes, through operations similar to in the twelfth embodiment, the data of the settlement chit file 123 to be read out from the settlement chit file 2-6 so that the data is displayed on the display device 1-4 as shown in FIG. 62. Depression of the key "transaction change" causes a settlement chit data transaction change command to be issued to the operation controller 1-3. Next, a transaction key to be changed is specified. Depression of a key "credit card A" causes the payment data of the corresponding settlement chit file to be changed from 'cash sale' to 'credit card A sale' (step 68-1). Further, the transaction change status 5B-2 is set in the status information area 5-8 of the corresponding settlement chit file (step 68-2). In addition, the payment data of the sales totalization data file 2-4 is changed by subtracting the total amount of the chit 123 from the cash sale totalizer and adding it to the totalizer of the credit card A (step 68-3). The present total amount is added to a totalizer 69-2 (see FIG. 69) in the sales totalization data file 2-4 (step 68-4). At this time, such a transaction change result as shown in FIG. 67 is displayed on the display device 1-4 and printed out by the printer 1-6 (step 68-5).

Next, the report issuing operation of settlement chit information in the manager mode of the register is carried out substantially in the same manner as the first embodiment. The settlement chit data are sequentially read out from the settlement chit file area 2-6. When such data are issued from the printer 1-6 in a printed form, the transaction change status 5B-2 (see FIG. 5B) of the status information area 5-8 (FIG. 5A) is judged. Since the chit data having the present status set therein is the chit data already subjected to the above transaction changing operation, the then close chit report contains such a message as "TENDER CORRECTION" as shown in FIG. 70. Arrow 70-1 points to the message meaning that a transaction change was done.

(Embodiment 15)

In accordance with a fifteenth embodiment of the present invention, unlike the first embodiment wherein the open and settlement chit files are distinguished from each other for their processing, when the open chit file is subjected to the settling operation, the settlement information (sales end data) is stored in the corresponding chit file itself for use in the report issuance of the settlement chit information.

Figure 71:
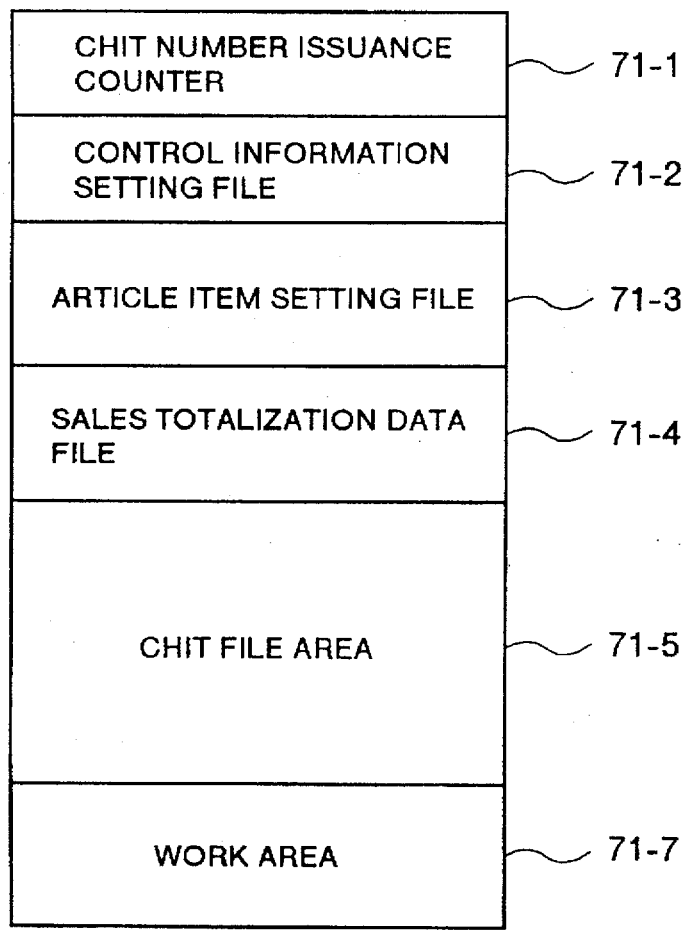
FIG. 71 shows a structure of a memory in the fifteenth embodiment of the present invention.

FIG. 71 shows the structure of the memory 1-5 in the present embodiment, which has a chit number issuance counter 71-1 a control information setting file 71-2, an article item setting file 71-3, a sales totalization data file 71-4, a chit file area 71-5 and a work area 71-7.

Figure 72:
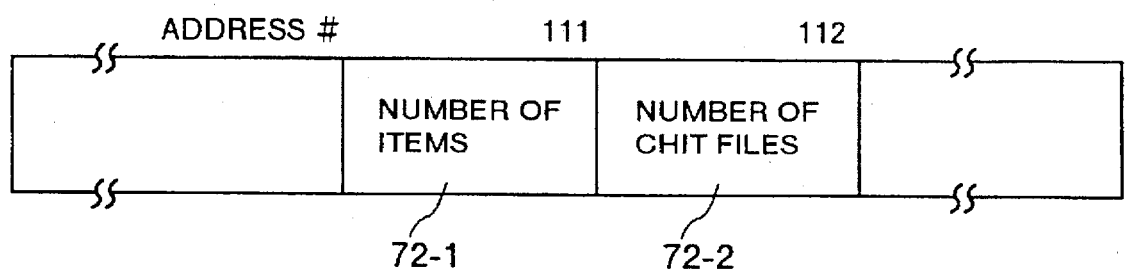
FIG. 72 shows a structure of a chit file constituent element setting area in a control information setting file in the fifteenth embodiment of the present invention.

The structure of the chit file area 71-5 is set in a similar manner to the first embodiment of FIG. 7. Secured in the control information setting file 71-2 of the memory 1-5 is a chit file constituent element setting area having such a structure as shown in FIG. 72, so that a registration item number per chit file is set at a location 72-1 having an address #111 and a chit file number (total of open chit number and close chit number) handleable by the register is set at a location 72-2 having an address #112, respectively. When the operator sets the mode PRG for the register with use of the mode switch 1-2, such a task menu of the set mode as shown in FIG. 8 is displayed. Depression of the keys "21" and "TOTAL" on the keyboard 1-1 causes selection of a memory structurization setting stage 21. Subsequent depression of the keys "111" and "TOTAL" causes a registration item number per chit file to be set. When the above operation is repeated with the address number changed, a chit number (a total of the open chit number and closed chit number) is set at the address #112. In the above setting operation, the capacity of the chit file area 71-5 is calculated based on the set number and the total capacity of the memory structure of FIG. 71 including the calculated file area capacity is calculated. When the total capacity exceeds the capacity of the memory 1-5, it becomes an error operation, so an error message is displayed and the setting is made invalid. After completion of setting of the present data, depression of the key "TOTAL" causes the register to go out or exit from the present set stage.

Figure 73:
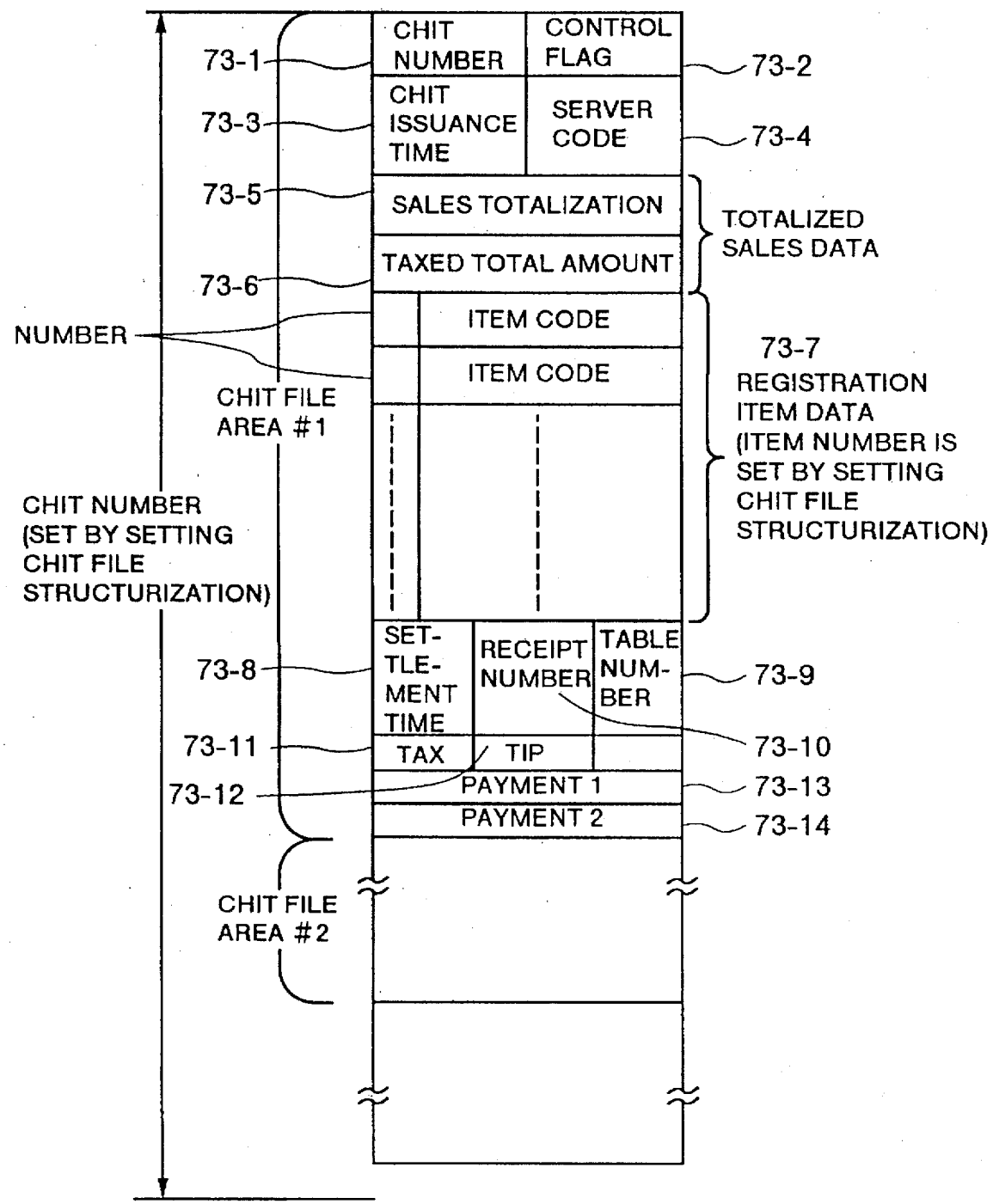
FIG. 73 shows a structure of a chit file area in the fifteenth embodiment of the present invention.

FIG. 73 shows the structure of the chit file area 71-5. The size of registration item data marked by bracket 73-7 is determined by the set number (registration item number per chit file) of the location 72-1 of the address #111 of the chit file constituent element setting area of FIG. 72. A total number of the open and closed chit files is determined by the set number (chit file number handleable by the register) of the location 72-2 of the address #112, so that the structure of the chit file area of FIG. 73 is determined. Bracket 73-15 marks totalized sales data, bracket 73-16 marks a chit file area #1, and bracket 73-17 marks a chit file area #2. Arrow 73-18 corresponds a chit number (set in accordance with the cit file structurization). Areas 73-19 are for storing numbers.

In the chit issuing operation in the registration mode of the register, through the operations similar to those in the first embodiment, a chit file is issued and its item registration and chit file storage based on the store key are carried out. Further, the chit file settling operation is carried out through key operations as in the first embodiment.

Figure 74:
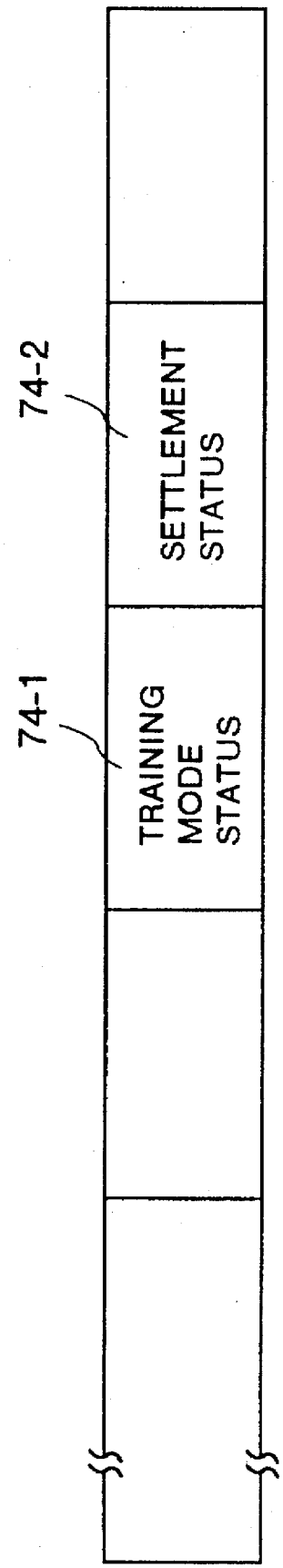
FIG. 74 shows a structure of a control flag area of a chit file area in the fifteenth embodiment of the present invention.
Figure 75:
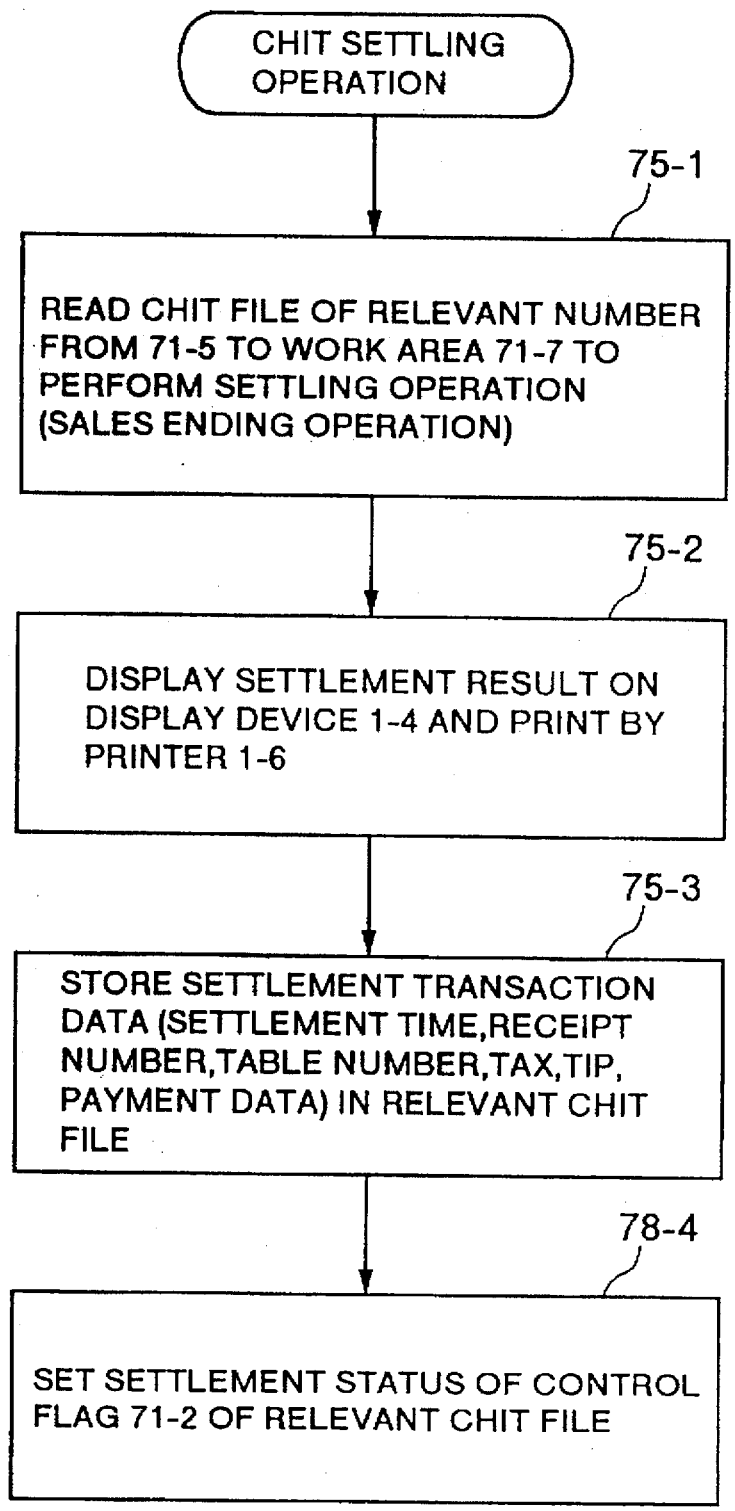
FIG. 75 is a flowchart for explaining chit settling operation in the fifteenth embodiment of the present invention.

FIG. 75 is a flowchart for explaining the chit settling operation. More in detail, after the corresponding chit file is recalled from the chit file area 71-5 to the work area 71-7, when the operator depresses the settlement key on the keyboard 1-1, a total amount of sales about the chit file of the chit file area 71-5 is calculated (step 75-1) and its settlement result is displayed on the display device 1-4 (step 75-2). Further, the settlement transaction information (settlement time, receipt number, table number, tax, amount, chip amount, payment data, etc.) is stored in the corresponding chit file as it is (step 75-3). In this case, a settlement status 74-2 is set in the control flag area 73-2 of the corresponding chit file (step 75-4), which means that the chit mode changed from an open chit file to a closed chit file. FIG. 74 shows the structure of the control flag area 73-2 of the chit file, in which reference numeral 74-1 denotes a training mode status and numeral 74-2 denotes a settlement status.

Figure 76:
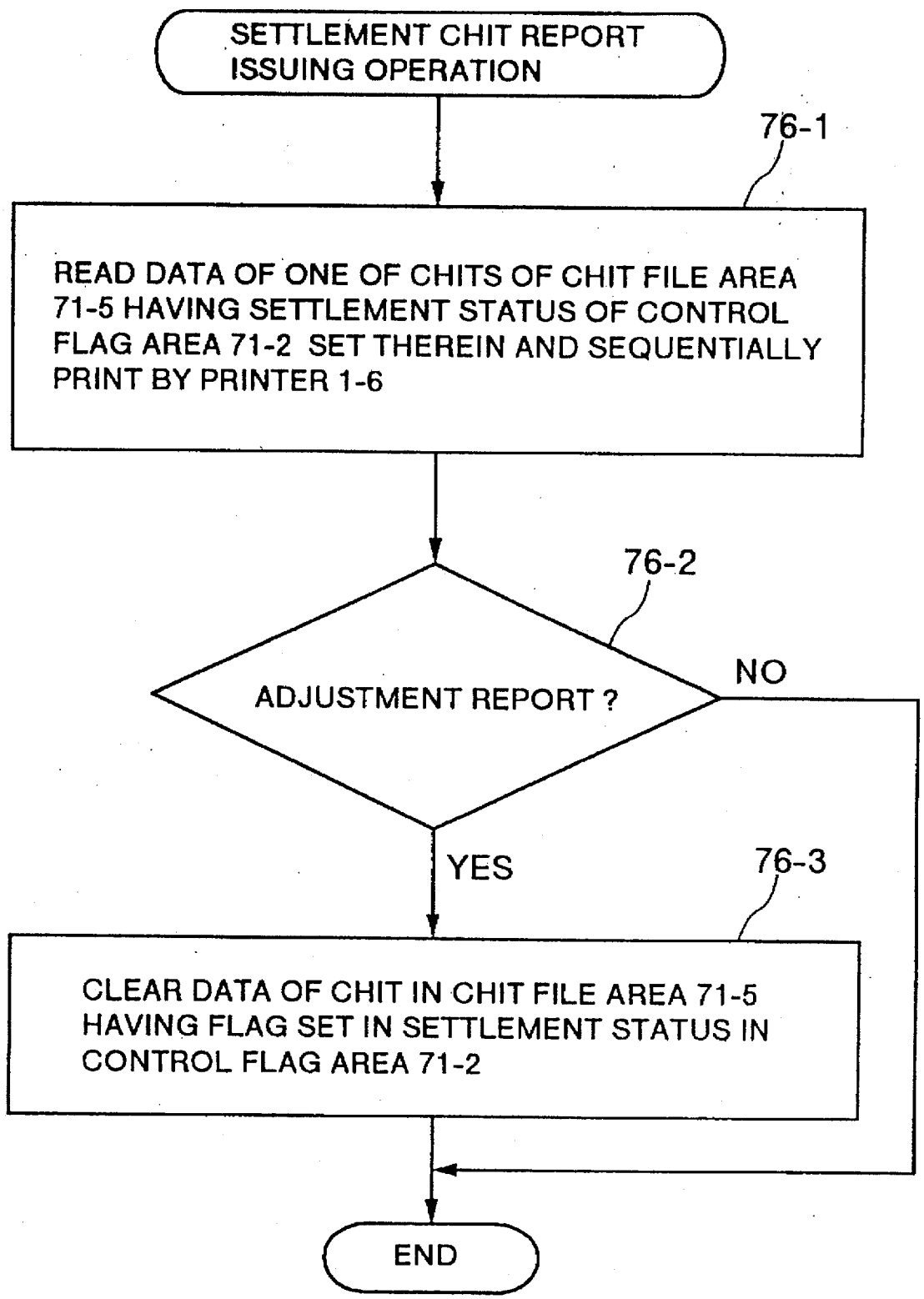
FIG. 76 is a flowchart for explaining chit report issuing operation in the fifteenth embodiment of the present invention.

An explanation will next be made as to the report issuing operation of settlement chit information in the manager mode of the register. FIG. 76 is a flowchart for explaining the present operation. More specifically, when the operator sets the mode MGR for the register with use of the mode switch 1-2, such a task menu of the manager mode as shown in FIG. 9 is displayed. Depression of the keys "1" and "TOTAL" on the keyboard 1-1 causes selection of such an inspection report task, which results in that such an inspection report menu as shown in FIG. 10 is displayed. Subsequent depression of the keys "12" and "TOTAL" causes the report issuing operation of settlement chit information (closed chit) to be selected, so that the chit files having the settlement status 74-2 of the control flag area 73-2 set therein are sequentially read out from the chit file area 71-5 and such a closed chit report as shown in FIG. 15 is issued from the printer 1-6 (step 76-1). When the above key operation causes selection of an adjustment report task in place of the inspection report task (step 76-2), a closed chit report similar to the above is issued. In this case, after the report is issued, the chit files having the settlement status 74-2 of the control flag area 73-2 set therein are cleared from the chit file area 71-5 (step 76-3).

As has been explained in the foregoing, in accordance with the present invention, there is provided an electronic register which has the function of registering a customer's order in a chit file on the electronic register to perform its settling operation and which can easily change its processing method in a wide range and can quickly cope with a change in a restaurant management method. In particular, the present invention provides the following features in selecting functions and in issuance of management reports in the settling operation which is directly associated with money transfer:

(1) a registration item number per chit file, an open chit file number handleable by the register and a settlement chit file number (close chit file number) handleable by the register can be set on the register as factors determining the structure of a settlement chit file, so that the structure of a settlement chit file suitable for a store's management environment can be simply, quickly and suitably set;

(2) on the basis of the control flag information previously set within the memory, when the settlement chit file area becomes full, either one of an operation of skipping storage of the settle chit information in the settle chit file area and an operation of discarding old settlement data on a first-in first-out basis and storing the latest settlement data can be conducted;

(3) the residual capacity alarm level of the settlement chit file area is previously stored within the memory so that, when the settlement chit information is stored in the settlement chit file area in the registering/settling operation, a message can be displayed when the residual capacity of the associated file becomes smaller than the above set level;

(4) when the settlement chit information is outputted to the display device or printer as sales management report data, the chit number order or the generation (storage) order of the settlement data can be selected on the basis of the control flag information previously set within the memory;

(5) in a system which comprises a plurality of registers interconnected one another, a transmission unit number for transfer of chit file information between the plurality of registers, their own register numbers and the number (master register number) of the register commonly used by the plurality of registers as a chit file memory are set in respective memories of the registers, so that information in open and settlement chit file areas provided in the memory of the master register are integrated and issued as settlement chit information report;

(6) on the basis of the control flag information previously set in the memory, with respect to a plurality of customer chit files subjected to the registering operation, integration to one of the chit files can be made possible, and the integrated chit files can be stored in the settlement chit file area respectively as the integrated information;

(7) with respect to a plurality of customer chit files subjected to the registering operation, these chit files can be integrated and settled and the integrated and settled chit files can be stored in the settlement chit file area respectively as integrated and settled information;

(8) after a plurality of customers are registered in the same chit file, the chit file is divided on each customer basis for settling operation, and the customer-based settlement information can be outputted to the display device or printer as a sales management report on the settlement chit information;

(9) the chit file registered and settled based on the setting of the mode switch at the training mode is stored in the settlement chit file area as training mode settlement information so that, when it desired to output a sales management report of the settlement chit information, the stored information can be outputted to the display device or printer as the training mode settlement information;

(10) the chit file registered and settled with use of a trainer-exclusive code previously set is stored in the settlement chit file area as trainer settlement information, so that, when it is desired to output a sales management report of the settlement chit information, the stored information can be outputted to the display device or printer as trainer settlement information;

(11) on the basis of the control flag information previously set in the memory, issuance of an adjustment report of the customer chit file is allowed, adjusting operation and issuance of the adjustment report is carried out, the adjusted chit file information is stored in the settlement chit file area respectively as adjustment chit file information, and the adjustment information of the chit file being opened is outputted to the display device or printer as a sales management report of the settlement chit information;

(12) a settlement chit recall key for recalling specific settlement chit information and a print key for printing the information are provided, so that depression of the recall key causes the settlement chit information corresponding to the entered chit number is read out from the settlement chit file area and depression of the print key causes the corresponding settlement chit information to be displayed on the display device or to be printed by the printer;

(13) when retrieval factors of information attached to the settlement chit file is specified, the settlement chit data of the retrieval factor are sequentially read out from the settlement chit file area and sent to the display device to be displayed thereon, or to be printed by the printer when the print key is depressed;

(14) a settlement chit recall key and a transaction change key are provided so that, after the settlement chit information of the corresponding chit number is read to the display device, when the operator depresses the transaction change key, the payment data of the settlement chit file is changed, the transaction amount of transaction data of the sales totalization data file is subtracted from the old-transaction totalizer, added to a new transaction totalizer and added to a transaction change totalizer, and the changed settlement chit transaction result is displayed on the display device and printed by the printer; and

(15) a chit file number (a total of open chit file number and settlement chit file number) handleable by the register is set, settlement transaction data is stored in the associated customer chit file through the depression of the settlement key, and the stored data is used in the sales management report as the settlement chit file information of the corresponding customer chit file.

What is claimed is:

1. An electronic register comprising:

a memory having an open chit file area and a settlement chit file area for storing therein a chit file, article information including an article name and unit article price, settlement information of the chit file and registration totalization data;

a keyboard having thereon a chit file issuance key for applying a number to the chit file provided in the memory, an item key for registering an article item, a store key for performing a temporary closing operation over the registering operation of the article item, a recall key for calling the customer chit file subjected to the temporary closing operation for additional registration of the item, a settlement key for calculating a total amount of registered articles for settlement thereof, and a numeric key for entering a numeric value;

a mode switch for specifying one of a plurality of operational mode, including a set mode and a registration mode;

an operation controller for performing data transferring operations with said memory and for performing operations according to said operational mode specified by said mode switch;

a display device and a printer for outputting data of said operation controller;

means for setting a registration item capacity per chit file, a number of open chit files able to be handled and temporarily closed by said register, and a number of settlement chit files storing chit information settled at depressing of said settlement key as factors determining a structure of said chit file when the set mode is specified with use of said mode switch;

means for applying a file number to an empty file in the open chit file area through operation of said chit file issuance key when the registration mode is specified for said operation controller with use of said mode switch;

means for registering the article item in the chit file based on operation of said item key, store key and recall key; and means for calculating a total amount of proceeds for the article items already registered in the chit file through the operation of said settlement key, outputting said calculated total amount to said display device, clearing the chit file in the open chit file area, storing the settlement information in the settlement chit file area, and outputting the settlement information to the display device or printer as sales management report data.

2. An electronic register as set forth in claim 1, further comprising:

means for setting control flag information in said memory for selection of a control when said settlement chit file area is full of settlement data when said set mode is set for said operation controller with use of said mode switch; and means for selecting an operation of skipping the storage of the settlement chit information in the settlement chit file area on the basis of the control flag information previously set within the memory by said setting means when the settlement chit file area becomes full of the settlement data during storage of said settlement chit information in the settlement chit file area or an operation of discarding old settlement data from the settlement chit file area on a first-in-first-out basis and storing the latest settlement data.

3. An electronic register as set forth in claim 1, further comprising means for setting a residual capacity detection level of said settlement chit file area in said memory when said set mode is set for said operation controller with use of said mode switch and for comparing a residual capacity of the file with said set level when it is desired to store the settlement information in the settlement chit file area to thereby display a message on said display device when the residual capacity becomes smaller than said set level.

4. An electronic register as set forth in claim 1, wherein said operation controller further has a manager mode and said mode switch further specifies said manager mode, said electronic register further comprising:
means for setting control flag information for selection of a report format when the settlement chit information is outputted to said memory as sales management report data when said set mode is set for the operation controller with use of the mode switch; and
means for selecting a chit number order or generation or storage order of the settlement data on the basis of said control flag information previously set within the memory by said setting means when said manager mode is set for the operation controller with use of the mode switch.

5. An electronic register as set forth in claim 1, further comprising:
a transmission unit for performing a transferring operation of chit file information between a plurality of registers including a master register for common use as a chit file memory;
means for setting in the memory of each of said registers its own register number and a master register number when said set mode is set for said operation controller with use of said mode switch;
means for setting a registration item number per chit file;
an open chit file number (temporarily closable chit number) handleable by the register and a settlement chit file number (closed chit file number) having chit information settled by said settlement key and stored therein in the memory of the register specified as said master register as factors determining a structure of the chit file;
means for judging whether or not the master register number set in the memory of the register is the same as its own register number when said registration mode is set for said operation controller with use of said mode switch and said chit file issuance key is depressed, for applying a file number to an area of the customer chit file within its own memory to allow registration of an article item in the customer chit file when the master register number is the same as its own register number and for sending a chit file issuance command to the register having the master register number through said transmission unit, and for applying a file number to the customer chit file of the memory of the master register to allow registration of an article item in the customer chit file when the master register number is not the same as its own register number;
means for judging whether or not the master register number is the same as its own register number even in operation of said store key, recall key and settlement key similarly to operation of said chit file issuance key, for operating the customer chit file within its own memory and the settlement chit file when the master register is the same as its own register number and for operating the customer chit file within the master register and the settlement chit file through the transmission unit when the master register is not the same as its own register number; and
means for calculating a total amount of proceeds for the article items registered in the customer chit file through operation of the settlement key, outputting the total amount to the display device of the register, clearing the customer chit file information of the open chit file area of the master register and storing the settlement information of the chit in the settlement chit file area of the master register,
wherein any one of a plurality of electronic registers interconnected to form a system issues the customer chit file, performs temporary closing operation (or storing operation), calling operation (or recalling operation), additional article registering operation and chit settling operation, and outputs the settlement information to the display device or printer as sales management report data.

6. An electronic register as set forth in claim 5, further comprising:
means for setting control flag information for selection of control in said memory when said settlement chit file area becomes full of settlement data when said set mode is set for said operation controller with use of said mode switch; and
means for selecting an operation of skipping the storage of the settlement chit information in the settlement chit file area on the basis of the control flag information previously set within the memory by said setting means or an operation of discarding old settlement data from the settlement chit file area on a first-in-first-out basis and storing the latest settlement data when the settlement chit file area becomes full of the settlement data during storage of said settlement chit information in the settlement chit file area.

7. An electronic register as set forth in claim 5, further comprising means for setting a residual capacity detection level of said settlement chit file area in said memory when said set mode is set for said operation controller with use of said mode switch and for comparing a residual capacity of the file with said set level when it is desired to store the settlement information in the settlement chit file area and for displaying a message on said display device when the residual capacity becomes smaller than said set level.

8. An electronic register as set forth in claim 5, said operation controller further having a manager mode and said mode switch further specifying said manager mode, said electronic register further comprising:
means for setting control flag information for selection of a report format when the settlement chit information is outputted to said memory as sales management report data when said set mode is set for the operation controller with use of the mode switch; and
means for selecting a chit number order or generation or storage order of the settlement data on the basis of said control flag information previously set within the memory by said setting means when said manager mode is set for the operation controller with use of the mode switch.

9. An electronic register as set forth in claim 1, further comprising means for setting a flag for enabling integration of a plurality of customer chit files in said memory when said set mode is set for said operation controller with use of said mode switch; and means for sequentially calling said plurality of customer chit files subjected to the registering operation through operation of said recall key and when said store key is operated, for integrating said plurality of called chit file information to the first-recalled for storage and for storing the integrated chit files to the settlement chit file area respectively as integrated information when said registration mode is set for the operation controller with use of the mode switch and said integration enable flag is set;

wherein the customer chit files being subjected to the registering operation is integrated to other chit file being opened at the time point and the integrated chit file information is outputted to the display device or printer as a sales management report of the settlement information.

10. An electronic register as set forth in claim 1, further comprising:

means for setting a flag for enabling integration of a plurality of customer chit files in said memory when said set mode is set for said operation controller with use of said mode switch; and means for sequentially calling said plurality of customer chit files subjected to the registering operation through operation of said recall key and then when said settlement key is operated, for integrating said plurality of called chit file data for settlement and for storing the integrated and settled chit files in the settlement chit file area respectively as integrated and settled information when said registration mode is set for the operation controller with use of the mode switch and said integration enable flag is set, wherein the customer chit files being subjected to the registering operation is integrated to other chit file being opened at the time point and the integrated and settled chit file information is outputted to the display device or printer as a sales management report of the settlement information.

11. An electronic register as set forth in claim 1, said setting means further setting a maximum customer number (the number of divisions in one chit file corresponding to respective customer numbers), said keyboard further having a customer specification key, and said electronic register further comprising:

means for storing an article item in said chit file with customer information attached thereto based on item registration with use of said customer specification key after said registration mode is set for said operation controller with use of said mode switch and then a chit file is issued;

means for settling sales on each customer basis based on customer specification when the chit file is settled; and means for storing the chit files settled on each customer basis in the settlement chit file area respectively as customer-based settlement information, wherein, after a plurality of customers are registered in the same chit file, the chit file is divided on each customer basis for settlement and the customer-based settlement information is outputted to the display device or printer as a sales management report of the settlement chit information.

12. An electronic register as set forth in claim 1, wherein said operation controller further has a training mode, said memory has a sales totalization file and a training totalizer, said electronic register further comprising:

means for setting said training mode for the electronic register with use of said mode switch;

means for setting a training mode status for a chit file prepared in said training mode;

means for enabling recalling and settling operation of the chit file having the training mode status set therein only in the training mode and adding the registering/totalizing operation in the training mode not to the sales totalization file but only to a training totalizer; and means for storing the chit file settled in the training mode in the settlement chit file area as training mode settlement information, wherein the settlement information in the training mode is outputted to the display device or printer as a sales management report of the settlement chit information.

13. An electronic register as set forth in claim 1, wherein said operation controller further has a training mode, and said memory has a sales totalization file and a training totalizer, said electronic register further comprising:

means for setting a trainer-exclusive code in said memory;

means for setting a training mode status for the chit file prepared after input of said trainer-exclusive code in said registration mode;

means for enabling the recalling and settling operation of the chit file having said training mode status set therein only after the input of the trainer-exclusive code;

means for adding totalization data of the chit registering operation of the chit file having the training mode status set therein not to the sales totalization file but only to the training totalizer; and means for storing the chit file settled with the trainer-exclusive code in the settlement chit file area as training mode settlement information, wherein the trainer settlement information is outputted to the display device or printer as a sales management report of the settlement chit information.

14. An electronic register as set forth in claim 1, wherein said operation controller further has a manager mode, said electronic register further comprising:

means for setting a flag for enabling issuance of an adjustment report of the chit file in said memory when said set mode is set for said operation controller with use of said mode switch; and means for issuing an adjustment report about a plurality of chit files subjected to said registering operation and for storing the adjusted chit file information in the settlement chit file area respectively as adjustment chit file information when said manager mode is set for the operation controller with use of the mode switch to issued a chit file adjustment report issuance command and when said chit file adjustment report issuance enable flag is set, wherein the adjustment information of the chit file being opened is outputted to the display device or printer as a sales management report of the settlement chit information.

15. An electronic register as set forth in claim 1, wherein said keyboard further has a settlement chit recall key and a print key for displaying and printing specific settlement chit information respectively, and when said registration mode is set for said operation controller with use of said mode switch, a chit number is entered and then said settlement chit recall key is depressed, the settlement chit information corresponding to the input of the entered chit number is read out from the settlement chit file area, displayed on the display device and depression of the print key causes the settlement chit information being displayed to be printed by the printer.

16. An electronic register as set forth in claim 1, wherein said keyboard further has a settlement chit recall key and a print key for displaying and printing settlement chit information respectively, and when said registration mode is set for said operation controller with use of said mode switch and said settlement chit recall key is depressed, said display device displays a selection screen of a retrieval factor of the settlement chit file, and when at least one of an operator, table number, date/time and receipt number is specified as the retrieval factor of information attached to the settlement chit file, said operation controller sequentially reads out a settlement chit data with respect to the corresponding retrieval factor from the settlement chit file area and displays said data on the display device, and when said print key is depressed said printer prints the settlement chit data being displayed.

17. An electronic register as set forth in claim 1, wherein said keyboard further has a settlement chit recall key for reading settlement chit information from the settlement chit file area and a transaction change key for changing the settlement chit information, said memory further has an old transaction totalizer, a new totalizer and a transaction change totalizer, and when the settlement chit information of the corresponding chit number is read to the display device and then when said transaction change key is depressed to give a transaction change command to said operation controller, upon depression of a transaction key for changing payment transaction, the payment data of the settlement chit file is changed, the corresponding transaction amount of the transaction data of a sales totalization data file is subtracted from said old transaction totalizer, added to said new totalizer and added to said transaction change totalizer, and the changed settlement chit transaction result is displayed on the display device and printed by the printer respectively.

18. An electronic register as set forth in claim 1, wherein said means for outputting to said display device or printer sequentially outputs said settlement transaction data from said chit file when it is desired to issue a sales management report of the settlement information.

19. An electronic register comprising:

a memory having a plurality of memory areas, the memory areas including open and closed chit file areas for storing information about open and closed chit files;

a keyboard having a plurality of keys, including a chit file issuance key, an item key, a store key, a recall key, a settlement key, and numeric keys;

mode selection means for specifying one of a plurality of operational modes, the operational modes including a set mode and a registration mode;

an operation controller for performing data transferring operations with the memory;

an output device;

means cooperating with the operation controller for setting at least a registration item capacity per chit file and a maximum number of open chit files when the set mode is specified by the mode selection means;

means cooperating with the operation controller for applying a file number to an empty file in the open chit file area to open a particular chit file when the registration mode is specified by the mode selection means and the chit file issuance key is operated;

means cooperating with the operation controller for registering purchased articles in the particular chit file based on operation of the item key, store key, or recall key when the registration mode is specified by the mode selection means; and means cooperating with the operation controller for calculating a total monetary amount for purchased articles registered in the particular chit file based on operation of the settlement key, outputting the total monetary amount to the output device, for clearing the particular chit file from the open chit file area, and for storing settlement data which includes at least the total monetary amount in the closed chit file area, when the registration mode is specified by the mode selection means.

20. An electronic register as set forth in claim 19, wherein the operational modes that can be specified by the mode selection means additionally include a manager mode, and further comprising means cooperating with the operation controller for setting control flag information in the memory when the manager mode is specified by the mode selection means, the control flag information having a first state or a second state, and means cooperating with the operation controller for skipping storage of settlement data if the closed chit file area has become full and the control flag information is in the first state or for discarding old settlement data from the settlement chit file area on a first-in-first-out basis and storing the latest settlement data if the control flag information is in the second state.

* * * * *